United States Patent
Perez

(10) Patent No.: US 11,259,089 B2
(45) Date of Patent: *Feb. 22, 2022

(54) VIDEO-ON-DEMAND CONTENT DELIVERY METHOD FOR PROVIDING VIDEO-ON-DEMAND SERVICES TO TV SERVICE SUBSCRIBERS

(71) Applicant: Broadband iTV, Inc., Austin, TX (US)

(72) Inventor: Milton Diaz Perez, Tiburon, CA (US)

(73) Assignee: Broadband iTV, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/248,063

(22) Filed: Jan. 7, 2021

(65) Prior Publication Data

US 2021/0127168 A1 Apr. 29, 2021

Related U.S. Application Data

(60) Continuation of application No. 16/692,298, filed on Nov. 22, 2019, now Pat. No. 10,893,334, which is a
(Continued)

(51) Int. Cl.
*H04N 21/482* (2011.01)
*H04N 21/235* (2011.01)
(Continued)

(52) U.S. Cl.
CPC ....... *H04N 21/47202* (2013.01); *G06Q 30/02* (2013.01); *H04N 7/17318* (2013.01);
(Continued)

(58) Field of Classification Search
CPC .......................... H04N 21/235; H04N 21/482
See application file for complete search history.

(56) References Cited

U.S. PATENT DOCUMENTS 4,706,121 A  11/1987 Young
4,751,578 A   6/1988 Reiter et al.
(Continued)

FOREIGN PATENT DOCUMENTS

EP  0944254 A1  9/1999
EP  1024661 A2  8/2000
(Continued)

OTHER PUBLICATIONS

U.S. Appl. No. 15/253,288, filed Aug. 31, 2016, Issued as U.S. Pat. No. 9,648,388.
(Continued)

*Primary Examiner* — Mushfikh I Alam
(74) *Attorney, Agent, or Firm* — Amster, Rothstein & Ebenstein LLP

(57) ABSTRACT

A video-on-demand (VOD) content delivery system has a VOD Application Server which manages a database of templates for presentation of video content elements of different selected types categorized in hierarchical order. A web-based Content Management System receives content uploaded online in file formats with metadata for title and topical area, and automatically converts it into video data format compatible with the VOD content delivery system indexed by title and topical area. A User Interface for the system delivers listings data to the viewer's TV indexed by title and topical area specified by the uploaded metadata.

14 Claims, 7 Drawing Sheets

Related U.S. Application Data continuation of application No. 16/185,367, filed on Nov. 9, 2018, now Pat. No. 10,491,954, which is a continuation of application No. 15/664,655, filed on Jul. 31, 2017, now Pat. No. 10,129,597, which is a continuation of application No. 15/399,116, filed on Jan. 5, 2017, now Pat. No. 9,998,791, which is a continuation of application No. 15/148,807, filed on May 6, 2016, now Pat. No. 9,578,376, which is a continuation of application No. 14/987,283, filed on Jan. 4, 2016, now Pat. No. 9,338,512, which is a continuation of application No. 14/703,597, filed on May 4, 2015, now Pat. No. 9,232,275, which is a continuation of application No. 12/852,663, filed on Aug. 9, 2010, now Pat. No. 9,078,016, which is a division of application No. 11/952,552, filed on Dec. 7, 2007, now Pat. No. 7,774,819, which is a division of application No. 10/909,192, filed on Jul. 30, 2004, now Pat. No. 7,590,997.

(51) Int. Cl.

| | | |
|---|---|---|
| *H04N 21/472* | (2011.01) | |
| *G06Q 30/02* | (2012.01) | |
| *H04N 7/173* | (2011.01) | |
| *H04N 21/2547* | (2011.01) | |
| *H04N 21/258* | (2011.01) | |
| *H04N 21/2743* | (2011.01) | |
| *H04N 21/431* | (2011.01) | |
| *H04N 21/4722* | (2011.01) | |
| *H04N 21/81* | (2011.01) | |
| *H04N 21/84* | (2011.01) | |
| *H04N 21/858* | (2011.01) | |
| *H04N 21/61* | (2011.01) | |
| *H04N 21/422* | (2011.01) | |
| *H04N 21/643* | (2011.01) | |
| *H04N 21/254* | (2011.01) | |
| *H04N 21/4627* | (2011.01) | |
| *H04N 21/262* | (2011.01) | |
| *H04N 21/222* | (2011.01) | |
| *H04N 21/2343* | (2011.01) | |
| *H04N 21/239* | (2011.01) | |
| *H04N 21/442* | (2011.01) | |
| *H04N 21/438* | (2011.01) | |

(52) U.S. Cl.
CPC ....... *H04N 21/2221* (2013.01); *H04N 21/235* (2013.01); *H04N 21/2353* (2013.01); *H04N 21/2393* (2013.01); *H04N 21/234309* (2013.01); *H04N 21/2541* (2013.01); *H04N 21/2547* (2013.01); *H04N 21/25858* (2013.01); *H04N 21/25891* (2013.01); *H04N 21/26225* (2013.01); *H04N 21/2743* (2013.01); *H04N 21/42204* (2013.01); *H04N 21/4312* (2013.01); *H04N 21/4314* (2013.01); *H04N 21/4383* (2013.01); *H04N 21/44222* (2013.01); *H04N 21/4627* (2013.01); *H04N 21/4722* (2013.01); *H04N 21/482* (2013.01); *H04N 21/4821* (2013.01); *H04N 21/6118* (2013.01); *H04N 21/6125* (2013.01); *H04N 21/6175* (2013.01); *H04N 21/64322* (2013.01); *H04N 21/812* (2013.01); *H04N 21/84* (2013.01); *H04N 21/858* (2013.01); *H05K 999/99* (2013.01)

(56) References Cited

U.S. PATENT DOCUMENTS

| | | | |
|---|---|---|---|
| 5,442,389 A | 8/1995 | Blahut et al. | |
| 5,446,891 A | 8/1995 | Kaplan et al. | |
| 5,479,268 A | 12/1995 | Young et al. | |
| 5,485,219 A | 1/1996 | Woo | |
| 5,530,754 A | 6/1996 | Garfinkle | |
| 5,541,738 A | 7/1996 | Mankovitz | |
| 5,550,735 A | 8/1996 | Slade et al. | |
| 5,553,211 A | 9/1996 | Uotani | |
| 5,559,549 A | 9/1996 | Hendricks et al. | |
| 5,566,287 A | 10/1996 | Delpuch | |
| 5,583,763 A | 12/1996 | Atcheson et al. | |
| 5,589,892 A | 12/1996 | Knee et al. | |
| 5,592,551 A | 1/1997 | Lett et al. | |
| 5,594,936 A | 1/1997 | Rebec et al. | |
| 5,616,876 A | 4/1997 | Cluts | |
| 5,623,613 A | 4/1997 | Rowe et al. | |
| 5,648,824 A | 7/1997 | Dunn et al. | |
| 5,670,730 A | 9/1997 | Grewe et al. | |
| 5,678,012 A | 10/1997 | Kimmich et al. | |
| 5,686,954 A | 11/1997 | Yoshinobu et al. | |
| 5,689,799 A | 11/1997 | Dougherty et al. | |
| 5,699,125 A | 12/1997 | Rzeszewski et al. | |
| 5,701,161 A | 12/1997 | Williams et al. | |
| 5,721,827 A | 2/1998 | Logan et al. | |
| 5,721,878 A | 2/1998 | Ottesen et al. | |
| 5,734,853 A * | 3/1998 | Hendricks | H04N 7/102 |
| | | | 715/716 |
| 5,739,451 A | 4/1998 | Winksy et al. | |
| 5,751,160 A | 5/1998 | Baek et al. | |
| 5,751,282 A | 5/1998 | Girard et al. | |
| 5,758,258 A | 5/1998 | Shoff et al. | |
| 5,759,101 A | 6/1998 | Von Kohorn | |
| 5,768,592 A | 6/1998 | Chang | |
| 5,778,181 A | 7/1998 | Hidary et al. | |
| 5,790,176 A | 8/1998 | Craig | |
| 5,790,426 A | 8/1998 | Robinson | |
| 5,790,935 A | 8/1998 | Payton | |
| 5,798,785 A | 8/1998 | Hendricks et al. | |
| 5,798,921 A | 8/1998 | Johnson et al. | |
| 5,805,763 A | 9/1998 | Lawler et al. | |
| 5,812,123 A * | 9/1998 | Rowe | H04N 21/4312 |
| | | | 725/43 |
| 5,812,124 A | 9/1998 | Eick et al. | |
| 5,813,014 A | 9/1998 | Gustman | |
| 5,822,123 A | 10/1998 | Davis et al. | |
| 5,826,102 A | 10/1998 | Escobar | |
| 5,832,499 A | 11/1998 | Gustman | |
| 5,850,218 A | 12/1998 | LaJoie et al. | |
| 5,859,898 A | 1/1999 | Checco | |
| 5,861,906 A | 1/1999 | Dunn et al. | |
| 5,867,821 A | 2/1999 | Ballantyne | |
| 5,872,850 A | 2/1999 | Klein et al. | |
| 5,884,033 A | 3/1999 | Duvall et al. | |
| 5,892,536 A | 4/1999 | Logan et al. | |
| 5,898,435 A | 4/1999 | Nagahara et al. | |
| 5,914,746 A | 6/1999 | Matthews | |
| 5,918,303 A | 6/1999 | Yamaura et al. | |
| 5,920,700 A | 7/1999 | Gordon et al. | |
| 5,926,230 A | 7/1999 | Niijima et al. | |
| 5,931,901 A | 8/1999 | Wolfe | |
| 5,956,716 A | 9/1999 | Kenner et al. | |
| 5,969,283 A | 10/1999 | Looney et al. | |
| 5,973,680 A | 10/1999 | Ueda | |
| 5,990,927 A | 11/1999 | Hendricks et al. | |
| 5,991,801 A | 11/1999 | Rebec et al. | |
| 6,005,561 A | 12/1999 | Hawkins et al. | |
| 6,008,803 A | 12/1999 | Rowe et al. | |
| 6,018,768 A | 1/2000 | Ullman et al. | |
| 6,025,837 A | 2/2000 | Matthews et al. | |
| 6,029,045 A | 2/2000 | Picco et al. | |
| 6,038,591 A | 3/2000 | Wolfe | |
| 6,049,823 A | 4/2000 | Hwang | |
| 6,062,868 A | 5/2000 | Toriumi | |
| 6,088,455 A | 7/2000 | Logan et al. | |
| 6,088,722 A | 7/2000 | Herz et al. | |

(56) References Cited

U.S. PATENT DOCUMENTS

| | | | |
|---|---|---|---|
| 6,091,883 A | 7/2000 | Artigalas et al. | |
| 6,092,080 A | 7/2000 | Gustman | |
| 6,100,883 A | 8/2000 | Hoarty | |
| 6,112,186 A | 8/2000 | Bergh et al. | |
| 6,118,442 A * | 9/2000 | Tanigawa | H04N 21/4312 715/719 |
| 6,118,450 A | 9/2000 | Proehl et al. | |
| 6,128,012 A | 10/2000 | Seidensticker, Jr. et al. | |
| 6,141,488 A | 10/2000 | Knudson et al. | |
| 6,148,081 A | 11/2000 | Szymanski et al. | |
| 6,161,142 A | 12/2000 | Wolfe | |
| 6,163,316 A | 12/2000 | Killian | |
| 6,166,730 A | 12/2000 | Goode et al. | |
| 6,177,931 B1 | 1/2001 | Alexander et al. | |
| 6,182,094 B1 | 1/2001 | Humpleman et al. | |
| 6,201,538 B1 | 3/2001 | Wugofski | |
| 6,205,582 B1 | 3/2001 | Hoarty | |
| 6,208,335 B1 | 3/2001 | Gordon et al. | |
| 6,208,799 B1 | 3/2001 | Marsh et al. | |
| 6,233,736 B1 | 5/2001 | Wolzien | |
| 6,237,146 B1 | 5/2001 | Richards | |
| 6,248,946 B1 | 6/2001 | Dwek | |
| 6,269,275 B1 | 7/2001 | Slade | |
| 6,289,346 B1 | 9/2001 | Milewski et al. | |
| 6,305,016 B1 | 10/2001 | Marshall et al. | |
| 6,314,572 B1 | 11/2001 | LaRocca et al. | |
| 6,317,885 B1 | 11/2001 | Fries | |
| 6,332,175 B1 | 12/2001 | Birrell et al. | |
| 6,353,450 B1 | 3/2002 | DeLeeuw | |
| 6,357,042 B2 | 3/2002 | Srinivasan | |
| 6,377,530 B1 | 4/2002 | Burrows | |
| 6,408,435 B1 | 6/2002 | Sato | |
| 6,418,556 B1 | 7/2002 | Bennington et al. | |
| 6,445,398 B1 | 9/2002 | Gerba et al. | |
| 6,446,083 B1 | 9/2002 | Leight et al. | |
| 6,476,826 B1 | 11/2002 | Plotkin et al. | |
| 6,539,548 B1 * | 3/2003 | Hendricks | H04N 21/4788 725/109 |
| 6,546,393 B1 | 4/2003 | Khan | |
| 6,564,380 B1 | 5/2003 | Murphy | |
| 6,606,746 B1 | 8/2003 | Zdepski et al. | |
| 6,611,654 B1 | 8/2003 | Shteyn | |
| 6,665,870 B1 | 12/2003 | Finseth et al. | |
| 6,678,463 B1 | 1/2004 | Pierre et al. | |
| 6,732,369 B1 | 5/2004 | Schein et al. | |
| 6,738,978 B1 | 5/2004 | Hendricks | |
| 6,742,184 B1 | 5/2004 | Finseth et al. | |
| 6,754,904 B1 * | 6/2004 | Cooper | G06Q 10/10 348/E7.071 |
| 6,754,906 B1 | 6/2004 | Finseth et al. | |
| 6,760,721 B1 | 7/2004 | Chasen et al. | |
| 6,766,100 B1 | 7/2004 | Komar et al. | |
| 6,772,433 B1 | 8/2004 | LaJoie et al. | |
| 6,774,926 B1 * | 8/2004 | Ellis | H04N 21/4586 348/14.01 |
| 6,788,882 B1 | 9/2004 | Geer et al. | |
| 6,804,825 B1 | 10/2004 | White et al. | |
| 6,834,110 B1 | 12/2004 | Marconcini et al. | |
| 6,845,396 B1 | 1/2005 | Kanojia et al. | |
| 6,898,762 B2 | 5/2005 | Ellis et al. | |
| 6,920,617 B2 | 7/2005 | Nitta | |
| 6,928,433 B2 | 8/2005 | Goodman et al. | |
| 6,931,451 B1 | 8/2005 | Logan et al. | |
| 6,963,898 B2 | 11/2005 | Yoshimine et al. | |
| 6,968,364 B1 * | 11/2005 | Wong | H04N 5/765 348/E7.071 |
| 6,976,229 B1 | 12/2005 | Balabanovic et al. | |
| 6,981,040 B1 | 12/2005 | Konig et al. | |
| 6,983,478 B1 | 1/2006 | Grauch et al. | |
| 6,985,586 B2 | 1/2006 | Hill | |
| 6,990,677 B1 * | 1/2006 | Pietraszak | H04N 21/4431 725/49 |
| 7,003,792 B1 | 2/2006 | Yuen | |
| 7,020,652 B2 | 3/2006 | Matz et al. | |
| 7,020,888 B2 | 3/2006 | Reynolds et al. | |
| 7,028,327 B1 | 4/2006 | Dougherty et al. | |
| 7,047,411 B1 | 5/2006 | DeMello et al. | |
| 7,055,104 B1 | 5/2006 | Billmaier et al. | |
| 7,055,166 B1 | 5/2006 | Logan et al. | |
| 7,055,169 B2 | 5/2006 | Delpuch et al. | |
| 7,058,223 B2 | 6/2006 | Cox | |
| 7,065,709 B2 | 6/2006 | Ellis | |
| 7,076,734 B2 * | 7/2006 | Wolff | H04N 5/44543 715/720 |
| 7,089,309 B2 | 8/2006 | Ramaley et al. | |
| 7,100,185 B2 | 8/2006 | Bennington et al. | |
| 7,103,905 B2 | 9/2006 | Novak | |
| 7,103,906 B1 | 9/2006 | Katz et al. | |
| 7,120,925 B2 | 10/2006 | D'Souza et al. | |
| 7,127,735 B1 | 10/2006 | Lee et al. | |
| 7,146,626 B1 | 12/2006 | Arsenault et al. | |
| 7,155,674 B2 | 12/2006 | Breen et al. | |
| 7,159,233 B2 | 1/2007 | Son et al. | |
| 7,174,512 B2 | 2/2007 | Martin et al. | |
| 7,188,355 B1 | 3/2007 | Prokopenko et al. | |
| 7,200,575 B2 | 4/2007 | Hans et al. | |
| 7,203,952 B2 | 4/2007 | Broadus | |
| 7,213,005 B2 | 5/2007 | Mourad et al. | |
| 7,222,163 B1 * | 5/2007 | Girouard | G11B 27/28 375/E7.025 |
| 7,225,455 B2 | 5/2007 | Bennington et al. | |
| 7,231,419 B1 | 6/2007 | Gheorghe et al. | |
| 7,243,139 B2 | 7/2007 | Ullman et al. | |
| 7,269,854 B2 | 9/2007 | Simmons et al. | |
| 7,277,870 B2 * | 10/2007 | Mourad | G06F 21/10 705/51 |
| 7,278,153 B1 | 10/2007 | Sanders | |
| 7,305,691 B2 * | 12/2007 | Cristofalo | H04N 21/4415 725/34 |
| 7,308,413 B1 | 12/2007 | Tota et al. | |
| 7,320,025 B1 | 1/2008 | Steinberg et al. | |
| 7,337,462 B2 * | 2/2008 | Dudkiewicz | H04N 7/163 725/136 |
| 7,367,043 B2 | 4/2008 | Dudkiewicz et al. | |
| 7,380,258 B2 | 5/2008 | Durden et al. | |
| 7,383,564 B2 | 6/2008 | White et al. | |
| 7,386,512 B1 | 6/2008 | Allibhoy et al. | |
| 7,392,532 B2 | 6/2008 | White et al. | |
| 7,409,437 B2 | 8/2008 | Ullman et al. | |
| 7,421,729 B2 | 9/2008 | Zenoni | |
| 7,426,558 B1 | 9/2008 | Allibhoy et al. | |
| 7,430,718 B2 | 9/2008 | Gariepy-Viles | |
| 7,434,244 B2 | 10/2008 | Popov et al. | |
| 7,444,402 B2 | 10/2008 | Rennels | |
| 7,444,655 B2 | 10/2008 | Sardera | |
| 7,451,467 B2 | 11/2008 | Carver et al. | |
| 7,471,834 B2 | 12/2008 | Sull et al. | |
| 7,490,346 B2 | 2/2009 | Alao et al. | |
| 7,493,341 B2 | 2/2009 | Israel et al. | |
| 7,493,643 B2 | 2/2009 | Ellis | |
| 7,512,964 B2 | 3/2009 | Rodriguez et al. | |
| 7,516,472 B2 | 4/2009 | Danker et al. | |
| 7,548,565 B2 * | 6/2009 | Sull | G06T 3/4092 370/503 |
| 7,584,159 B1 | 9/2009 | Chakrabarti et al. | |
| 7,590,997 B2 | 9/2009 | Diaz Perez | |
| 7,594,245 B2 * | 9/2009 | Sezan | H04N 7/163 725/13 |
| 7,596,799 B2 | 9/2009 | Chen | |
| 7,600,192 B1 | 10/2009 | Hashimoto et al. | |
| 7,600,246 B2 | 10/2009 | Taylor et al. | |
| 7,603,684 B1 | 10/2009 | Ellis | |
| 7,606,883 B1 | 10/2009 | Allibhoy et al. | |
| 7,624,337 B2 | 11/2009 | Sull et al. | |
| 7,627,824 B2 | 12/2009 | Segel | |
| 7,631,328 B2 | 12/2009 | Clancy et al. | |
| 7,631,336 B2 | 12/2009 | Diaz Perez | |
| 7,644,429 B2 | 1/2010 | Bayassi et al. | |
| 7,650,621 B2 | 1/2010 | Thomas et al. | |
| 7,657,843 B2 | 2/2010 | White | |
| 7,664,813 B2 | 2/2010 | Pettit et al. | |
| 7,685,520 B2 | 3/2010 | Rashkovskiy et al. | |
| 7,690,020 B2 | 3/2010 | Lebar | |

(56) References Cited

U.S. PATENT DOCUMENTS

| | | |
|---|---|---|
| 7,698,723 B2 | 4/2010 | Hicks, III et al. |
| 7,703,041 B2 | 4/2010 | Ito et al. |
| 7,716,703 B2 | 5/2010 | Sheldon |
| 7,720,707 B1 | 5/2010 | Mowry |
| 7,725,740 B2 | 5/2010 | Kudelski et al. |
| 7,735,107 B2 | 6/2010 | Ellis et al. |
| 7,761,899 B2 | 7/2010 | Buehl et al. |
| 7,774,819 B2 | 8/2010 | Perez |
| 7,788,695 B2 | 8/2010 | Walter et al. |
| 7,801,303 B2 | 9/2010 | Dulac |
| 7,801,838 B2 | 9/2010 | Colbath et al. |
| 7,801,910 B2 | 9/2010 | Houh et al. |
| 7,814,519 B2 | 10/2010 | Rao et al. |
| 7,823,183 B2 | 10/2010 | Mickle et al. |
| 7,827,585 B2 | 11/2010 | Hassell et al. |
| 7,831,512 B2 | 11/2010 | Akadiri |
| 7,835,920 B2 | 11/2010 | Snyder et al. |
| 7,836,466 B2 | 11/2010 | Marsh |
| 7,873,978 B2 | 1/2011 | Ellis et al. |
| 7,885,963 B2 | 2/2011 | Sanders |
| 7,900,229 B2 | 3/2011 | Dureau |
| 7,904,924 B1 | 3/2011 | de Heer et al. |
| 7,908,273 B2 | 3/2011 | DiMaria et al. |
| 7,908,626 B2 | 3/2011 | Williamson et al. |
| 7,917,933 B2 | 3/2011 | Thomas et al. |
| 7,921,448 B2 | 4/2011 | Fickle et al. |
| 7,925,973 B2 | 4/2011 | Allaire et al. |
| 7,926,079 B2 | 4/2011 | Lebar |
| 7,941,819 B2 | 5/2011 | Stark et al. |
| 7,945,929 B2 | 5/2011 | Knudson et al. |
| 7,949,722 B1 | 5/2011 | Ullman et al. |
| 7,950,033 B2 | 5/2011 | Pierre et al. |
| 7,962,414 B1 | 6/2011 | Allibhoy et al. |
| 7,974,962 B2 | 7/2011 | Krakirian et al. |
| 7,987,492 B2 | 7/2011 | Liwerant et al. |
| 7,996,861 B1 | 8/2011 | Delpuch |
| 8,006,263 B2* | 8/2011 | Ellis ............... H04N 5/44582 725/38 |
| 8,010,984 B2 | 8/2011 | Thukral |
| 8,010,988 B2 | 8/2011 | Cox |
| 8,015,584 B2 | 9/2011 | Breen et al. |
| 8,020,187 B2 | 9/2011 | Cox |
| 8,042,132 B2 | 10/2011 | Carney et al. |
| 8,046,788 B2 | 10/2011 | Durden et al. |
| 8,046,801 B2 | 10/2011 | Ellis et al. |
| 8,046,804 B2 | 10/2011 | Kelts |
| 8,051,450 B2 | 11/2011 | Robarts et al. |
| 8,090,605 B2 | 1/2012 | Tota et al. |
| 8,107,786 B2 | 1/2012 | Sardera |
| 8,112,776 B2 | 2/2012 | Schein et al. |
| 8,122,034 B2 | 2/2012 | Aravamudan et al. |
| 8,151,290 B1 | 4/2012 | Ujihara |
| 8,181,201 B2 | 5/2012 | Goldenberg et al. |
| 8,191,098 B2 | 5/2012 | Cooper et al. |
| 8,205,237 B2 | 6/2012 | Cox |
| 8,209,337 B2 | 6/2012 | Park |
| 8,214,254 B1 | 7/2012 | Mowry |
| 8,219,446 B1 | 7/2012 | Mowry |
| 8,249,924 B1 | 8/2012 | Mowry |
| 8,272,019 B2 | 9/2012 | Ellis et al. |
| 8,312,490 B2 | 11/2012 | Yap et al. |
| 8,315,949 B2 | 11/2012 | Akadiri |
| 8,316,389 B2 | 11/2012 | Wong et al. |
| 8,321,892 B1 | 11/2012 | Malaby |
| 8,327,399 B2 | 12/2012 | Noll et al. |
| 8,332,268 B2 | 12/2012 | Carruthers et al. |
| 8,340,994 B2 | 12/2012 | Tota et al. |
| 8,346,605 B2 | 1/2013 | Krikorian et al. |
| 8,352,983 B1 | 1/2013 | Chane et al. |
| 8,365,230 B2 | 1/2013 | Chane et al. |
| 8,375,408 B2 | 2/2013 | Bachet et al. |
| 8,387,093 B2 | 2/2013 | Danker et al. |
| 8,397,255 B2 | 3/2013 | Wachtfogel et al. |
| 8,429,702 B2 | 4/2013 | Yasrebi et al. |
| 8,434,118 B2 | 4/2013 | Gonder et al. |
| 8,448,215 B2 | 5/2013 | Hassell et al. |
| 8,464,302 B1 | 6/2013 | Liwerant et al. |
| 8,473,868 B1 | 6/2013 | Kauffman |
| 8,479,246 B2 | 7/2013 | Hudson et al. |
| 8,566,871 B2 | 10/2013 | Knowles et al. |
| 8,566,875 B2 | 10/2013 | Haeuser et al. |
| 8,621,512 B2 | 12/2013 | Ellis et al. |
| 8,621,541 B2 | 12/2013 | Ullman et al. |
| 8,635,643 B2 | 1/2014 | Gray et al. |
| 8,635,649 B2 | 1/2014 | Ward, III et al. |
| 8,644,354 B2* | 2/2014 | George ............ H04M 1/72415 370/522 |
| 8,650,125 B2 | 2/2014 | Akadiri |
| 8,650,601 B2 | 2/2014 | Allegrezza et al. |
| 8,677,409 B2 | 3/2014 | Yu |
| 8,682,794 B2 | 3/2014 | Akadiri |
| 8,683,518 B2 | 3/2014 | Cuttner et al. |
| 8,688,582 B2 | 4/2014 | Akadiri |
| 8,700,448 B2 | 4/2014 | Bertram et al. |
| 8,707,354 B1 | 4/2014 | Moreau et al. |
| 8,713,595 B2 | 4/2014 | Lemmons et al. |
| 8,739,052 B2 | 5/2014 | Ostojic et al. |
| 8,739,221 B2 | 5/2014 | Silver et al. |
| 8,755,666 B2 | 6/2014 | Ellis et al. |
| 8,843,978 B2 | 9/2014 | Hardin |
| 8,843,989 B2 | 9/2014 | Manthoulis |
| 8,850,481 B2 | 9/2014 | Shannon et al. |
| 8,955,029 B2 | 2/2015 | Lewis |
| 8,997,136 B2 | 3/2015 | Brooks et al. |
| 9,009,773 B1 | 4/2015 | Hendricks et al. |
| 9,047,626 B2 | 6/2015 | Akadiri |
| 9,055,319 B2 | 6/2015 | Ellis et al. |
| 9,055,325 B2 | 6/2015 | Gaydou et al. |
| 9,066,118 B2 | 6/2015 | Diaz Perez |
| 9,078,016 B2 | 7/2015 | Diaz Perez |
| 9,106,959 B2 | 8/2015 | Diaz Perez |
| 9,113,228 B2 | 8/2015 | Diaz Perez |
| 9,117,228 B1 | 8/2015 | Akadiri |
| 9,160,976 B2 | 10/2015 | McCarthy et al. |
| 9,178,693 B2 | 11/2015 | Ficco |
| 9,191,709 B2 | 11/2015 | Schiller et al. |
| 9,225,761 B2 | 12/2015 | Ficco |
| 9,232,275 B2 | 1/2016 | Perez |
| 9,292,866 B2 | 3/2016 | Allaire et al. |
| 9,294,799 B2 | 3/2016 | Thomas et al. |
| 9,338,511 B2 | 5/2016 | Perez |
| 9,338,512 B1 | 5/2016 | Perez |
| 9,349,136 B2 | 5/2016 | Akadiri |
| 9,351,045 B2 | 5/2016 | Steinberg et al. |
| 9,369,741 B2 | 6/2016 | Ellis |
| 9,386,340 B2 | 7/2016 | Perez |
| 9,396,212 B2 | 7/2016 | Haberman |
| 9,414,121 B1 | 8/2016 | Farber et al. |
| 9,451,310 B2 | 9/2016 | Akadiri |
| 9,456,241 B2 | 9/2016 | Bayrakeri et al. |
| 9,491,511 B2 | 11/2016 | Perez |
| 9,491,512 B2 | 11/2016 | Perez |
| 9,565,387 B2 | 2/2017 | Brodersen et al. |
| 9,578,376 B2 | 2/2017 | Perez |
| 9,602,512 B2 | 3/2017 | Haeuser et al. |
| 9,635,395 B2 | 4/2017 | Perez |
| 9,635,408 B2 | 4/2017 | Akadiri |
| 9,635,423 B2 | 4/2017 | Perez |
| 9,635,429 B2 | 4/2017 | Perez |
| 9,641,896 B2 | 5/2017 | Perez |
| 9,641,902 B2 | 5/2017 | Perez |
| 9,648,388 B2 | 5/2017 | Perez |
| 9,648,390 B2 | 5/2017 | Perez |
| 9,654,833 B2 | 5/2017 | Perez |
| 9,674,586 B2 | 6/2017 | Gordon et al. |
| 9,866,909 B2 | 1/2018 | Perez |
| 9,866,910 B2 | 1/2018 | Perez |
| 9,888,287 B2 | 2/2018 | Perez |
| 9,888,288 B2 | 2/2018 | Perez |
| 9,894,417 B2 | 2/2018 | Perez |
| 9,894,419 B2 | 2/2018 | Perez |
| 9,936,240 B2 | 4/2018 | Perez |
| 9,973,825 B2 | 5/2018 | Perez |
| 9,998,791 B2 | 6/2018 | Perez |

(56) References Cited

U.S. PATENT DOCUMENTS

| | | |
|---|---|---|
| 10,028,026 B2 | 7/2018 | Perez |
| 10,028,027 B2 | 7/2018 | Perez |
| 10,045,084 B2 | 8/2018 | Perez |
| 10,057,649 B2 | 8/2018 | Perez |
| 10,129,597 B2 | 11/2018 | Perez |
| 10,129,598 B2 | 11/2018 | Perez |
| 10,149,015 B2 | 12/2018 | Perez |
| 10,154,296 B2 | 12/2018 | Perez |
| 10,264,303 B2 | 4/2019 | Perez |
| 10,277,937 B2 | 4/2019 | Perez |
| 10,306,321 B2 | 5/2019 | Perez |
| 10,341,699 B2 | 7/2019 | Perez |
| 10,341,730 B2 | 7/2019 | Perez |
| 10,349,101 B2 | 7/2019 | Perez |
| 10,375,428 B2 | 8/2019 | Perez |
| 10,491,954 B2 | 11/2019 | Perez |
| 10,491,955 B2 | 11/2019 | Perez |
| 10,506,269 B2 | 12/2019 | Perez |
| 10,536,750 B2 | 1/2020 | Perez |
| 10,536,751 B2 | 1/2020 | Perez |
| 10,555,014 B2 | 2/2020 | Perez |
| 10,560,733 B2 | 2/2020 | Perez |
| 10,567,846 B2 | 2/2020 | Perez |
| 10,582,243 B2 | 3/2020 | Perez |
| 10,623,793 B2 | 4/2020 | Perez |
| 2001/0018771 A1* | 8/2001 | Walker ............... H04N 21/2543 725/91 |
| 2001/0030667 A1 | 10/2001 | Kelts |
| 2001/0033736 A1 | 10/2001 | Yap |
| 2001/0049625 A1 | 12/2001 | Mowry |
| 2001/0052132 A1* | 12/2001 | Fryer ..................... G09B 5/02 725/105 |
| 2002/0007485 A1 | 1/2002 | Rodriguez et al. |
| 2002/0019763 A1 | 2/2002 | Linden et al. |
| 2002/0042921 A1 | 4/2002 | Ellis et al. |
| 2002/0045960 A1 | 4/2002 | Phillips et al. |
| 2002/0047899 A1 | 4/2002 | Son et al. |
| 2002/0049971 A1 | 4/2002 | Augenbraun et al. |
| 2002/0054068 A1 | 5/2002 | Ellis et al. |
| 2002/0056104 A1* | 5/2002 | Burnhouse ......... H04N 21/4314 725/39 |
| 2002/0057297 A1 | 5/2002 | Grimes et al. |
| 2002/0057892 A1 | 5/2002 | Mano et al. |
| 2002/0057893 A1 | 5/2002 | Wood et al. |
| 2002/0059610 A1 | 5/2002 | Ellis |
| 2002/0059621 A1 | 5/2002 | Thomas et al. |
| 2002/0066101 A1 | 5/2002 | Gordon et al. |
| 2002/0066106 A1 | 5/2002 | Kanojia et al. |
| 2002/0069218 A1 | 6/2002 | Sull et al. |
| 2002/0078456 A1 | 6/2002 | Hudson |
| 2002/0083124 A1 | 6/2002 | Knox et al. |
| 2002/0083451 A1 | 6/2002 | Gill |
| 2002/0087661 A1 | 7/2002 | Matichuk et al. |
| 2002/0088009 A1 | 7/2002 | Dudkiewicz et al. |
| 2002/0088010 A1 | 7/2002 | Dudkiewicz et al. |
| 2002/0092019 A1 | 7/2002 | Marcus |
| 2002/0104099 A1* | 8/2002 | Novak ............... H04N 21/4622 725/136 |
| 2002/0120925 A1 | 8/2002 | Logan |
| 2002/0138619 A1 | 9/2002 | Ramaley et al. |
| 2002/0138843 A1 | 9/2002 | Samaan et al. |
| 2002/0138844 A1 | 9/2002 | Otenasek |
| 2002/0143629 A1 | 10/2002 | Mineyama et al. |
| 2002/0144273 A1 | 10/2002 | Reto |
| 2002/0147975 A1 | 10/2002 | Seo |
| 2002/0151327 A1 | 10/2002 | Levitt et al. |
| 2002/0152224 A1 | 10/2002 | Roth et al. |
| 2002/0152318 A1 | 10/2002 | Menon et al. |
| 2002/0163532 A1* | 11/2002 | Thomas ............. H04N 21/8455 715/723 |
| 2002/0174430 A1 | 11/2002 | Ellis et al. |
| 2002/0184634 A1* | 12/2002 | Cooper ............. H04N 21/4316 725/51 |
| 2002/0184635 A1 | 12/2002 | Istvan |
| 2002/0194194 A1 | 12/2002 | Fenton et al. |
| 2002/0196268 A1 | 12/2002 | Wolff et al. |
| 2002/0199188 A1 | 12/2002 | Sie et al. |
| 2002/0199194 A1 | 12/2002 | Ali |
| 2003/0009542 A1* | 1/2003 | Kasal ..................... H04N 7/163 709/222 |
| 2003/0016940 A1 | 1/2003 | Robbins |
| 2003/0018971 A1* | 1/2003 | McKenna, Jr. ........ H04N 21/84 725/40 |
| 2003/0037010 A1 | 2/2003 | Schmelzer |
| 2003/0055893 A1 | 3/2003 | Sato et al. |
| 2003/0066068 A1 | 4/2003 | Gutta et al. |
| 2003/0084126 A1 | 5/2003 | Kumar et al. |
| 2003/0084449 A1* | 5/2003 | Chane ................. H04N 21/482 725/46 |
| 2003/0093790 A1 | 5/2003 | Logan et al. |
| 2003/0101451 A1 | 5/2003 | Bentolila et al. |
| 2003/0110506 A1 | 6/2003 | Kim |
| 2003/0112467 A1 | 6/2003 | McCollum et al. |
| 2003/0113100 A1 | 6/2003 | Hecht et al. |
| 2003/0126605 A1 | 7/2003 | Betz et al. |
| 2003/0149612 A1 | 8/2003 | Berghofer et al. |
| 2003/0149975 A1 | 8/2003 | Eldering et al. |
| 2003/0149981 A1 | 8/2003 | Finster et al. |
| 2003/0151621 A1 | 8/2003 | McEvilly et al. |
| 2003/0154128 A1 | 8/2003 | Liga |
| 2003/0154475 A1 | 8/2003 | Rodriguez et al. |
| 2003/0163375 A1 | 8/2003 | Dombrowski et al. |
| 2003/0167449 A1 | 9/2003 | Warren |
| 2003/0167471 A1* | 9/2003 | Roth ................. H04N 21/4622 725/87 |
| 2003/0191816 A1 | 10/2003 | Landress |
| 2003/0204856 A1 | 10/2003 | Buxton |
| 2003/0208756 A1 | 11/2003 | Macrae et al. |
| 2003/0226150 A1 | 12/2003 | Berberet |
| 2003/0229898 A1 | 12/2003 | Babu et al. |
| 2003/0234819 A1 | 12/2003 | Daly |
| 2004/0015989 A1* | 1/2004 | Kaizu .................. G11B 15/023 725/39 |
| 2004/0015998 A1 | 1/2004 | Bokor |
| 2004/0046801 A1 | 3/2004 | Lin et al. |
| 2004/0049788 A1* | 3/2004 | Mori ................. H04N 21/47214 725/58 |
| 2004/0073919 A1 | 4/2004 | Gutta et al. |
| 2004/0076936 A1 | 4/2004 | Horvitz et al. |
| 2004/0078825 A1 | 4/2004 | Murphy |
| 2004/0080528 A1 | 4/2004 | Rand et al. |
| 2004/0103120 A1 | 5/2004 | Fickle et al. |
| 2004/0117831 A1 | 6/2004 | Ellis et al. |
| 2004/0117844 A1* | 6/2004 | Karaoguz .......... H04N 21/4882 725/112 |
| 2004/0133918 A1 | 7/2004 | Danker |
| 2004/0136698 A1 | 7/2004 | Mock |
| 2004/0143850 A1 | 7/2004 | Costa |
| 2004/0148626 A1 | 7/2004 | Sakao et al. |
| 2004/0158855 A1* | 8/2004 | Gu ..................... H04N 5/44582 725/39 |
| 2004/0172419 A1 | 9/2004 | Morris et al. |
| 2004/0194141 A1 | 9/2004 | Sanders |
| 2004/0205816 A1* | 10/2004 | Barrett ............... H04N 21/2668 725/49 |
| 2004/0221325 A1 | 11/2004 | Nakajima et al. |
| 2004/0231004 A1 | 11/2004 | Seo |
| 2004/0261096 A1 | 12/2004 | Matz |
| 2004/0268250 A1 | 12/2004 | Danker |
| 2004/0268413 A1 | 12/2004 | Reid et al. |
| 2005/0044577 A1 | 2/2005 | Jerding |
| 2005/0049933 A1 | 3/2005 | Upendran et al. |
| 2005/0050218 A1 | 3/2005 | Sheldon |
| 2005/0071328 A1 | 3/2005 | Lawrence |
| 2005/0081237 A1 | 4/2005 | Chen |
| 2005/0097600 A1 | 5/2005 | Heer |
| 2005/0097622 A1* | 5/2005 | Zigmond ............ H04N 21/462 725/135 |
| 2005/0097623 A1 | 5/2005 | Tecot |
| 2005/0125307 A1 | 6/2005 | Hunt et al. |
| 2005/0129049 A1 | 6/2005 | Srinivasan et al. |

(56) References Cited

U.S. PATENT DOCUMENTS

| | | | |
|---|---|---|---|
| 2005/0138560 A1* | 6/2005 | Lee | H04N 21/2547 715/719 |
| 2005/0149987 A1 | 7/2005 | Boccon-Gibod et al. | |
| 2005/0154679 A1 | 7/2005 | Bielak | |
| 2005/0160458 A1 | 7/2005 | Baumgartner | |
| 2005/0160465 A1* | 7/2005 | Walker | H04N 21/2393 725/86 |
| 2005/0166230 A1 | 7/2005 | Gaydou et al. | |
| 2005/0188415 A1 | 8/2005 | Riley | |
| 2005/0193015 A1 | 9/2005 | Logston | |
| 2005/0203918 A1 | 9/2005 | Holbrook | |
| 2005/0204388 A1 | 9/2005 | Knudson et al. | |
| 2005/0210524 A1 | 9/2005 | Dolph | |
| 2005/0216941 A1 | 9/2005 | Flanagan et al. | |
| 2005/0229209 A1 | 10/2005 | Hildebolt et al. | |
| 2005/0229227 A1 | 10/2005 | Rogers | |
| 2005/0234992 A1 | 10/2005 | Haberman | |
| 2005/0235209 A1 | 10/2005 | Morita et al. | |
| 2005/0235318 A1 | 10/2005 | Grauch et al. | |
| 2005/0235319 A1* | 10/2005 | Carpenter | H04N 21/47815 725/52 |
| 2005/0239546 A1 | 10/2005 | Hedrick | |
| 2005/0240961 A1 | 10/2005 | Jerding et al. | |
| 2005/0240963 A1 | 10/2005 | Preisman et al. | |
| 2005/0240968 A1 | 10/2005 | Knudson et al. | |
| 2005/0246752 A1 | 11/2005 | Liwerant et al. | |
| 2005/0267818 A1 | 12/2005 | Kaplan | |
| 2005/0283800 A1* | 12/2005 | Ellis | H04N 21/8173 725/40 |
| 2005/0289151 A1 | 12/2005 | Burke | |
| 2006/0004914 A1* | 1/2006 | Kelly | G06Q 30/00 709/219 |
| 2006/0015925 A1 | 1/2006 | Logan | |
| 2006/0020662 A1 | 1/2006 | Robinson | |
| 2006/0029093 A1 | 2/2006 | Van Rossum | |
| 2006/0085830 A1 | 4/2006 | Bruck et al. | |
| 2006/0123455 A1 | 6/2006 | Pai | |
| 2006/0155850 A1* | 7/2006 | Ma | H04L 29/06 709/226 |
| 2006/0174260 A1* | 8/2006 | Gutta | H04N 21/4755 725/13 |
| 2006/0200556 A1 | 9/2006 | Brave et al. | |
| 2006/0230427 A1 | 10/2006 | Kunkel et al. | |
| 2006/0242665 A1 | 10/2006 | Knee et al. | |
| 2006/0267995 A1 | 11/2006 | Radloff et al. | |
| 2006/0287916 A1 | 12/2006 | Starr et al. | |
| 2007/0016530 A1 | 1/2007 | Stasi et al. | |
| 2007/0038567 A1 | 2/2007 | Allaire et al. | |
| 2007/0039023 A1 | 2/2007 | Kataoka | |
| 2007/0078832 A1 | 4/2007 | Ott, IV et al. | |
| 2007/0083895 A1 | 4/2007 | McCarthy et al. | |
| 2007/0157221 A1 | 7/2007 | Ou et al. | |
| 2007/0157249 A1 | 7/2007 | Cordray et al. | |
| 2007/0198532 A1 | 8/2007 | Krikorian et al. | |
| 2007/0199041 A1 | 8/2007 | Noll et al. | |
| 2007/0214482 A1 | 9/2007 | Nguyen | |
| 2007/0245399 A1 | 10/2007 | Espelien | |
| 2007/0250864 A1 | 10/2007 | Diaz Perez | |
| 2008/0022298 A1 | 1/2008 | Cavicchia | |
| 2008/0040767 A1 | 2/2008 | McCarthy et al. | |
| 2008/0066125 A1 | 3/2008 | Li et al. | |
| 2008/0072260 A1* | 3/2008 | Rosin | H04N 21/4438 725/56 |
| 2008/0127257 A1* | 5/2008 | Kvache | H04M 1/72406 725/39 |
| 2008/0141325 A1* | 6/2008 | Ludvig | H04N 21/4725 725/116 |
| 2008/0148317 A1 | 6/2008 | Opaluch | |
| 2008/0155613 A1 | 6/2008 | Benya et al. | |
| 2008/0163292 A1 | 7/2008 | Stallworth | |
| 2008/0163330 A1* | 7/2008 | Sparrell | H04N 21/41407 725/142 |
| 2008/0189749 A1* | 8/2008 | White | H04N 21/47202 725/87 |
| 2008/0220859 A1 | 9/2008 | Haeuser et al. | |
| 2008/0222687 A1 | 9/2008 | Edry | |
| 2008/0276277 A1 | 11/2008 | Ahn et al. | |
| 2008/0301746 A1 | 12/2008 | Wiser et al. | |
| 2009/0158334 A1* | 6/2009 | Rodriguez | H04N 21/478 725/42 |
| 2010/0138863 A1 | 6/2010 | Diaz Perez | |
| 2010/0153997 A1 | 6/2010 | Baumgartner et al. | |
| 2010/0153999 A1* | 6/2010 | Yates | H04N 21/482 725/39 |
| 2010/0175090 A1 | 7/2010 | Cordray | |
| 2010/0211975 A1* | 8/2010 | Boyer | H04N 21/84 725/40 |
| 2010/0319040 A1 | 12/2010 | Diaz Perez | |
| 2010/0325655 A1 | 12/2010 | Perez | |
| 2011/0030012 A1 | 2/2011 | Diaz Perez | |
| 2011/0030013 A1 | 2/2011 | Diaz Perez | |
| 2011/0166918 A1 | 7/2011 | Allaire et al. | |
| 2011/0191163 A1 | 8/2011 | Allaire et al. | |
| 2013/0125158 A1* | 5/2013 | Brown | G06Q 30/02 725/14 |
| 2013/0254804 A1 | 9/2013 | Diaz Perez | |
| 2013/0254809 A1 | 9/2013 | Diaz Perez | |
| 2013/0254814 A1 | 9/2013 | Diaz Perez | |
| 2014/0344859 A1 | 11/2014 | Krikorian et al. | |
| 2015/0128192 A1 | 5/2015 | Diaz Perez | |
| 2015/0237403 A1 | 8/2015 | Perez | |
| 2015/0245099 A1 | 8/2015 | Perez | |
| 2015/0264440 A1 | 9/2015 | Perez | |
| 2015/0281792 A1 | 10/2015 | Gaydou et al. | |
| 2015/0358649 A1 | 12/2015 | Perez | |
| 2015/0358682 A1 | 12/2015 | Perez | |
| 2015/0358683 A1 | 12/2015 | Perez | |
| 2016/0094870 A1 | 3/2016 | Drope | |
| 2017/0257677 A1 | 9/2017 | Perez | |
| 2017/0295387 A1 | 10/2017 | Akadiri | |
| 2019/0306544 A1 | 10/2019 | Perez | |
| 2019/0342586 A1 | 11/2019 | Perez | |
| 2020/0068231 A1 | 2/2020 | Perez | |
| 2020/0092612 A1 | 3/2020 | Perez | |
| 2020/0137427 A1 | 4/2020 | Perez | |
| 2020/0169772 A1 | 5/2020 | Perez | |
| 2020/0177963 A1 | 6/2020 | Perez | |
| 2020/0195993 A1 | 6/2020 | Perez | |
| 2020/0204846 A1 | 6/2020 | Perez | |

FOREIGN PATENT DOCUMENTS

| | | |
|---|---|---|
| EP | 1 164 796 A1 | 12/2001 |
| EP | 1283639 A1 | 2/2003 |
| EP | 1 361 759 A1 | 11/2003 |
| EP | 1577746 A2 | 9/2005 |
| JP | 07-284035 | 10/1995 |
| JP | H9-102827 A | 4/1997 |
| JP | H10-79930 A | 3/1998 |
| JP | H10-155131 A | 6/1998 |
| JP | 11-150692 | 6/1999 |
| JP | 2002347512 A | 12/2002 |
| JP | 03-116121 | 4/2003 |
| WO | 89/12896 A1 | 12/1989 |
| WO | 90/15507 A1 | 12/1990 |
| WO | 9406084 A1 | 3/1994 |
| WO | 1995/032585 A1 | 11/1995 |
| WO | 97/18636 A2 | 5/1997 |
| WO | 98/10589 A1 | 3/1998 |
| WO | 1999/03271 A1 | 1/1999 |
| WO | 99/10822 A1 | 3/1999 |
| WO | 99/41684 A1 | 8/1999 |
| WO | 9950778 A1 | 10/1999 |
| WO | 2000008855 A1 | 2/2000 |
| WO | 2000/027122 A1 | 5/2000 |
| WO | 2000055794 A2 | 9/2000 |
| WO | 2000/075845 A2 | 12/2000 |
| WO | 01/010124 A1 | 2/2001 |
| WO | 01/10127 A1 | 2/2001 |
| WO | WO01022688 | 3/2001 |
| WO | 200135662 A1 | 5/2001 |
| WO | WO01038960 | 5/2001 |

(56) References Cited

FOREIGN PATENT DOCUMENTS

| WO | 2001099416 A2 | 12/2001 |
|---|---|---|
| WO | 2002008948 A2 | 1/2002 |
| WO | 2003026275 A1 | 3/2003 |
| WO | 03/052572 A1 | 6/2003 |
| WO | WO03052572 | 6/2003 |
| WO | WO03069457 | 8/2003 |
| WO | 2004051453 A1 | 6/2004 |
| WO | 2004064296 A1 | 7/2004 |
| WO | 2004064377 A2 | 7/2004 |
| WO | 2004/102285 A2 | 11/2004 |
| WO | WO 2007/021974 A2 | 2/2007 |
| WO | 2007078634 A1 | 7/2007 |

OTHER PUBLICATIONS

U.S. Appl. No. 15/664,655, filed Jul. 31, Issued as U.S. Pat. No. 10,129,597.
U.S. Appl. No. 16/730,028, filed Dec. 30, 2019, Allowed Jun. 10. 2021
U.S. Appl. No. 17/248,063, filed Jan. 7, 2021, Pending.
U.S. Appl. No. 16/671,968, filed Nov. 1, 2019, Allowed Apr. 22, 2021.
U.S. Appl. No. 16/730,053, filed Dec. 30, 2019, Allowed Mar. 29, 2021.
U.S. Appl. No. 16/947,320, filed Jul. 28, 2020, Allowed Jun. 7, 2021.
U.S. Appl. No. 16/948,600, filed Sep. 24, 2020, Allowed Jun. 4, 2021.
U.S. Appl. No. 17/206,409, filed Mar. 19, 2021, Pending.
U.S. Appl. No. 17/248,302, filed Jan. 19, 2021, Pending.
U.S. Appl. No. 16/210,798, filed Nov. 5, 2018, Issued as U.S. Pat. No. 10,560,733.
U.S. Appl. No. 17/285,432, filed Feb. 26, 2019, Issued as U.S. Pat. No. 10,582,243.
U.S. Appl. No. 16/777,468, filed Jan. 30, 2020, RCE filed Jun. 3, 2021.
U.S. Appl. No. 16/785,224, filed Feb. 7, 2020, Allowed Jun. 9, 2021.
U.S. Appl. No. 16/803,496, filed Feb. 27, 2020, RCE filed Jun. 3, 2021.
U.S. Appl. No. 16/803,523, filed Feb. 27, 2020, Allowed Mar. 22, 2021.
*Broadband iTV, Inc. v. Hawaiian Telcom, Inc., et al.*, No. 14-cv-00169 (D. Haw. 2014), filed Apr. 9, 2014, Summary Judgment entered in favor of Hawaiian Telcom, Inc. based on 35 U.S.C. 101; Federal Circuit affirmance, without opinion, of Summary Judgment in favor of Hawaiian Telcom, Inc. Sept 26, 2016; Petition to U.S. Supreme Court for Writ of Certiorari Apr. 13, 2017; Petition Denied May 22, 2017 (litigation terminated).
*Broadband iTV, Inc. v. AT&T Services, Inc. et al.*, No. 6-19-cv-00712 (W.D. Tex. 2019), filed Dec. 17, 2019, Asserted Patents: U.S. Pat. No. 10,028,026 (CIP1-D9); U.S. Pat. No. 10,349,101 (CIP1-D12); U.S. Pat. No. 9,998,791 (P1-D15); and U.S. Pat. No. 9,648,388 (P1-D13); Answer to Complaint filed Feb. 24, 2020; Answer to Counterclaims filed Mar. 13, 2020; Order transferring case to Austin Division Jul. 4, 2020, No. 1:20-cv-00717.
*Broadband iTV, Inc. v. DirecTV, LLC f/k/a DirecTV, Inc.*, No. 6-19-cv-00714 (W.D. Tex. 2019, filed Dec. 19, 2019, Asserted Patents: U.S. Pat. No. 10,028,026 (CIP1-D9); U.S. Pat. No. 10,506,269 (CIP1-D14); U.S. Pat. No. 9,998,791 (P1-D15); and U.S. Pat. No. 9,648,388 (P1-D13); Answer to Complaint filed Feb. 24, 2020; Answer to Counterclaims filed Mar. 13, 2020; Case Consolidated with 6-19-cv-00712 on Apr. 15, 2020.
*Broadband iTV, Inc. v. DISH Network LLC*, No. 6-19-cv-00716 (W.D. Tex. 2019), filed Dec. 19, 2019, Asserted Patents: U.S. Pat. No. 10,028,026 (CIP1-D9); U.S. Pat. No. 10,506,269 (CIP1-D14); U.S. Pat. No. 9,998,791 (P1-D15); and U.S. Pat. No. 9,648,388 (P1-D13); Order Denying Dish's Motion to Dismiss Without Prejudice issued Jul. 25, 1925; Answer to Complaint filed Aug. 10, 2020; Claim Construction Order Adopting each of BBiTV's Claim Constructions issued Nov. 20, 2020; Order Denying Dish Network LLC's Corrected Motion to Transfer Case issued Apr. 20, 2021; Discovery ongoing.
*Broadband iTV, Inc. v. AT&T Services, Inc. et al.*, No. 1:20-cv-00717 (W.D. Tex 2020), filed Dec. 17, 2017, Asserted Patents: U.S. Pat. No. 10,028,026 (CIP1)-D9); U.S. Pat. No. 10,349,101 (CIP1-12); U.S. Pat. No. 10,506,269 (CIP1-D-14); U.S. Pat. No. 9,998,791 (P1-D15); and U.S. Pat. No. 9,648,388 (P1-D13); *Broadband iTV, Inc. v. DirecTV, LLC f/k/a DirecTV, Inc.*, No. 1:20-cv-00717 (W.D. Tex. 2020), Case transferred to Austin Division from Waco Division on Jul. 6, 2020, Claim Construction Order Adopting each of BBiTV's Claim Constructions issued Nov. 20, 2020; First Amended Answer and Counterclaims filed by AT&T Services, Inc. filed Feb. 4, 2021; Second Amended Answer filed by AT&T Communications, LLC filed Feb. 4, 2021; First Amended Answer and Counterclaims filed by DirecTV, LLC filed Feb. 4, 2021; Answer to Counterclaims to AT&T Service Inc.'s First Amended Counterclaims First Amended Counterclaims filed by Broadband iTV, Inc. filed Feb. 25, 2021; filed by Broadband iTV, Inc. filed Feb. 25, 2021; Briefing on Defendant's Opposed Motion for Reconsideration of the Court's Claim Construction Order on the "Was Uploaded" Terms of the '388, '026, and '269 Patents Based on Newly Discovered Evidence ongoing; Briefing on AT&T's Motion for Partial Summary Judgment of No Written Description Support for the Asserted Claims of the '388 and '791 Patents and Invalidity for Anticipation ongoing; Discovery ongoing.
*Broadband iTV, Inc. v. Amazon.com Services, Inc. et al.*, No. 6:20-cv-00921 (W.D. Tex. 2020), filed Oct. 16, 2020, Asserted Patents: U.S. Pat. No. 10,028,026 (CIP1-D9); U.S. Pat. No. 10,506,269 (CIP1-D14); U.S. Pat. No. 9,648,388 (P1-D13); U.S. Pat. No. 10,536,750 (P1-D27); U.S. Pat. No. 10,536,751 (P1-D28); U.S. Pat. No. 9,973,825 (CIP2-D12); Complaint filed Oct. 6, 2020; Answer to Complaint filed Dec. 11, 2020; Discovery ongoing.
*In re: DISH Network LLC*, No. 21-14, filed May 28, 2021, Asserted Patents: U.S. Pat. No. 10,028,026 (CIP1-D9); U.S. Pat. No. 10,506,269 (CIP1-D14); U.S. Pat. No. 9,998,791 (P1-D15); and U.S. Pat. No. 9,648,388 (P1-D13); Petition for Writ of Mandamus of DISH Network LLC's Corrected Motion to Transfer filed May 28, 2021; BBiTV's Response to the Petition for Writ of Mandamus of DISH Network LLC's Corrected Motion to Transfer filed Jun. 14, 2021.
IPR 2014-0122, *Unified Patents, Inc. v. Broadband iTV, Inc.* (*BBiTV*), filed Jul. 30, 2014, U.S. Pat. No. 7,631,336, BBiTV—Institution of IPR Denied by PTAB Jan. 5, 2015 (terminated).
CBM2014-00189, *Hawaiian Telecom Inc. v. Broadband iTV, Inc.* (*BBiTV*), filed Sep. 19, 2014, U.S. Pat. No. 7,631,336, BBiTV—Institution of CBM Denied by PTAB Apr. 1, 2015 (terminated).
IPR2020-01267, *DISH Network, L.L.C. v. Broadband iTV, Inc.* (*BBiTV*), filed Jul. 10, 2020, U.S. Pat. No. 10,028,026, Petition for IPR filed against claims 1-16; Institution of IPR Granted by PTAB Jan. 21, 2021; Decision Denying Patent Owner's Request for Rehearing of Decision on Institution Apr. 1, 2021; Patent Owner's Response filed May 10, 2021; Discovery ongoing.
IPR2020-01268, *DISH Network, L.L.C. Broadband iTV Inc.* (*BBiTV*), filed Jul. 10, 2020, U.S. Pat. No. 10,028,026, Petition for IPR filed against claims 1-16; Institution of IPR Denied by PTAB Jan. 21, 2021.
IPR2020-01280, *DISH Network, L.L.C. v. Broadband iTv, Inc.* (*BBiTV*), filed Jul. 20, 2020, U.S. Pat. No. 9,998,791, Petition for IPR filed against claims 1-3, 5-12, 14-18; Institution of IPR Granted by PTAB Feb. 4, 2021; Decision Denying Patent Owner's Request for Rehearing of Decision on Institution Apr. 1, 2021; Patent Owner's Response filed May 21, 2021; Discovery ongoing.
IPR2020-01332, *DISH Network, L.L.C. v. Broadband iTV, Inc.* (*BBiTV*), filed Jul. 24, 2020, U.S. Pat. No. 10,506,269, Petition for IPR filed against claims 1-17; Institution of IPR Granted by PTAB Jan. 27, 2021; Decision Denying Patent Request for Rehearing of Decision Granting Institution of *Inter Partes Review* Apr. 1, 2021; Patent Owner's Response filed May 12, 2021; Discovery ongoing.
IPR2020-01333, *DISH Network, L.L.C. v. Broadband iTV Inc.* (*BBiTV*), filed Jul. 24, 2020, U.S. Pat. 10,506,269, Petition for IPR filed against claims 1-17; Institution of IPR Denied by PTAB Jan. 1, 2021.

(56) References Cited

OTHER PUBLICATIONS

IPR2020-01359, *DISH Network, L.L.C.* v. *Broadband iTV, Inc. (BBiTV)*, filed Jul. 31, 2020, U.S. Pat. No. 9,648,388, Petition for IPR filed against claims 1-19, Decision Denying Patent Owner's Request for Rehearing of Decision on Institution Apr. 1, 2021, Patent Owner's Response filed May 21, 2021, Discovery ongoing.
IPR2020-01359, *DISH Network, L.L.C.* v. *Broadband iTV, Inc. (BBiTV)*, filed Jul. 31, 2020, U.S. Pat. No. 9,648,388, Petition for IPR filed against claims 1, 2, 5, 7-19; Institution of IPR Denied by PTAB Feb. 12, 2021.
IPR2021-00556, *AT&T Services, Inc. and DirecTV, LLC* v. *Broadband iTV, Inc. (BBiTV)*, filed Feb. 19, 2021, U.S. Pat. No. 10,028,026, Petition for IPR filed against claims 1-16; Motion for Joinder of *Inter Partes Review* IPR2020-01267 briefing ongoing; Patent Owner's Preliminary Response filed Jun. 15, 2021.
IPR2021-00603, *AT&T Services, Inc. and DirecTV, LLC* v. *Broadband iTV , Inc. (BBiTV)*, filed Mar. 4, 2021, U.S. Pat. No. 9,998,791, Petition for IPR filed against claims 1-3, 5-12, 14-18; Motion for Joinder of *Inter Partes Review* IPR2020-01280 briefing ongoing; Patent Owner's Preliminary Response filed Jun. 9, 2021.
IPR2021-00649, *AT&T Services, Inc. and DirecTV, LLC* v. *Broadband iTV, Inc. (BBiTV)*, filed Mar. 12, 2021, U.S. Pat. No. 9,648,388, Petition for IPR filed against claims 1-19; Motion for Joinder of *Inter Partes Review* IPR2020-01359 briefing ongoing.
Decision Granting Institution of Inter Partes Review, Paper No. 15, issued in Case No. IPR2020-01267 on Jan. 21, 2021.
Decision Denying Institution of Inter Partes Review, Paper No. 15, issued in Case No. IPR2020-01267 on Jan. 21, 2021.
Patent Owner's Request for Rehearing of the Decision Granting Institution of Inter Partes Review, Paper No. 18, filed in Case No. IPR2020-01267 on Feb. 3, 2021.
Decision Granting Institution of Inter Partes Review, Paper No. 14, issued in Case No. IPR2020-01332 on Jan. 27, 2021.
Decision Denying Institution of Inter Partes Review, Paper No. 14, issued in Case No. IPR2020-01333 on Jan. 27, 2021.
Patent Owner's Request for Rehearing of the Decision Granting Institution of Inter Partes Review, Paper No. 19, filed in Case No. IPR2020-01332 on Feb. 10, 2021.
Decision Granting Institution of Inter Partes Review, Paper No. 17, issued in Case No. IPR2020-01280 on Feb. 4, 2021.
Decision Denying Institution of Inter Partes Review, Paper No. 17, issued in Case No. IPR2020-01281 on Feb. 4, 2021.
Decision Granting Institution of Inter Partes Review, Paper No. 15, issued in Case No. IPR2020-01359 on Feb. 12, 2021.
Decision Denying Institution of Inter Partes Review, Paper No. 15, issued in Case No. IPR2020-01360 on Feb. 15, 2021.
Plaintiff Broadband iTV, Inc.'s Preliminary Infringement Contentions and Identification of Priority Dates served in *Broadband iTV, Inc.* v. *Amazon.com, Inc., Amazon.com LLC, and Amazon Web Services, Inc.*, Case No. 6:20-cv-00921-ADA, Served Feb. 1, 2021.
Exhibit 1 to Plaintiff Broadband iTV, Inc.'s Preliminary Infringement Contentions and Identification of Priority Dates served in *Broadband iTV, Inc.* v. *Amazon.com, Inc., Amazon.com LLC, and Amazon Web Services, Inc.*, Case No. 6:20-cv-00921-ADA, Served Feb. 1, 2021.
Exhibit 2 to Plaintiff Broadband iTV, Inc.'s Preliminary Infringement Contentions and Identification of Priority Dates served in *Broadband iTV, Inc.* v. *Amazon.com, Inc., Amazon.com LLC, and Amazon Web Services, Inc.*, Case No. 6:20-cv-00921-ADA, Served Feb. 1, 2021.
Exhibit 3 to Plaintiff Broadband iTV, Inc.'s Preliminary Infringement Contentions and Identification of Priority Dates served in *Broadband iTV, Inc.* v. *Amazon.com, Inc., Amazon.com LLC, and Amazon Web Services, Inc.*, Case No. 6:20-cv-00921-ADA, Served Feb. 1, 2021.
Exhibit 4 to Plaintiff Broadband iTV, Inc.'s Preliminary Infringement Contentions and Identification of Priority Dates served in *Broadband iTV, Inc.* v. *Amazon.com, Inc., Amazon.com LLC, and Amazon Web Services, Inc.*, Case No. 6:20-cv-00921-ADA, Served Feb. 1, 2021.
Exhibit 5 to Plaintiff Broadband iTV, Inc.'s Preliminary Infringement Contentions and Identification of Priority Dates served in *Broadband iTV, Inc.* v. *Amazon.com, Inc., Amazon.com LLC, and Amazon Web Services, Inc.*, Case No. 6:20-cv-00921-ADA, Served Feb. 1, 2021.
Exhibit 6 to Plaintiff Broadband iTV, Inc.'s Preliminary Infringement Contentions and Identification of Priority Dates served in *Broadband iTV, Inc.* v. *Amazon.com, Inc., Amazon.com LLC, and Amazon Web Services, Inc.*, Case No. 6:20-cv-00921-ADA, Served Feb. 1, 2021.
First Amended Answer and Counterclaims of AT&T Services, Inc. to Broadband iTV Inc.'s Complaint filed in *Broadband iTV, Inc.* v. *AT&T Services, Inc et al. and Broadband iTV, Inc.* v. *DirecTV, LLC*, Case No. 1-20-CV-00717, Docket No. 89, Filed Feb. 4, 2021.
First Amended Answer and Counterclaims of DirecTV, LLC to Broadband iTV Inc.'s Complaint filed in *Broadband iTV, Inc.* v. *AT&T Services, Inc et al. and Broadband iTV, Inc.* v. *DirecTV, LLC*, Case No. 1-20-cv-00717, Docket No. 90, Filed Feb. 4, 2021.
Second Amended Answer of AT&T Communications, LLC to Broadband iTV Inc.'s Complaint filed in *Broadband iTV, Inc.* v. *AT&T Services, Inc. et al. and Broadband iTV, Inc.* v. *DirecTV, LLC*, Case No. 1-20-cv-00717, Docket No. 92, Filed Feb. 4, 2021.
Final Invalidity Contentions of AT&T Services, Inc., AT&T Communications, LLC, and DirecTV, LLC served in *Broadband iTV, Inc.* v. *AT&T Services, Inc. et al. and Broadband iTV, Inc.* v. *DirecTV, LLC*, Case No. 1-20-cv-00717, Served Jan. 29, 2021.
Exhibit A-1 to Final Invalidity Contentions of AT&T Services, Inc., AT&T Communications, LLC, and DirecTV, LLC served in *Broadband iTV, Inc.* v. *AT&T Services, Inc. et al. and Broadband iTV, Inc.* v. *DirecTV, LLC*, Case No. 1-20-cv-00717, Served Jan. 29, 2021.
Exhibit A-2 to Final Invalidity Contentions of AT&T Services, Inc., AT&T Communications, LLC, and DirecTV, LLC served in *Broadband iTV, Inc.* v. *AT&T Services, Inc. et al. and Broadband iTV, Inc.* v. *DirecTV, LLC*, Case No. 1-20-cv-00717, Served Jan. 29, 2021.
Exhibit A-3 to Final Invalidity Contentions of AT&T Services, Inc., AT&T Communications, LLC, and DirecTV, LLC served in *Broadband iTV, Inc.* v. *AT&T Services, Inc. et al. and Broadband iTV, Inc.* v. *DirecTV, LLC*, Case No. 1-20-cv-00717, Served Jan. 29, 2021.
Exhibit A-4 to Final Invalidity Contentions of AT&T Services, Inc., AT&T Communications, LLC, and DirecTV, LLC served in *Broadband iTV, Inc.* v. *AT&T Services, Inc. et al. and Broadband iTV, Inc.* v. *DirecTV, LLC*, Case No. 1-20-cv-00717, Served Jan. 29, 2021.
Exhibit A-5 to Final Invalidity Contentions of AT&T Services, Inc., AT&T Communications, LLC, and DirecTV, LLC served in *Broadband iTV, Inc.* v. *AT&T Services, Inc. et al. and Broadband iTV, Inc.* v. *DirecTV, LLC*, Case No. 1-20-cv-00717, Served Jan. 29, 2021.
Exhibit A-6 to Final Invalidity Contentions of AT&T Services, Inc., AT&T Communications, LLC, and DirecTV, LLC served in *Broadband iTV, Inc.* v. *AT&T Services, Inc. et al. and Broadband iTV, Inc.* v. *DirecTV, LLC*, Case No. 1-20-cv-00717, Served Jan. 29, 2021.
Exhibit A-7 to Final Invalidity Contentions of AT&T Services, Inc., AT&T Communications, LLC, and DirecTV, LLC served in *Broadband iTV, Inc.* v. *AT&T Services, Inc. et al. and Broadband iTV, Inc.* v. *DirecTV, LLC*, Case No. 1-20-cv-00717, Served Jan. 29, 2021.
Exhibit A-8 to Final Invalidity Contentions of AT&T Services, Inc., AT&T Communications, LLC, and DirecTV, LLC served in *Broadband iTV, Inc.* v. *AT&T Services, Inc. et al. and Broadband iTV, Inc.* v. *DirecTV, LLC*, Case No. 1-20-cv-00717, Served Jan. 29, 2021.
Exhibit A-9 to Final Invalidity Contentions of AT&T Services, Inc., AT&T Communications, LLC, and DirecTV, LLC served in *Broadband iTV, Inc.* v. *AT&T Services, Inc. et al. and Broadband iTV, Inc.* v. *DirecTV, LLC*, Case No. 1-20-cv-00717, Served Jan. 29, 2021.
Exhibit A-10 to Final Invalidity Contentions of AT&T Services, Inc., AT&T Communications, LLC, and DirecTV, LLC served in *Broadband iTV, Inc.* v. *AT&T Services, Inc. et al. and Broadband iTV, Inc.* v. *DirecTV, LLC*, Case No. 1-20-cv-00717, Served Jan. 29, 2021.
Exhibit A-11 to Final Invalidity Contentions of AT&T Services, Inc., AT&T Communications, LLC, and DirecTV, LLC served in *Broadband iTV, Inc.* v. *AT&T Services, Inc. et al. and Broadband iTV, Inc.* v. *DirecTV, LLC*, Case No. 1-20-cv-00717, Served Jan. 29, 2021.

(56) References Cited

OTHER PUBLICATIONS

Exhibit A-12 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit A-13 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit A-14 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit A-15 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit A-16 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit A-19 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit B-1 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit B-2 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit B-3 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit B-4 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc.v. DirecTV, LLC,* Case No. 1-20-cv-00717, Served Jan. 29, 2021.
Exhibit B-5 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit B-6 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit B-7 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit B-8 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit B-9 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit B-10 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit B-11 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit B-12 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit B-13 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit B-14 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit C-1 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit C-2 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit C-3 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit C-4 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit C-5 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit C-6 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit C-7 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit C-8 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit C-9 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit C-10 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit C-11 to Final Invalidity Contentions of AT&T Services, Inc., AT&T Communications, LLC, and DirecTV, LLC served in *Broadband iTV, Inc. v. AT&T Services, Inc. et al. and Broadband iTV, Inc. v. DirecTV, LLC,* Case No. 1-20-cv-00717, Served Jan. 29, 2021.
Exhibit C-12 to Final Invalidity Contentions of AT&T Services, Inc., AT&T Communications, LLC, and DirecTV, LLC served in

(56) References Cited

OTHER PUBLICATIONS

*Broadband iTV, Inc.* v. *AT&T Services, Inc. et al. and Broadband iTV, Inc.* v. *DirecTV, LLC,* Case No. 1-20-cv-00717, Served Jan. 29, 2021.
Exhibit C-13 to Final Invalidity Contentions of AT&T Services, Inc., AT&T Communications, LLC, and DirecTV, LLC served in *Broadband iTV, Inc.* v. *AT&T Services, Inc. et al. and Broadband iTV, Inc.* v. *DirecTV, LLC,* Case No. 1-20-cv-00717, Served Jan. 29, 2021.
Exhibit C-14 to Final Invalidity Contentions of AT&T Services, Inc., AT&T Communications, LLC, and DirecTV, LLC served in *Broadband iTV, Inc.* v. *AT&T Services, Inc. et al. and Broadband iTV, Inc.* v. *DirecTV, LLC,* Case No. 1-20-cv-00717, Served Jan. 29, 2021.
Exhibit C-15 to Final Invalidity Contentions of AT&T Services, Inc., AT&T Communications, LLC, and DirecTV, LLC served in *Broadband iTV, Inc.* v. *AT&T Services, Inc. et al. and Broadband iTV, Inc.* v. *DirecTV, LLC,* Case No. 1-20-cv-00717, Served Jan. 29, 2021.
Exhibit C-16 to Final Invalidity Contentions of AT&T Services, Inc., AT&T Communications, LLC, and DirecTV, LLC served in *Broadband iTV, Inc.* v. *AT&T Services, Inc. et al. and Broadband iTV, Inc.* v. *DirecTV, LLC,* Case No. 1-20-cv-00717, Served Jan. 29, 2021.
DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A1 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A2 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A3 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A4 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A5 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A7 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A9 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A10 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A11 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A12 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A14 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A16 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A19 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A20 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A21 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A22 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A23 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A24 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A25 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A26 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A27 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A28 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A29 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A30 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A32 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A33 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A34 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A35 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A36 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A37 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A38 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A39 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A40 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A41 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A42 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A43 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A44 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.
Exhibit A45 to DISH Network L.L.C.'s Final Invalidity Contentions served in *Broadband iTV, Inc.* v. *DISH Network, L.L.C.,* Case No. 6:19-cv-00716-ADA, Served Jan. 8, 2021.

(56) References Cited

OTHER PUBLICATIONS

Exhibit A46 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit A47 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit A48 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit A49 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit A50 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit A51 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit A52 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit A53 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B1 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B2 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B3 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B4 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B5 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B7 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B9 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B10 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B11 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B12 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B16 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B19 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B20 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B21 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B22 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B23 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B24 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B25 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B26 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B27 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B28 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B29 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B30 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B32 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B33 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B34 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B35 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B36 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B37 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B38 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B39 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B40 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B41 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B42 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B43 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B44 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B45 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B46 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B47 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.

(56) References Cited

OTHER PUBLICATIONS

Exhibit B48 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B49 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B50 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B51 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B52 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit B53 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C1 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C2 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C3 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C4 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C5 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C6 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C7 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C8 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C9 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C10 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C11 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C12 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C13 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C14 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C15 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C16 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C17 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C18 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C19 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C20 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C21 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C22 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C23 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C24 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C25 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C26 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C27 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C28 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C29 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C30 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C31 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C32 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C33 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C34 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C35 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C36 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C37 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C38 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C39 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C40 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C41 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.

(56) References Cited

OTHER PUBLICATIONS

Exhibit C42 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C43 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C44 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C45 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C46 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C47 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C48 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C49 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C50 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C51 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C52 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit C53 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D1 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D2 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D3 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D4 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D5 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D6 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D7 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D8 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D9 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D10 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D11 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D12 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D13 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D14 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D15 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D16 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D17 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D18 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D19 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D20 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D21 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D22 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D23 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D24 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D25 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D26 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D27 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D28 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D29 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D30 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D31 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D32 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D33 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D49 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.
Exhibit D50 to DISH Network L.L.C.'s Final Invalidity Contentions served in *Broadband iTV, Inc.* v. *DISH Network, L.L.C.*, Case No. 6:19-cv-00716-ADA, Served Jan. 8, 2021.

(56) References Cited

OTHER PUBLICATIONS

Exhibit D51 to DISH Network L.L.C.'s Final Invalidity Contentions served in *Broadband iTV, Inc. v. DISH Network, L.L.C.*, Case No. 6:19-cv-00716-ADA, Served Jan. 8, 2021.
Exhibit D52 to DISH Network L.L.C.'s Final Invalidity Contentions served in *Broadband iTV, Inc. v. DISH Network, L.L.C.*, Case No. 6:19-cv-00716-ADA, Served Jan. 8, 2021.
Exhibit D53 to DISH Network L.L.C.'s Final Invalidity Contentions served in *Broadband iTV, Inc. v. DISH Network, L.L.C.*, Case No. 6:19-cv-00716-ADA, Served Jan. 8, 2021.
Plaintiff Broadband iTV, Inc.'s Final Infringement Contentions and Identification of Priority Dates served in *Broadband iTV, Inc. v. AT&T Services, Inc. and AT&T Communications, LLC*, Case No. 1-20-cv-00717, Served Jan. 29, 2021.
Plaintiff Broadband iTV, Inc.'s Final Infringement Contentions and Identification of Priority Dates served in *Broadband iTV, Inc. v. DirecTV, LLC*, Case No. 1-20-cv-00717, Served Jan. 29, 2021.
Redacted Exhibit A-17 to Final Invalidity Contentions of AT&T Services, Inc., AT&T Communications, LLC, and DirecTV, LLC served in *Broadband iTV, Inc. v. AT&T Services, Inc et al. and Broadband iTV, Inc. v. DirecTV, LLC*, Case No. 1-20-cv-00717, Served Jan. 29, 2021.
Redacted Exhibit A-18 to Final Invalidity Contentions of AT&T Services, Inc., AT&T Communications, LLC, and DirecTV, LLC served in *Broadband iTV, Inc. v. AT&T Services, Inc et al. and Broadband iTV, Inc. v. DirecTV, LLC*, Case No. 1-20-cv-00717, Served Jan. 29, 2021.
Redacted Exhibit C-17 to Final Invalidity Contentions of AT&T Services, Inc., AT&T Communications, LLC, and DirecTV, LLC served in *Broadband iTV, Inc. v. AT&T Services, Inc et al. and Broadband iTV, Inc. v. DirecTV, LLC*, Case No. 1-20-cv-00717, Served Jan. 29, 2021.
Redacted Exhibit C-18 to Final Invalidity Contentions of AT&T Services, Inc., AT&T Communications, LLC, and DirecTV, LLC served in *Broadband iTV, Inc. v. AT&T Services, Inc et al. and Broadband iTV, Inc. v. DirecTV, LLC*, Case No. 1-20-cv-00717, Served Jan. 29, 2021.
Patent Owner's Request for Rehearing of the Decision Granting Institution of Inter Partes Review, Paper No. 21, filed in Case No. IPR2020-01280 on Feb. 18, 2021.
Public Version of Defendant's Opposed Motion for Reconsideration of the Court's Claim Construction Order on the "Was Uploaded" Terms of the '388, '026, and '269 Patents Based on Newly Discovered Evidence filed in *Broadband iTV, Inc. v. AT&T Services, Inc et al. and Broadband iTV, Inc. v. DirecTV, LLC*, Case No. 1-20-cv-00717, Docket No. 97, Filed Mar. 4, 2021.
Public Version of Declaration of Roger Fulgham in support of Defendant's Opposed Motion for Reconsideration of the Court's Claim Construction Order on the "Was Uploaded" Terms of the '388, '026, and '269 Patents Based on Newly Discovered Evidence filed in *Broadband iTV, Inc. v. AT&T Services, Inc. et al. and Broadband iTV, Inc. v. DirecTV, LLC*, Case No. 1-20-cv-00717, Docket No. 97-1, Filed Mar. 4, 2021.
Public Version of Exhibit A to Declaration of Roger Fulgham in support of Defendant's Opposed Motion for Reconsideration of the Court's Claim Construction Order on the "Was Uploaded" Terms of the '388, '026, and '269 Patents Based on Newly Discovered Evidence filed in *Broadband iTV, Inc. v. AT&T Services, Inc. et al. and Broadband iTV, Inc. v. DirecTV, LLC*, Case No. 1-20-cv-00717, Docket No. 97-2, Filed Mar. 4, 2021.
Public Version of Exhibit B to Declaration of Roger Fulgham in support of Defendant's Opposed Motion for Reconsideration of the Court's Claim Construction Order on the "Was Uploaded" Terms of the '388, '026, and '269 Patents Based on Newly Discovered Evidence filed in *Broadband iTV, Inc. v. AT&T Services, Inc. et al. and Broadband iTV, Inc. v. DirecTV, LLC*, Case No. 1-20-cv-00717, Docket No. 97-3, Filed Mar. 4, 2021.
Public Version of Exhibit C to Declaration of Roger Fulgham in support of Defendant's Opposed Motion for Reconsideration of the Court's Claim Construction Order on the "Was Uploaded" Terms of the '388, '026, and '269 Patents Based on Newly Discovered Evidence filed in *Broadband iTV, Inc. v. AT&T Services, Inc. et al. and Broadband iTV, Inc. v. DirecTV, LLC*, Case No. 1-20-cv-00717, Docket No. 97-4, Filed Mar. 4, 2021.
Public Version of Proposed Order on Defendant's Opposed Motion for Reconsideration of the Court's Claim Construction Order on the "Was Uploaded" Terms of the '388, '026, and '269 Patents Based on Newly Discovered Evidence filed in *Broadband iTV, Inc. v. AT&T Services, Inc. et al. and Broadband iTV, Inc. v. DirecTV, LLC*, Case No. 1-20-cv-00717, Docket No. 97-5, Filed Mar. 4, 2021.
AT&T's Motion for Partial Summary Judgment of No Written Description Support for the Asserted Claims of the '388 and '791 Patents and Invalidity for Anticipation filed in *Broadband iTV, Inc. v. AT&T Services, Inc. et al. and Broadband iTV, Inc. v. DirecTV, LLC*, Case No. 1-20-cv-00717, Docket No. 99, Filed Mar. 5, 2021.
Declaration of Roger Fulghum in support of AT&T's Motion for Partial Summary Judgment of No Written Description Support for the Asserted Claims of the '388 and '791 Patents and Invalidity for Anticipation filed in *Broadband iTV, Inc. v. AT&T Services, Inc. et al. and Broadband iTV, Inc. v. DirecTV, LLC*, Case No. 1-20-cv-00717, Docket No. 99-1, Filed Mar. 5, 2021.
Exhibit F to Declaration of Roger Fulghum in support of AT&T's Motion for Partial Summary Judgment of No Written Description Support for the Asserted Claims of the '388 and '791 Patents and Invalidity for Anticipation filed in *Broadband iTV, Inc. v. AT&T Services, Inc. et al. and Broadband iTV, Inc. v. DirecTV, LLC*, Case No. 1-20-cv-00717, Docket No. 99-7, Filed Mar. 5, 2021.
Exhibit G to Declaration of Roger Fulghum in support of AT&T's Motion for Partial Summary Judgment of No Written Description Support for the Asserted Claims of the '388 and '791 Patents and Invalidity for Anticipation filed in *Broadband iTV, Inc. v. AT&T Services, Inc. et al. and Broadband iTV, Inc. v. DirecTV, LLC*, Case No. 1-20-cv-00717, Docket No. 99-8, Filed Mar. 5, 2021.
Exhibit H to Declaration of Roger Fulghum in support of AT&T's Motion for Partial Summary Judgment of No Written Description Support for the Asserted Claims of the '388 and '791 Patents and Invalidity for Anticipation filed in *Broadband iTV, Inc. v. AT&T Services, Inc. et al. and Broadband iTV, Inc. v. DirecTV, LLC*, Case No. 1-20-cv-00717, Docket No. 99-9, Filed Mar. 5, 2021.
Proposed Order on AT&T's Motion for Partial Summary Judgment of No Written Description Support for the Asserted Claims of the '388 and '791 Patents and Invalidity for Anticipation filed in *Broadband iTV, Inc. v. AT&T Services, Inc. et al. and Broadband iTV, Inc. v. DirecTV, LLC*, Case No. 1-20-cv-00717, Docket No. 99-10, Filed Mar. 5, 2021.
Plaintiff Broadband iTV, Inc.'s Opposition to Defendant's Motion for Reconsideration, filed in *Broadband iTV, Inc. v. AT&T Services, Inc. et al. and Broadband iTV, Inc. v. DirecTV, LLC*, Case No. 1-20-CV-00717, Docket No. 101, Filed Mar. 25, 2021.
Plaintiff's Opposition to AT&T's Motion for Partial Summary Judgment of No Written Description Support for the Asserted Claims of the '388 and '791 Patents and Invalidity for Anticipation (Dkt. 99), filed in *Broadband iTV, Inc. v. AT&T Services, Inc. et al. and Broadband iTV, Inc. v. DirecTV, LLC*, Case No. 1-20-CV-00717, Docket No. 103, Filed Apr. 2, 2021.
Declaration of Hong S. Lin In Support of Plaintiff's Opposition to AT&T's Motion for Partial Summary Judgment of No Written Description Support for the Asserted Claims of the '388 and '791 Patents and Invalidity for Anticipation (Dkt. 99) with Exhibits, filed in *Broadband iTV, Inc. v. AT&T Services, Inc. et al. and Broadband iTV, Inc. v. DirecTV, LLC*, Case No. 1-20-cv-00717, Docket No. 103-1, Filed Apr. 2, 2021.
Exhibit 9 to Lin Declaration, filed in *Broadband iTV, Inc. v. AT&T Services, Inc. et al. and Broadband iTV, Inc. v. DirecTV, LLC*, Case No. 1-20-cv-00717, Docket No. 103-10, Filed Apr. 2, 2021.
Exhibit 10 to Lin Declaration, filed in *Broadband iTV, Inc. v. AT&T Services, Inc. et al. and Broadband iTV, Inc. v. DirecTV, LLC*, Case No. 1-20-cv-00717, Docket No. 103-11, Filed Apr. 2, 2021.
Patent Owner's Opposition to Petitioner's Motion for Joinder to Inter Partes Review IPR2020-01267, Paper No. 9, filed in *AT&T Services, Inc. et al. v. Broadband iTV, Inc.*, Case No. IPR2021-00556 on Mar. 19, 2021.

(56) References Cited

OTHER PUBLICATIONS

Petition for Inter Partes Review of U.S. Pat. No. 9,648,388, Paper No. 2, filed in *AT&T Services, Inc. et al. v. Broadband iTV, Inc.*, Case No. IPR2021-00649 on Mar. 12, 2021.
Motion for Joinder of Inter Partes Review IPR2020-01359, Paper No. 3, filed in *AT&T Services, Inc. et al. v. Broadband iTV, Inc.*, Case No. IPR2021-00649 on Mar. 12, 2021.
Decision Denying Patent Owner's Request for Rehearing of Decision on Institution, Paper No. 25, issued in *DISH Network LLC v. Broadband iTV, Inc.*, Case No. IPR 2020-01267 on Apr. 1, 2021.
Petitioner's Motion to Submit Supplemental Information, Paper No. 26, filed in *DISH Network LLC v. Broadband iTV, Inc.*, Case No. IPR 2020-01280 on Mar. 18, 2021 (with Exhibits 1033-1036).
Decision Denying Patent Owner's Request for Rehearing of Decision on Institution, Paper No. 29, issued in *DISH Network LLC v. Broadband iTV, Inc.*, Case No. IPR 2020-01280 on Apr. 1, 2021.
Decision Denying Patent Owner's Request for Rehearing of Decision Granting Institution of Inter Partes Review, Paper No. 24, issued in *DISH Network LLC v. Broadband iTV, Inc.*, Case No. IPR 2020-01332 on Apr. 1, 2021.
Decision Denying Patent Owner's Request for Rehearing of Decision on Institution, Paper No. 25, issued in *DISH Network LLC v. Broadband iTV, Inc.*, Case No. IPR 2020-01359 on Apr. 1, 2021.
Petition for Inter Partes Review of U.S. Pat. No. 10,028,026, Paper No. 1, filed in Case No. IPR2021-00556 on Feb. 19, 2021.
Motion for Joinder of Inter Partes Review IPR2020-01267, Paper No. 3, filed in Case No. IPR2021-00556 on Feb. 19, 2021.
Plaintiff's Answer to Counterclaims to AT&T Service Inc.'s First Amended Counterclaims filed in *Broadband iTV, Inc. v. AT&T Services, Inc. et al. and Broadband iTV, Inc. v. DirecTV, LLC*, Case No. 1-20-cv-00717, Docket No. 92, Filed Feb. 25, 2021.
Plaintiff's Answer to Counterclaims to DirecTV, LLC's First Amended Counterclaims filed in *Broadband iTV, Inc. v. AT&T Services, Inc. et al. and Broadband iTV, Inc. v. DirecTV, LLC*, Case No. 1-20-cv-00717, Docket No. 93, Filed Feb. 25, 2021.
Petition for Inter Partes Review of U.S. Pat. No. 9,998,791, Paper No. 1, filed in Case No. IPR2021-00603 on Mar. 4, 2021.
Motion for Joinder of Inter Partes Review IPR2020-01280, Paper No. 3, filed in Case No. IPR2021-00603 on Mar. 4, 2021.
Declaration of Stephen D. Bristow In Support of Petitioner Hawaiian Telcom's Petition for Covered Business Method Review of U.S. Pat. No. 7,631,336, Exhibit No. 1011, filed in *Hawaiian Telcom, Inc. v. Broadband iTV, Inc.*, Case No. CBM2014-00189 on Sep. 19, 2014.
International Search Report, dated Mar. 6, 2006, in PCT International Application US2005/027376, of Broadband iTV, Inc.
International Search Report, dated Sep. 15, 2009, in PCT International Application US2008/003341, of Broadband iTV, Inc.
International Search Report, dated Nov. 28, 2008, in PCT International Application US2008/007980, of Broadband iTV, Inc.
The Industry Standard, "Web Entertainment Gets Personal", Jan. 10, 2000, www.thestandard.com.
Affidavit of Milton Diaz Perez Under C.F.R. 132, Mar. 9, 2009, submitted in U.S. Appl. No. 10/909,192, filed Jul. 3, 2004.
Affidavit of Milton Diaz Perez, Ex. A, Wikipedia, "Cable Television in the United States", history, last modified Jan. 17, 2009, pp. 1-7, http://en.wikipedia.org/wiki/Cable_Television_in_the_United_States.
Affidavit of Milton Diaz Perez, Ex. B, Wikipedia, "Internet Television", history, last modified Feb. 5, 2009, pp. 1-4, http://en.wikipedia.org/wiki/Internet_TV.
Affidavit of Milton Diaz Perez, Ex. C, Wikipedia, "Content Delivery Network", history, last modified Feb. 10, 2009, pp. 1-6, http://en.wikipedia.org/wiki/Content_Delivery_Network.
Affidavit of Milton Diaz Perez, Ex. D, Wikipedia, "Walled Garden (technology)", history, last modified Feb. 3, 2009, pp. 1-2, http://en.wikipedia.org/wiki/Walled_Garden_(technology).
Affidavit of Milton Diaz Perez, Ex. E, Wikipedia, "User-generated TV", history, last modified Feb. 10, 2009, pp. 1-2, http://en.wikipedia.org/wiki/User-generated_TV.
Affidavit of Milton Diaz Perez, Ex. E1, Wikipedia, "ZeD", history, last modified Jan. 5, 2009, pp. 1-7, http://en.wikipedia.org/wiki/ZeD.
Affidavit of Milton Diaz Perez, Ex. E2, Wikipedia, "Current TV", history, last modified Feb. 5, 2009, pp. 1-5, http://en.wikipedia.org/wiki/Current_TV.
Affidavit of Milton Diaz Perez, Ex. E3, Outloud.TV, tripatlas, circa 2003, http://tripatlas.com/Outloud.tv.
VOD Metadata—Project Primer, Overview of VOD Content Specification 1.0, 1.1, and 2.0, published by Cable Labs, circa 2002-2007, http://www.cablelabs.com/projects/metadata/primer.
XOD Capsule, issue dated Apr. 11, 2006, includes article "Bresnan Taps CMC for VOD", published by Communications, Engineering & Design Magazine, http://www.cedmagazine.com/newsletter.aspx?id=67468.
Comcast Media Center, Content Gateway, Content Distribution website, circa 2010, http://www.comcastmediacenter.com/content-gateway.
Petition for Inter Partes Review, IPR2014-01222, *Unified Patents, Inc. v. Broadband iTV, Inc.*, re U.S. Pat. No. 7,631,336.
Petition for Covered Business Method Review, CBM2014-00189, *Hawaiian Telecom, Inc. v. Broadband iTV, Inc.*, re U. S. Patent 7,631,336.
Patent Owner's Preliminary Response, Jan. 2, 2015, CBM2014-00189, *Hawaiian Telecom, Inc. v. Broadband iTV, Inc.*, re U.S. Pat. No. 7,631,336.
Decision Denying Institution of Inter Partes Review, Jan. 5, 2015, IPR2014-01222, *Unified Patents v. Broadband iTV, Inc.*, re U.S. Pat. No. 7,631,336.
Adams, Open Cable Architecture (Cisco Press 2000), Chapter 8-16.
ATSC Standard: Program and System Information Protocol for Terrestrial Broadcast and Cable (PSIP) (Dec. 23, 1997).
Attack of the $500 Killer Network Computers: Time-Warner Cable's Full Service Network, Network Computing (Aug. 19, 2000) Internet Archive, https://web.archive.org/web/20000819050301/http://www.networkcomputing.com/616/616tw.html.
CableLabs Video-On-Demand Asset Distribution Interface Specification, Version 1.1 (Sep. 27, 2002).
CableLabs Video-On-Demand Content Specification Version 1.1 (Jan. 7, 2004).
Declaration of Milton Diaz Perez, *Broadband iTV, Inc. v. Hawaiian Telcom, Inc. et al.*, No. 14-cv-00169-ACK-KSC (D. Haw. Mar. 2, 2015).
Defendants' Joint Preliminary Invalidity Contentions, *Broadband iTV, Inc. v. Hawaiian Telcom, Inc. et al.*, No. 14-cv-00169-ACK-KSC (D. Haw. Feb. 20, 2015).
Exhibit A, Defendants' Joint Preliminary Invalidity Contentions, *Broadband iTV, Inc. v. Hawaiian Telcom, Inc. et al.*, No. 14-cv-00169-ACK-KSC (D. Haw. Feb. 20, 2015).
Exhibit B, Defendants' Joint Preliminary Invalidity Contentions, *Broadband iTV, Inc. v. Hawaiian Telcom, Inc. et al.*, No. 14-cv-00169-ACK-KSC (D. Haw. Feb. 20, 2015).
Exhibit C, Defendants' Joint Preliminary Invalidity Contentions, *Broadband iTV, Inc. v. Hawaiian Telcom, Inc. et al.*, No. 14-cv-00169-ACK-KSC (D. Haw. Feb. 20, 2015).
Exhibit E, Defendants' Joint Preliminary Invalidity Contentions, *Broadband iTV, Inc. v. Hawaiian Telcom, Inc. et al.*, No. 14-cv-00169-ACK-KSC (D. Haw. Feb. 20, 2015).
Exhibit F, Defendants' Joint Preliminary Invalidity Contentions, *Broadband iTV, Inc. v. Hawaiian Telcom, Inc. et al.*, No. 14-cv-00169-ACK-KSC (D. Haw. Feb. 20, 2015).
Exhibit G, Defendants' Joint Preliminary Invalidity Contentions, *Broadband iTV, Inc. v. Hawaiian Telcom, Inc. et al.*, No. 14-cv-00169-ACK-KSC (D. Haw. Feb. 20, 2015).
Fickle et al., U.S. Appl. No. 60/429,966, filed Nov. 27, 2002).
Full Service Network and The Orlando Sentinel add interactive dining guide to GOtv, The Free Library, http://www.thefreelibrary.com/Full+Service+Network+and+The+Orlando+Sentinel+add+interactive+dining...-a018299720 (published May 20, 1996, last visited Mar. 4, 2015).
Full Service Network(FSN) in Orlando, Florida, Hong Kong University of Science and Technology (May 4, 1997) Internet Archive,

(56) References Cited

OTHER PUBLICATIONS https://web.archive.org/web/19970504203603/http://www.ust.hk/~webiway/content/USA/Trial/fsn.html.
Full Service Network, Time Warner Cable, http://m.history.timewarnercable.com/the-twc-story/era-1990-1995/Story.aspx?story=56 (last visited Mar. 4, 2015).
Full Service Network, Wikipedia, http://en.wikipedia.org/w/index.php?title=Full_Service_Network&printable=yes (last visited Mar. 4, 2015).
Tanenbaum, Computer Networks, 4th ed. (Prentice Hall PTR 2003), pp. 1-14.
Time Warner Cable, DRAFT Asset Distribution System ("Catcher's Mitt") Functional Requirements, Version 1.0 (Jan. 26, 2000).
Time Warner Cable, ISA Data Download Delivery, Version 0.5 (Jun. 3, 2004).
Time Warner Cable, Pegasus Interactive Services Architecture, Version 1.4 (Jun. 5, 2003).
Time Warner Cable, The ISA Tutorial, Version 1.0 (Sep. 13, 2003).
Time Warner Cable's Full Service Network connects live to Innoventions, AllBusiness (published Apr. 10, 1996, archived Mar. 25, 2008) Internet Archive, https://web.archive.org/web/20080325024937/http://www.allbusiness.com/media-telecommunications/telecommunications/7218809-1.html.
Time Warner introduces world's first full service network in Orlando; Network offers First . . . , AllBusiness (published Dec. 14, 1994, archived May 22, 2009) Internet Archive, https://web.archive.org/web/20090522134441/http://www.allbusiness.com/media-telecommunications/telecommunications/7087127-1.html.
Time Warner will close its Full Service Network, Orlando Business Journal, http://www.bizjournals.com/orlando/stories/1997/04/28/daily7.html (last visited Mar. 4, 2015).
Time Warner's 'Time Machine' for Future Video, The New York Times, http://www.nytimes.com/.../12/business/time-warner-s-time-machine-for-future-video.html?pagewanted=2&pagewanted=print (publsihed Dec. 12, 1994, last visited Mar. 4, 2015).
Time Warner Cable, Request For Proposal and Functional Requirements Specification for Video-On-Demand (VOD) Systems, Version 2.0 (Apr. 25, 1997).
Time Warner Cable, Pegasus Movies On Demand Content Specification, Version 1.3 (Sep. 29, 2000).
Time Warner Cable, Pegasus Overall Flow: Movie Delivery, Version 1.0 (Feb. 18, 2004).
If You Liked This, You're Sure to Love That, By Clive Thompson (Nov. 21, 2008), The New York Times Magazine, https://www.nytimes.com/2008/11/23/magazine/23Netflix-t.html?_r=2&hp=&pagewanted=all, Internet.
Two Decades of Recommender Systems at Amazon.com, Brent Smith (Amazon.com) and Greg Linder (Microsoft) Published by the IEEE Computer Society, semanticscholar.org, https://pdfs.semanticscholar.org/0f06/d328f6deb44e5e67408e0c16a8c7356330d1.pdf, Internet.
Evaluating Collaborative Filtering Recommender Systems, Jonathan L. Herlocker (Oregon State University) and Joseph A. Konstan, Loren G. Terveen, and John T. Riedl (University of Minnesota) ACM Transactions on Information Systems, vol. 22, No. 1, Jan. 2004, pp. 5-53.
Netflix Prize: Forum, Netflixprize.com, http://www.netflixprize.com/community/ (Mar. 6, 2007) Internet Archive, https://web.archive.org/web/20070306011355/http:/www.netflixprize.com:80/community/.
Netflix Prize, The Netflix Prize Rules, Netflix.com, http://www.netflixprize.com/rules (Mar. 6, 2007) Internet Archive, https://web.archive.org/web/20070306011304/http://www.netflixprize.com/rules.
Netflix Prize: Home; https://web.archive.Org/web/20070306011244/http://www.netflixprize.com:80/index.
AT&T U-Verse Wikipedia page, https://en.wikipedia.org/wiki/AT%26T_U-verse.
CableLabs OpenCable—www.opencable website Way Back Machine capture, https://web.archive.org/web/20060326111508/http://www.opencable.com/ocap/ocap.html.
CableLabs Specifications Library,https://www.cablelabs.com/specifications.
CableLabs Video-On-Demand Content Specification Version 1.1.
Comcast's 2004 Annual Report—Excerpts, http://www.annualreports.com/HostedData/AnnualReportArchive/c/NASDAQ_CMCSA_2004.pdf.
Google pays the price to capture online video zeitgeist, Way Back Machine capture, https://web.archive.org/web/20070901031352/http://www.eurekastreet.com.au/article.aspx?aeid=1837.
Mpeg-2 Wikipedia page, https://en.wikipedia.org/wiki/MPEG-2.
Palm Tungsten Wikipedia page.
PlayStation 3 technical specifications Wikipedia page.
Samsung gains first OpenCable Certification on two-way digital television, https://www.tvtechnology.com/news/samsung-gains-first-opencable-certification-on-twoway-digital-television.
Scheffler, Robert G. "Ingest & Metadata Partitioning: Requirements For Television On DemandTM" (2003).
Scientific-Atlanta Launches Explorer 4200 Set-Top, https://www.tvtechnology.com/equipment/scientificatlanta-launches-explorer-4200-settop.
Sony's PS3 makes U.S. debut to long lines, short supplies, https://usatoday30.usatoday.com/tech/gaming/2006-11-17-os3-debut_x.htm.
The Razor V3 was launched 14 years ago: Here's why it still has a place in our hearts, https://www.androidauthority.com/motorolarazr-v3-888664/.
Time Warner, Inc.'s Form 10-K for the year 2003—Excerpts http://getfilings.com/o0000950144-04-002438.html.
Petition for Review of U.S. Pat. No. 10,028,026, Case No. IPR2020-01268, dated Jul. 10, 2020.
Petitioner's Power of Attorney, Case No. IPR2020-01268, dated Jul. 10, 2020.
Petitioner's Explanation of Multiple Petitions Challenging U.S. Pat. No. 10,028,026 and Ranking of Petitions, Case No. IPR2020-01268, dated Jul. 10, 2020.
Declaration of Dr. Samuel H. Russ, Ph.D., Case No. IPR2020-01268, dated Jul. 10, 2020.
Petition for Review of U.S. Pat. No. 10,028,026, Case No. IPR2020-01267, dated Jul. 10, 2020.
Petitioner's Power of Attorney, Case No. IPR2020-01267, dated Jul. 10, 2020.
Petitioner's Explanation of Multiple Petitions Challenging U.S. Pat. No. 10,028,026 and Ranking of Petitions, Case No. IPR2020-01267, dated Jul. 10, 2020.
Declaration of Dr. Samuel H. Russ, Ph.D., Case No. IPR2020-01267, dated Jul. 10, 2020.
Plaintiff Broadband iTV Inc.'s Preliminary Infringement Contentions and Identification of Priority Dates with Exhibits 1-4; *Broadband iTV, Inc.,* v. *Dish Network, L.L.C.,* W.D. Tex. Case No. 6:19-cv-716-ADA dated Apr. 30, 2020.
Plaintiff Broadband iTV Inc.'s Preliminary Infringement Contentions and Identification of Priority Dates with Exhibits 1-4; *Broadband iTV, Inc.,* v. *Directv, LLC,* Case No. 6:19-cv-714-ADA dated Apr. 30, 2020.
Plaintiff Broadband iTV Inc.'s Preliminary Infringement Contentions and Identification of Priority Dates with Exhibits 1-7; *Broadband iTV, Inc.,* v. *AT&T Services, Inc. and AT&T Communications, LLC,* Case No. 6:19-cv-712-ADA dated Apr. 30, 2020.
Petition for Review of U.S. Pat. No. 9,998,791 Case No. IPR2020-01280, dated Jul. 20, 2020.
Petitioner's Power of Attorney, Case No. IPR2020-01280, dated Jul. 20, 2020.
Petitioner's Explanation of Multiple Petitions Challenging U.S. Pat. No. 9,998,791 and Ranking of Petitions, Case No. IPR2020-01280, dated Jul. 20, 2020.
Declaration of Dr. Samuel H. Russ, Ph.D., Case No. IPR2020-01280, dated Jul. 20, 2020.
Petition for Review of U.S. Pat. No. 9,998,791, Case No. IPR2020-01281, dated Jul. 20, 2020.
Petitioner's Power of Attorney, Case No. IPR2020-01281, dated Jul. 20, 2020.

(56) References Cited

OTHER PUBLICATIONS

Petitioner's Explanation of Multiple Petitions Challenging U.S. Pat. No. 9,998,791 and Ranking of Petitions, Case No. IPR2020-01281, dated Jul. 20, 2020.
Declaration of Dr. Samuel H. Russ, Ph.D., Case No. IPR2020-01281, dated Jul. 20, 2020.
IPR2020-01280: Ex. 1017 Claim Construction Order from *Broadband iTV, Inc.* v. *Hawaiian Telecom, Inc.*, Case No. 14-00169, Dkt. No. 290 (D. Haw. Jun. 24, 2015).
Ex. 1008 Declaration of Robert Scheffler RE: Publication of Scheffler, "Ingest & Metadata Partitioning: Requirements for Television on DemandTM" (2003), filed Jul. 20, 2020 in IPR2020-01280.
Ex. 1010 Declaration of Christie Poland RE: Publication of CableLabs® Video-on-Demand Content Specification, filed Jul. 20, 2020 in IPR2020-01280.
Ex. 1032 Christopher Butler Affidavit—Archive.org, filed Jul. 20, 2020 in IPR2020-01280.
Ex. 1012 Declaration of Christie Poland, filed Jul. 10, 2020 in IPR2020-01267.
Ex. 1110 Declaration of Robert Scheffler, filed Jul. 10, 2020 in IPR2020-01268.
Ex. 1149 Christopher Butler Affidavit—Archive.org, filed Jul. 10, 2020 in IPR2020-01268.
Petition for Inter Partes Review of U.S. Pat. No. 9,648,388, Case No. IPR2020-01359 dated Jul. 31, 2020.
Power of Attorney, Case No. IPR2020-01359 dated Jul. 31, 2020.
Explanation of Multiple Petitions Challenging U.S. Pat. No. 9,648,388 and Ranking of Petitions, Case No. IPR2020-01359 dated Jul. 31, 2020.
Declaration of Dr. Samuel H. Russ, Ph.D., Case No. IPR2020-01359, filed Jul. 31, 2020.
Declaration of Christie Poland RE: Publication of CableLabs® Video-on-Demand Content Specification, filed Jul. 31, 2020 in IPR2020-01359.
Ex. 1011 Christopher Butler Affidavit—Archive.org filed Jul. 31, 2020 in IPR2020-01359.
Petition for Inter Partes Review of U.S. Pat. No. 9,648,388, Case No. IPR2020-01360 dated Jul. 31, 2020.
Power of Attorney, Case No. IPR2020-01360 dated Jul. 31, 2020.
Explanation of Multiple Petitions Challenging U.S. Pat. No. 9,648,388 and Ranking of Petitions, Case No. PR2020-01360 dated Jul. 31, 2020.
Declaration of Dr. Samuel H. Russ, Ph.D., Case No. IPR2020-01360, filed Jul. 31, 2020.
Answer to Complaint; *Broadband iTV, Inc.*, v. *Dish Network, L.L.C.*, W.D. Tex. Case No. 6:19-cv-00716-ADA dated Aug. 10, 2020.
Exhibit No. 2174 (Public Version), filed in *DISH Network LLC* v. *Broadband iTV, Inc.*, Case No. IPR 2020-01267 on May 10, 2021.
Exhibit No. 2175 (Public Version), filed in *DISH Network LLC* v. *Broadband iTV, Inc.*, Case No. IPR 2020-01267 on May 10, 2021.
Exhibit No. 2180 (Public Version), filed in *DISH Network LLC* v. *Broadband iTV, Inc.*, Case No. IPR 2020-01267 on May 10, 2021.
Exhibit No. 2186 (Public Version), filed in *DISH Network LLC* v. *Broadband iTV, Inc.*, Case No. IPR 2020-01267 on May 10, 2021.
Reply in Support of Petitioner's Motion for Joinder of Inter Partes Review IPR2020-01280, Paper No. 10, filed in *AT&T Services, Inc. et al* v. *Broadband iTV, Inc.*, Case No. IPR2021-00603 on May 19, 2021.
Reply in Support of Petitioner's Motion for Joinder of Inter Partes Review IPR2020-01359, Paper No. 9, filed in *AT&T Services, Inc. et al* v. *Broadband iTV, Inc.*, Case No. IPR2021-00649 on May 19, 2021.
Petitioner's Objections to Patent Owner's Evidence Cited in its Formal Response, Paper No. 39, filed in *DISH Network LLC* v. *Broadband iTV, Inc.*, Case No. IPR 2020-01267 on May 17, 2021.
Public Version of Patent Owner's Response, Paper No. 33, filed in *DISH Network LLC* v. *Broadband iTV, Inc.*, Case No. IPR 2020-01332 on May 12, 2021.

Public Version of Patent Owner's Response, Paper No. 42, filed in *DISH Network LLC* v. *Broadband iTV, Inc.*, Case No. IPR 2020-01280 on May 21, 2021.
Exhibit 2036, Declaration of Michael L Shamos, Ph.D., J.D. in Support of Patent Owner's Response, filed in *DISH Network LLC* v. *Broadband iTV, Inc.*, Case No. IPR 2020-01280 and IPR 2020-01359 on May 21, 2021.
Exhibit 2037, USPTO File History of U.S. Pat. No. 10,762,833, filed in *DISH Network LLC* v. *Broadband iTV, Inc.*, Case No. IPR 2020-01280 and IPR 2020-01359 on May 21, 2021.
Exhibit 2038, Baumgartner v. 833 Application Comparison, filed in *DISH Network LLC* v. *Broadband iTV, Inc.*, Case No. IPR 2020-01280 and IPR 2020-01359 on May 21, 2021.
Exhibit 2039, USPTO File History of U.S. Pat. No. 10,909,192, filed in *DISH Network LLC* v. *Broadband TV, Inc.*, Case No. IPR 2020-01280 and IPR 2020-01359 on May 21, 2021.
Exhibit 2040, Deposition of Samuel Hardie Russ, Ph.D., filed in *DISH Network LLC* v. *Broadband iTV, Inc.*, Case No. PR 2020-01280 and IPR 2020-01359 on May 21, 2021.
Public Version of Patent Owner's Response, Paper No. 38, filed in *DISH Network LLC* v. *Broadband iTV, Inc.*, Case No. IPR 2020-01359 on May 21, 2021.
Non-Confidential Version of DISH Network L.L.C.'s Amended Final Invalidity Contentions, served in *Broadband iTV, Inc.* v. *DISH Network LLC*, Case No. 6:19-cv-00716, served on May 26, 2021.
Patent Owner's Preliminary Response, Paper No. 12, filed in *AT&T Services, Inc. et al.* v. *Broadband iTV, Inc.*, Case No. IPR 2021-00556 on Jun. 15, 2021.
Patent Owner's Preliminary Response, Paper No. 11, filed in *AT&T Services, Inc. et al.* v. *Broadband iTV, Inc.*, Case No. IPR 2021-00603 on Jun. 9, 2021.
DISH Network L.L.C.'s Petition for Mandamus, filed in In re: DISH Network L.L.C., Case No. 2021-148 (Federal Circuit), Docket No. 2-1, Filed May 28, 2021.
Broadband iTV, Inc.'s Response to Petition for Mandamus, filed in In re: DISH Network L.L.C., Case No. 2021-148 (Federal Circuit), Docket No. 14-1, Filed Jun. 14, 2021.
PTAB Decision Denying Institution of Covered Business Method Patent Review, Apr. 1, 2015, CBM2014-00189, *Hawaiian Telcom, Inc.* v. *Broadband iTV, Inc.*, re U.S. Pat. No. 7,631,336.
TimeWarner, Time Warner Cable Launches Quick Clips, http://www.timewarner.com/newsroom/press-releases/2006/09/28/time-warner-cable-launches-quick-clips (published Sep. 28, 2006, last visited Jun. 26, 2015).
Time Warner Cable, Photos & Video Go from Digital Cameras to Television with Free, New Time Warner Cable Product, http://www.timewarnercable.com/en/about-US/press/photos_video_go_fromdigitalcamerastotelevisionwithfreenewtimewar.html (published Apr. 27, 2007, last visited Jun. 26, 2015).
Defendants Oceanic Time Warner Cable, LLC and Time Warner Cable Inc.'s Motion for Summary Judgment Regarding Invalidity of U.S. Pat. No. 7,631,336 (ECF 474), *Broadband iTV, Inc.* v. *Hawaiian Telcom, Inc. et al.*, No. 1:14-cv-00169 (D. Haw. Aug. 10, 2015) (5 pgs).
Memorandum in Support of Defendants Oceanic Time Warner Cable LLC and Time Warner Cable Inc.'s Motion for Summary Judgment Regarding Invalidity of U.S. Pat. No. 7,631,336 (ECF 474-1), *Broadband iTV, Inc.* v. *Hawaiian Telcom, Inc. et al.*, No. 1:14-cv-00169 (D. Haw. Aug. 10, 2015) (49 pgs).
Concise Statement of Facts in Support of Defendants Oceanic Time Warner Cable LLC and Time Warner Cable Inc.'s Motion for Summary Judgment Regarding Invalidity of U.S. Pat. No. 7,631,336 (ECF 475), *Broadband iTV, Inc.* v. *Hawaiian Telcom, Inc. et al.*, No. 1:14-cv-00169 (D. Haw. Aug. 10, 2015) (12 pgs).
Declaration of Nathan L. Brown (ECF 475-1), *Broadband iTV, Inc.* v. *Hawaiian Telcom, Inc. et al.*, No. 1:14-cv-00169 (D. Haw. Aug. 10, 2015) (6 pgs).
Exhibits 1 (ECF 475-2), 4 (ECF 475-5), 5 (ECF 475-6), and 6 (ECF 475-7) to Concise Statement of Facts in Support of Defendants Oceanic Time Warner Cable LLC and Time Warner Cable Inc.'s Motion for Summary Judgment Regarding Invalidity of U.S. Pat. No. 7,631,336, *Broadband iTV, Inc.* v. *Hawaiian Telcom, Inc. et al.*, No. 1:14-cv-00169 (D. Haw. Aug. 10, 2015) (133 pgs).

(56) References Cited

OTHER PUBLICATIONS

Plaintiff's Opposition to Defendants Time Warner Cable, Inc. and Oceanic Time Warner Cable, LLC's Motion for Summary Judgment Regarding Invalidity of U.S. Pat. No. 7,631,336 (ECF 561), *Broadband iTV, Inc. v. Hawaiian Telcom, Inc. et al.*, No. 1:14-cv-00169 (D. Haw. Aug. 27, 2015) (52 pgs).
Plaintiff Broadband iTV, Inc.'s Concise Statement of Facts in Opposition to Defendants Oceanic Time Warner Cable and Time Warner Cable, Inc.'s Concise Statement of Facts (ECF 562), *Broadband iTV, Inc. v. Hawaiian Telcom, Inc. et al.*, No. 1:14-cv-00169 (D. Haw. Aug. 27, 2015) (8 pgs).
Declaration of Keith A. Jones (ECF 562-1), Inc.'s Concise Statement of Facts, *Broadband iTV, Inc. v. Hawaiian Telcom, Inc. et al.*, No. 1:14-cv-00169 (D. Haw. Aug. 27, 2015) (8 pgs).
Exhibits 1-10 (ECF 562-2-ECF-11), 12 (ECF 562-13), 14 (ECF 562-15), 16-17 (ECF 562-17-562-18), and 19-20 (ECF 562-20-562-21) to Plaintiff Broadband iTV, Inc.'s Concise Statement of Facts in Opposition to Defendants Oceanic Time Warner Cable and Time Warner Cable, Inc.'s Concise Statement of Facts, *Broadband iTV, Inc. v. Hawaiian Telcom, Inc. et al.*, No. 1:14-cv-00169 (D. Haw. Aug. 27, 2015) (508 pgs).
Order Granting in Part and Denying in Part Defendants Oceanic Time Warner Calbe, LLC and Time Warner Cable, Inc.'s Motion for Summary Judgment Regarding Invalidity of U.S. Pat. No. 7,631,336, *Broadband iTV, Inc. v. Oceanic Time Warner Cable, LLC and Time Warner Cable, Inc.*, No. 15-00131 (D. Haw. Sep. 29, 2015) (77 pgs).
Judgment, *Broadband iTV, Inc. v. Oceanic Time Warner Cable, LLC and Time Warner Cable, Inc.*, No. 15-00131 (D. Haw. Sep. 29, 2015) (2 pgs).
Plaintiff's Notice of Appeal; Certificate of Service, *Broadband iTV, Inc. v. Oceanic Time Warner Cable, LLC and Time Warner Cable, Inc.*, No. 15-00131 (D. Haw. Oct. 9, 2015) (4 pgs).
Order Granting Defendant Hawaiian Telcom, Inc.'s Motion for Summary Judgment of Invalidity Under 35 U.S.C. § 101, *Broadband iTV, Inc. v. Hawaiian Telcom, Inc.*, No. 14-00169 (D. Haw. Sep. 29, 2015) (43 pgs).
Judgment, *Broadband iTV, Inc. v. Hawaiian Telcom, Inc.*, No. 14-00169 (D. Haw. Sep. 29,2015) (2 pgs).
Plaintiff's Notice of Appeal; Certificate of Service, *Broadband iTV, Inc. v. Hawaiian Telcom, Inc.*, No. 14-00169 (D. Haw. Oct. 9, 2015) (4 pgs).
Brief of Amici Curiae Broadband iTV, Inc., Double Rock Corporation, Island Intellectual Property, LLC, Access Control Advantage, Inc., and Fairway Financial U.S., Inc. In Support of Appellants, *Netflix, Inc. v. Rovi Corporation et al.*, No. 2015-1917 (Fed. Cir. Dec. 18, 2015).
Consolidated Brief for Appellant Broadband iTV, Inc., *Broadband iTV, Inc. v. Hawaiian Telcom, Inc. et al.*, No. 16-1082 (Fed Cir. Jan. 21, 2016).
Amicus Brief of United Inventors Association of the United States of America in Support of Appellant Broadband iTV, Inc. and Reversal, *Broadband iTV, Inc. v. Hawaiian Telcom, Inc. et al.*, No. 16-1082 (Fed. Cir. Jan. 27, 2016).
Amicus Brief by Tranxition, Inc., *Broadband iTV, Inc. v. Hawaiian Telcom, Inc. et al.*, No. 16-1082 (Fed. Cir. Jan. 28, 2016).
EPO Communication for European Application No. 08726793.6, dated May 30, 2016.
EPO Communication for European Application No. 08768802.4, dated May 30, 2016.
VDO expands Webcasting possibilities, Broadcasting & Cable, Nov. 11, 1996.
Jose Alvear, "Web Developer.com Guide to Streaming Multimedia", Chapters 9 and 11, 1998.
Business Wire, "Ivex Announces ViewOps Internet Video Service; Allows Business Managers to View and Manage Operations Online," May 2, 2000.
Notice of Entry of Judgment Without Opinion for Case No. 2016-1082 of the United States Court of Appeals for the Federal Circuit dated Sep. 26, 2016.
Judgment, *Broadband iTV, Inc. v. Hawaiian Telcom, Inc.*, Oceanic Time Warner Cable, LLC and Time Warner Cable, Inc., Nos. 2016-1082, 2016-1083 (CAFC Sep. 26, 2016) (2 pgs).
Affidavit of Milton Diaz Perez Under 37 C.F.R. 132, Jan. 20, 2012, submitted in U.S. Appl. No. 11/768,895.
*Broadband iTV, Inc. v. Hawaiian Telcom, Inc. et al.*; BBiTV Petition for a Writ of Certiorari (Sup. Ct. Apr. 13, 2017 (No. 16-1241)).
Order List 581 U.S. Sup. Ct.—Monday, May 22, 2017—*Broadband ITV, Inc. v. Hawaiian Telcom, Inc., et al.*, Petition for Writ of Certiorari Denied (p. 7).
Ciciora, Farmer, & Large, Modern Cable Television Technology (Morgan Kaufmann Publishers, Inc. 1999), 18 pages.
Patent Owner's Response to Petitioner's Ranking of Multiple Petitions, Paper No. 8, Filed in Case No. IPR2020-01267 on Oct. 23, 2020.
Patent Owner's Preliminary Response, Paper No. 9, Filed in Case No. IPR2020-01267 on Oct. 23, 2020.
Patent Owner's Preliminary Response, Paper No. 8, Filed in Case No. IPR2020-01268 on Oct. 23, 2020.
Patent Owner's Preliminary Response, Paper No. 9, Filed in Case No. IPR2020-01268 on Oct. 23, 2020.
Patent Owner Exhibit 2001—Complaint, filed in Case No. IPR2020-01267 and IPR2020-01268 on Oct. 23, 2020.
Patent Owner Exhibit 2002—Aug. 31, 2020 Hearing Transcript, filed in Case No. IPR2020-01267 and IPR2020-01268 on Oct. 23, 2020.
Patent Owner Exhibit 2003—IAM Interview, filed in Case No. IPR2020-01267 and IPR2020-01268 on Oct. 23, 2020.
Patent Owner Exhibit 2004—*Continental v. Sand Revolution Order*, filed in Case No. IPR2020-01267 and IPR2020-01268 on Oct. 23, 2020.
Patent Owner Exhibit 2005—*Kerr v. Vulcan Order*, filed in Case No. IPR2020-01267 and IPR2020-01268 on Oct. 23, 2020.
Patent Owner Exhibit 2006—Waco Standing Order 08182020, filed in Case No. IPR2020-01267 and IPR2020-01268 on Oct. 23, 2020.
Patent Owner Exhibit 2007—Waco Standing Order 09232020, filed in Case No. IPR2020-01267 and IPR2020-01268 on Oct. 23, 2020.
Patent Owner Exhibit 2008—Waco Standing Order 03242020, filed in Case No. IPR2020-01267 and IPR2020-01268 on Oct. 23, 2020.
Patent Owner Exhibit 2009—Consolidation Order, filed in Case No. IPR2020-01267 and IPR2020-01268 on Oct. 23, 2020.
Patent Owner Exhibit 2010—Minute Entry 08312020, filed in Case No. IPR2020-01267 and IPR2020-01268 on Oct. 23, 2020.
Patent Owner Exhibit 2011—Law360, filed in Case No. IPR2020-01267 and IPR2020-01268 on Oct. 23, 2020.
Patent Owner Exhibit 2012—Order Denying Motion to Dismiss, filed in Case No. IPR2020-01267 and IPR2020-01268 on Oct. 23, 2020.
Patent Owner Exhibit 2013—Invalidity Contentions, filed in Case No. IPR2020-01267 and IPR2020-01268 on Oct. 23, 2020.
Patent Owner Exhibit 2015—Defendant's Opening Claim Construction Brief, filed in Case No. IPR2020-01267 and IPR2020-01268 on Oct. 23, 2020.
Patent Owner Exhibit 2018—Roku Beats $41M Infringement Claim In Texas Trial—Law360, filed in Case No. PR2020-01267 and IPR2020-01268 on Oct. 23, 2020.
Patent Owner Exhibit 2019—3 Things To Know After Busy WDTX Patent Judge's 1st Trial—Law360, filed in Case No. PR2020-01267 and IPR2020-01268 on Oct. 23, 2020.
Patent Owner Exhibit 2020—Mar. 26, 2020 Telephonic Scheduling Conference, filed in Case No. IPR2020-01267 and IPR2020-01268 on Oct. 23, 2020.
Defendants' Reply Claim Construction Brief filed in *Broadband iTV, Inc. v. DISH Network LLC*, Case No. 6-19-cv-00716. Docket No. 68; also filed in *Broadband iTV, Inc. v. AT&T Services, Inc. et al. and Broadband iTV, Inc. v. DirecTV, LLC*, Case No. 1-20-cv-00717, Docket No. 71, Filed Oct. 29, 2020.
Declaration of Roger Fulghum with Exhibits 37-39 filed in *Broadband iTV, Inc. v. AT&T Services, Inc. et al. and Broadband iTV, Inc. v. DirecTV, LLC*, Case No. 1-20-cv-00717, Docket No. 71-1 and Exhibits at Docket Nos. 71-2 through 71-4; Exhibits also filed in *Broadband iTV, Inc. v. DISH Network LLC*, Case No. 6-19-cv-00716, Docket Nos. 68-1 through 68-4, Filed Oct. 29, 2020.

(56) References Cited

OTHER PUBLICATIONS

Plaintiff Broadband iTV, Inc.'s Reply Claim Construction Brief filed in *Broadband iTV, Inc. v. DISH Network LLC,* Case No. 6-19-cv-00716, Docket No. 67; also filed in *Broadband iTV, Inc. v. AT&T Services, Inc. et al. and Broadband iTV, Inc. v. DirecTV, LLC,* Case No. 1-20-CV-00717, Docket No. 70, Filed Oct. 29, 2020.
Declaration of Jeremiah A. Armstrong with Exhibits 37-39 filed in *Broadband iTV, Inc. v. DISH Network LLC,* Case No. 6-19-CV-00716, Docket No. 67-1 and Exhibits at Docket Nos. 67-2 through 67-4; also filed in *Broadband iTV, Inc. v. AT&T Services, Inc. et al. and Broadband iTV, Inc. v. DirecTV, LLC,* Case No. 1-20-cv-00717, Docket No. 70-1 and Exhibits at Docket Nos. 70-2 through 70-4, Filed Oct. 29, 2020.
Plaintiff Broadband iTV, Inc.'s and DISH Network LLC's Joint Claim Construction Statement filed in *Broadband iTV, Inc. v. DISH Network LLC,* Case No. 6-19-cv-00716, Docket No. 72; also filed in Broadband iTV, Inc. v. AT&T Services, Inc et al. and Broadband iTV, Inc. v. *DirecTV, LLC,* Case No. 1-20-cv-00717, Docket No. 68, Filed Oct. 8, 2020.
Patent Owner's Preliminary Response, Paper No. 9, Filed in Case No. IPR2020-01280 on Nov. 9, 2020.
Patent Owner's Response to Petitioner's Ranking of Multiple Petitions, Paper No. 8, Filed in Case No. IPR2020-01280 on Nov. 9, 2020.
Patent Owner's Response to Petitioner's Ranking of Multiple Petitions, Paper No. 8, Filed in Case No. IPR2020-01281 on Nov. 9, 2020.
Patent Owner's Preliminary Response, Paper No. 9, Filed in Case No. IPR2020-01281 on Nov. 9, 2020.
Patent Owner's Response to Petitioner's Ranking of Multiple Petitions, Paper No. 7, Filed in Case No. IPR2020-01359 on Nov. 18, 2020.
Patent Owner's Preliminary Response, Paper No. 8, Filed in Case No. IPR2020-01359 on Nov. 18, 2020.
Patent Owner's Response to Petitioner's Ranking of Multiple Petitions, Paper No. 7, Filed in Case No. IPR2020-01360 on Nov. 18, 2020.
Patent Owner's Preliminary Response, Paper No. 8, Filed in Case No. IPR2020-01360 on Nov. 18, 2020.
Patent Owner's Response to Petitioner's Ranking of Multiple Petitions, Paper No. 8, Filed in Case No. IPR2020-01332 on Nov. 18, 2020.
Patent Owner's Preliminary Response, Paper No. 9, Filed in Case No. IPR2020-01332 on Nov. 18, 2020.
Patent Owner's Response to Petitioner's Ranking of Multiple Petitions, Paper No. 8, Filed in Case No. IPR2020-01333 on Nov. 18, 2020.
Patent Owner's Preliminary Response, Paper No. 9, Filed in Case No. IPR2020-01333 on Nov. 18, 2020.
Claim Construction Order filed in *Broadband iTV, Inc. v. AT&T Services, Inc. et al. and Broadband iTV, Inc. v. DirecTV, LLC,* Case No. 1-20-cv-00717, Docket No. 74, Filed Nov. 20, 2020.
U.S. Appl. No. 16/730,028, filed Dec. 30, 2019, Issuing Apr. 20, 2021.
U.S. Appl. No. 16/477,568, filed Jun. 20, 2019, Issued as U.S. Pat. No. 10,785,517.
U.S. Appl. No. 16/671,968, filed Nov. 1, 2019, Issuing Apr. 20, 2021.
U.S. Appl. No. 16/947,320, filed Jul. 28, 2020, Pending.
U.S. Appl. No. 16/948,600, filed Sep. 24, 2020, Pending.
U.S. Appl. No. 16/777,468, filed Jan. 30, 2020, Issuing Apr. 20, 2021.
U.S. Appl. No. 16/785,224, filed Feb. 7, 2020 Allowed Jan. 11, 2021.
U.S. Appl. No. 16/803,496, filed Feb. 27, 2020, Allowed Jan. 11, 2021.
*Broadband iTV, Inc. v. Time Warner Cable, Inc., et al.,* No. 15-cv-00131 (D. Haw. 2014), Summary Judgment denied to TWC based on prior art cited by Time Warner Cable, Inc. (TWC); Summary Judgment Entered in favor of TWC based on 35 U.S.C. 101; Federal Circuit affirmance, without opinion, of Summary Judgment denial to TWC based on prior art cited by TWC and of Summary Judgment Entered in favor of TWC Sept 26, 2016; Petition to U.S. Supreme Court for Writ of Certiorari Apr. 13, 2017; Petition Denied May 22, 2017 (litigation terminated).
*Broadband iTV, Inc. v. DISH Network LLC,* No. 6-19-cv-00716 (W.D. Tex 2019), filed Dec. 19, 2019, Asserted Patents: U.S. Pat. No. 10,028,026 (CIP1-D9); U.S. Pat. No. 10,506,269 (CIP1-D14); U.S. Pat. No. 9,998,791 (P1-D15); and U.S. Pat. No. 9,648,388 (P1-D13); Order Denying DISH's Motion to Dismiss Without Prejudice issued Jul. 25, 2020; Answer to Complaint filed Aug. 10, 2020; Claim Construction Order adopting each of BBiTV's Claim Constructions issued Nov. 20, 2020; Discovery ongoing.
*Broadband iTV, Inc. v. AT&T Services, Inc. et al.,* No. 1-20-cv-00717 (W.D. Tex. 2020), filed Dec. 17, 2019, Asserted Patents: U.S. Pat. No. 10,028,026 (CIP1-D9); U.S. Pat. No. 10,349,101 (CIP1-D12); U.S. Pat. No. 10,506,269 (CIP1-D14); U.S. Pat. No. 9,998,791 (P1-D15); and U.S. Pat. No. 9,648,388 (P1-D13).
*Broadband iTV, Inc. v. DirecTV, LLC f/k/a DirecTV, Inc.,* (W.D. Tex. 2020), Case transferred to Austin Division from Waco Division on Jul. 6,2020, Claim Construction Order adopting each of BBiTV's Claim Constructions issued Nov. 20, 2020; First Amended Answer and Counterclaims filed by AT&T Services, Inc. filed Feb. 4, 2021; Second Amended Answer filed by AT&T Communications, LLC filed Feb. 4, 2021; First Amended Answer and Counterclaims filed by DirecTV, LLC filed Feb. 4, 2021; Answer to Counterclaims to AT&T Service Inc.'s First Amended Counterclaims First Amended Counterclaims filed by Broadband iTV, Inc. filed Feb. 25, 2021; Answer to Counterclaims to DirecTV, LLC's First Amended Counterclaims filed by Broadband iTV, Inc. filed Feb. 25, 2021; Briefing on Defendant's Opposed Motion for Reconsideration of the Court's Claim Construction Order on the "Was Uploaded" Terms of the '388, '026, and '269 Patents Based on Newly Discovered Evidence ongoing; Briefing on AT&T's Motion for Partial Summary Judgment of No Written Description Support for the Asserted Claims of the '388 and '791 Patents and Invalidity for Anticipation ongoing; Discovery ongoing.
*Broadband iTV, Inc. v. Amazon.com Services LLC f/k/a Amazon.com Services, Inc. et al.,* No. 6:20-cv-00921 (W.D. Tex. 2020), filed Oct. 16, 2020, Asserted Patents: U.S. Pat. No. 10,028,026 (CIP1- D9); U.S. Pat. No. 10,506,269 (CIP1-D14); U.S. Pat. No. 9,648,388 (P1-D13); U.S. Pat. No. 10,536,750 (P1-D27); U.S. Pat. No. 10,536,751 (P1-D28); U.S. Pat. No. 9,973,825 (CIP2- D12); Complaint filed Oct. 6, 2020; Answer to Complaint filed Dec. 11, 2020; Discovery ongoing.
IPR2020-01267, *DISH Network, L.L.C. v. Broadband iTV Inc. (BBiTV),* filed Jul. 10, 2020, U.S. Pat. No. 10,028,026, Petition for IPR filed against claims 1-16; Institution of IPR Granted by PTAB Jan. 21, 2021; Decision Denying Patent Owner's Request for Rehearing of Decision on Institution Apr. 1, 2021.
IPR2020-01268, *DISH Network, L.L.C. v. Broadband iTV Inc. (BBiTV),* Jul. 10, 2020, U.S. Pat. No. 10,028,026, Petition for IPR filed against claims 1-16; Institution of IPR Denied by PTAB Jan. 21, 2021.
IPR2020-01280, *DISH Network, L.L.C. v. Broadband iTV, Inc. (BBiTV),* Jul. 20, 2020, U.S. Pat. No. 9,998,791, Petition for IPR filed against claims 1-3, 5-12, 14-18; Institution of IPR Granted by PTAB Feb. 4, 2021; Decision Denying Patent Owner's Request for Rehearing of Decision on Institution Apr. 1, 2021.
IPR2020-01281, *DISH Network, L.L.C. v. Broadband iTV, Inc. (BBiTV),* Jul. 20, 2020, U.S. Pat. No. 9,998,791, Petition for IPR filed against claims 1-3, 6-12, 14-18; Institution of IPR Denied by PTAB Feb. 4, 2021.
IPR2020-01332, *DISH Network, L.L.C. v. Broadband iTV, Inc. (BBiTV),* filed Jul. 24, 2020, U.S. Pat. No. 10,506,269, Petition for IPR filed against claims 1-17; Institution of IPR Granted by PTAB Jan. 27, 2021; Decision Denying Patent Owner's Request for Rehearing of Decision Granting Institution of Inter Partes Review Apr. 1, 2021.
IPR2020-01359, *DISH Network, L.L.C. v. Broadband iTV, Inc. (BBiTV),* filed Jul. 31, 2020, U.S. Pat. No. 9,648,388, Petition for IPR filed against claims 1-19; Decision Denying Patent Owner's Request for Rehearing of Decision on Institution Apr. 1, 2021.

(56) References Cited

OTHER PUBLICATIONS

IPR2021-00556, *AT&T Services, Inc. and DirecTV, LLC* v. *Broadband iTV, Inc.(BBiTV)*, filed Feb. 19, 2021, U.S. Pat. No. 10,028,026, Petition for IPR filed against claims 1-16; Motion for Joinder of Inter Partes Review IPR2020-01267 filed Feb. 19, 2021.
IPR2021-00603, *AT&T Services, Inc. and DirecTV, LLC* v. *Broadband iTV, Inc.(BBiTV)*, filed Mar. 4, 2021, U.S. Pat. No. 9,998,791, Petition for IPR filed against claims 1-3, 5-12, 14-18; Motion for Joinder of Inter Partes Review IPR2020-01280 filed Mar. 4, 2021.
IPR2021-00649, *AT&T Services, Inc. and DirecTV, LLC* v. *Broadband iTV, Inc.(BBiTV)*, filed Mar. 12, 2021, U.S. Pat. No. 9,648,388, Petition for IPR filed against claims 1-19; Motion for Joinder of Inter Partes Review IPR2020-01359 filed Mar. 12, 2021.
*Broadband iTV, Inc.,* v. *AT&T Services, Inc. and AT&T Communications, LLC and Broadband iTV, Inc.,* v. *DirecTV, LLC;* Preliminary Invalidity Contentions of AT&T Services, Inc., AT&T Communications, LLC, and DirecTV, LLC; Case No. 6:19-cv-712-ADA (consolidated with No. 6:19-cv-714-ADA); Jun. 25, 2020; 79 pages.
*Broadband iTV, Inc.,* v. *Dish Network L.L.C.'s* Preliminary Invalidity Contentions ; Case No. 6:19-cv-716-ADA; Jun. 25, 2020, 64 pages.
Scheffler, "Ingest & Metadata Partitioning: Requirements for Television on Demand" (2003).
VOD over IP White Paper, Seachange, dated Jun. 2003 (available at https://web.archive.org/web/20030427004353/http://www.schange.com/Downloads/IP_Streaming/VODOVERIP_WhitePaper.pdf (archive date Apr. 27, 2003)).
Seachange Video-on-Demand Brochure, Seachange, dated 2003 (available at https://web.archive.org/web/20031004070441/http://www.schange.com/Downloads/ITV/SC-VOD-Brochure.pdf (archive date Oct. 2003).
Seachange VODLink Overview Brochure, Seachange, dated 2003 (available at https://web.archive.org/web/20030811012149/http://www.schange.com/Downloads/ITV/VODlink_brochure.pdf (archive date Aug. 2003)).
Seachange VODLink Network Brochure, Seachange, dated 2003 (available at https://web.archive.org/web/20030811012149/http://www.schange.com/Downloads/ITV/VodLink_NETWORK.pdf (archive date Aug. 2003).
Seachange VOD Commercials dated 2003, (available at https://web.archive.org/web/20031003001401/http://www.schange.com/Video_archive.asp).
Inside i-Guide User's Reference Manual, https://ccvn.com/wordpress/wp-content/uploads/2016/11/iGuide-User-Manual.pdf (Internet) 52 pages.
Time Warner Pegasus Technical Documentation; previously submitted as Time Warner Cable, Pegasus Interactive Services Architecture, Version 1.4 (Jun. 5, 2003); Time Warner Cable, Pegasus Movies on Demand Content Specification, Version 1.3 (Sep. 29, 2000) and Time Warner Cable, Pegasus Overall Flow: Movie Delivery, Version 1.0 (Feb. 18, 2004).
ETSI Electronic Programme Guide (EPG) Protocol for a TV Guide Using Electronic Data Transmission (ETSI EN 300 707 V1.2.1 (2003-2004)), 89 pages.
CableLabs Video-On-Demand Content Specifications Version 1.1, Sep. 27, 2002, 41 pages.
A Digital Television Navigator Article, Chengyun Peng, Artur Lugmayrand Petri Vuorimaa, Kluwer Academic Publishers, 121-141, May 2002.
ETSI TS 102 822-1 Technical Specification, Broadcast and On-line Services: Search, select, and rightful use of content on personal storage systems ("TV-Anytime Phase 1"); Part 1: Phase 1 Benchmark Features (V.1.1.1 (Oct. 2003)).
ETSI TS 102 822-2 Technical Specification, Broadcast and On-line Services: Search, select, and rightful use of content on personal storage systems ("TV-Anytime Phase 1"); Part 2: System description (V.1 1.1 (Oct. 2003)).

Diego Moxi Interface.
Seachange VOD Commercials dated 2003, (available at https://web.archive.org/web/20031003001401/http://www.schange.com/Video_archive.asp and as produced with Defendants' invalidity productions.
U.S. Appl. No. 60/560,146, filed Apr. 7, 2004 (Haberman et al.).
ETSI TS 102 822-3-1: "Broadcast and On-line Services: Search, select, and rightful use of content on personal storage systems ("TV-Anytime Phase 1"); Part 3: Metadata; Sub-part 1: Metadata schemas". https://www.etsi.org/deliver/etsi_ts/102800_102899/1028220301/01.02.01_60/ts_1028220301v010201p.pdf.
ETSI TS 102 822-3-2: "Broadcast and On-line Services: Search, select, and rightful use of content on personal storage systems ("TV-Anytime Phase 1"); Part 3: Metadata; Sub-part 2: System aspects in a uni-directional environment". https://www.etsi.org/deliver/etsi_ts/102800_102899/1028220302/01.01.01_60/ts_1028220302v010101p.pdf.
ETSI TS 102 822-4: "Broadcast and On-line Services: Search, select, and rightful use of content on personal storage systems ("TV-Anytime Phase 1"); Part 4: Content Referencing". https://www.etsi.org/deliver/etsi_ts/102800_102899/10282204/01.01.01_60/ts_10282204v010101p.pdf.
ETSI TS 102 822-6-1: "Broadcast and On-line Services: Search, select, and rightful use of content on personal storage systems ("TV-Anytime Phase 1"); Part 6: Delivery of metadata over a bi-directional network; Sub-part 1: Service and transport", https://www.etsi.org/deliver/etsi_ts/102800_102899/1028220601/01.01.01_60/ts_1028220601v010101 p.pdf.
ETSI TS 102 822-6-2: "Broadcast and On-line Services: Search, select, and rightful use of content on personal storage systems ("TV-Anytime Phase 1"); Part 6: Delivery of metadata over a bi-directional network; Sub-part 2: Service discovery", https://www.etsi.org/deliver/etsi_ts/102800_102899/1028220602/01.01.01_60/ts_1028220602v010101p.pdf.
ETSI TS 102 822-7: "Broadcast and On-line Services: Search, select, and rightful use of content on personal storage systems ("TV-Anytime Phase 1"); Part 7: Bi-directional metadata delivery protection". https://www.etsi.org/deliver/etsi_TS/102800_102899/10282207/01.01.01_60/ts_10282207v010101 p.pdf.
VOD over IP White Paper, Seachange, dated Jun. 2003 (available at https://web.archive.org/web/20040726230400/http://www.schange.com/Downloads/IP_Streaming/VODOVERIP_WhitePaper.pdf (archive date Apr. 27, 2003)).
Petition for Inter Partes Review of U.S. Pat. No. 10,506,269, Case No. IPR 2020-01332 dated Jul. 24, 2020.
Power of Attorney, Case No. IPR 2020-01332 dated Jul. 24, 2020.
Explanation of Multiple Petitions Challenging U.S. Pat. No. 10,506,269 and Ranking of Petitions, Case No. IPR 2020-01332 dated Jul. 24, 2020.
Ex. 1032 Nintendo DS browser article, https://archive.is/20120525/http://www.opera.com/pressreleases/en/2006/02/15/ , Case No. IPR 2020-01332 filed Jul. 24, 2020.
Ex. 1035 OCAP Home Networking Extension Specification, OC-SP-OCAP-HNEXT1.0-I01-050519, Case No. IPR 2020-01332 filed Jul. 24, 2020.
Ex. 1037 ZIP File Wikipedia page, https://en.wikipedia.org/wiki/Zip_(file_format), Case No. IPR 2020-01332 filed Jul. 24, 2020.
Ex. 1041 Outlook.com Wikipedia page, https://en.wikipedia.org/wiki/Outlook.com#Launch_of_Hotmail, Case No. IPR 2020-01332 filed Jul. 24, 2020.
Ex. 1042 Yahoo! Mail Wikipedia page, https://en.wikipedia.org/wiki/Yahoo!_Mail, Case No. IPR 2020-01332 filed Jul. 24, 2020.
Ex. 1043 PayPal Wikipedia page, https://en.wikipedia.org/wiki/PayPal#Early_history, Case No. IPR 2020-01332 filed Jul. 24, 2020.
Petition for Inter Partes Review of U.S. Pat. No. 10,506,269, Case No. IPR 2020-01333 dated Jul. 24, 2020.
Power of Attorney, Case No. IPR 2020-01333 dated Jul. 24, 2020.
Explanation of Multiple Petitions Challenging U.S. Pat. No. 10,506,269 and Ranking of Petitions, Case No. IPR 2020-01333 dated Jul. 24, 2020.
Ex. 1103 Declaration of Dr. Samuel H. Russ, Ph.D., Case No. IPR 2020-01333 filed Jul. 24, 2020.
Ex. 1111 Declaration of Christie Poland, Case No. IPR 2020-01333 filed Jul. 24, 2020.

(56) References Cited

OTHER PUBLICATIONS

*Broadband iTV, Inc.* v. *DISH Network LLC*, WDTX-6-19-cv-00716—Text Order issued Jul. 25, 2020.
*Broadband iTV, Inc.*, v. *Dish Network, L.L.C.*, W.D. Tex., Motion to Dismiss by DISH Network, L.L.C, with All Corresponding Exhibits, ECF No. 17, Case No. 6:19-cv-716-ADA dated Feb. 24, 2020.
*Broadband iTV, Inc.*, v. *Dish Network, L.L.C.*, W.D. Tex., Response in Opposition to Motion, filed by Broadband iTV, Inc., re 17 Motion to Dismiss filed by Defendant DISH Network, L.L.C, with All Corresponding Exhibits, ECF No. 28, Case No. 6:19-cv-716-ADA dated Mar. 30, 2020.
*Broadband iTV, Inc.*, v. *Dish Network, L.L.C.*, W.D. Tex., Response in Support, filed by DISH Network, L.L.C., re 17 Motion to Dismiss filed by Defendant DISH Network, L.L.C., ECF No. 32, Case No. 6:19-cv-716-ADA dated Apr. 6, 2020.
Defendants' Opening Claim Construction Brief filed in *Broadband iTV, Inc.* v. *DISH Network LLC*, Case No. 6-19-cv-00716. Docket No. 56; also filed in *Broadband iTV, Inc.* v. *AT&T Services, Inc. et al. and Broadband iTV, Inc.* v. *DirecTV, LLC*, Case No. 1-20-cv-00717, Docket No. 58, Filed Sep. 10, 2020.
Declaration of Roger Fulghum with Exhibits 1-23 filed in *Broadband iTV, Inc.* v. *AT&T Services, Inc. et al. and Broadband iTV, Inc.* v. *DirecTV, LLC*, Case No. 1-20-cv-00717, Docket No. 58-1 and Exhibits at Docket Nos. 58-2 through 58-24; Exhibits also filed in *Broadband iTV, Inc.* v. *DISH Network LLC*, Case No. 6-19-cv-00716, Docket No. 56-1 through 56-23, Filed Sep. 10, 2020.
Expert Declaration of Anthony Wechselberger filed in *Broadband iTV, Inc.* v. *DISH Network LLC*, Case No. 6-19-cv-00716, Docket No. 56-7; also filed in *Broadband iTV, Inc.* v. *AT&T Services, Inc. et al. and Broadband iTV, Inc.* v. *DirecTV, LLC*, Case No. 1-20-cv-00717, Docket No. 58-8, Filed Sep. 10, 2020.
Plaintiff Broadband iTV, Inc.'s Opening Claim Construction Brief filed in *Broadband iTV, Inc.* v. *DISH Network LLC*, Case No. 6-19-cv-00716, Docket No. 62; also filed in *Broadband iTV, Inc.* v. *AT&T Services, Inc. et al. and Broadband iTV, Inc.* v.*DirecTV, LLC*, Case No. 1-20-cv-00717, Docket No. 64, Filed Sep. 18, 2020.
Declaration of Jeremiah A. Armstrong with Exhibits 1-30 filed in *Broadband iTV, Inc.* v. *DISH Network LLC*, Case No. 6-19-cv-00716, Docket No. 62-1 and Exhibits at Docket Nos. 62-2 through 62-32; also filed in *Broadband iTV, Inc.* v. *AT&T Services, Inc. et al. and Broadband iTV, Inc.* v. *DirecTV, LLC*, Case No. 1-20-cv-00717, Docket No. 64-1 and Exhibits at Docket Nos. 64-2 through 64-32, Filed Sep. 18, 2020.
Expert Declaration of Michael Shamos, Ph D., J.D. filed in *Broadband iTV, Inc.* v. *DISH Network LLC*, Case No. 6-19-cv-00716. Docket No. 62-8; also filed in *Broadband iTV, Inc.* v. *AT&T Services, Inc. et al. and Broadband iTV, Inc.* v. *DirecTV, LLC*, Case No. 1-20-cv-00717, Docket No. 64-8-, Filed Sep. 18, 2020.
Defendants' Responsive Claim Construction Brief filed in *Broadband iTV, Inc.* v. *DISH Network LLC*, Case No. 6-19-cv-00716. Docket No. 64; also filed in *Broadband iTV, Inc.* v. *AT&T Services, Inc. et al. and Broadband iTV, Inc.* v. *DirecTV, LLC*, Case No. 1-20-cv-00717, Docket No. 66, Filed Oct. 8, 2020.
Declaration of Roger Fulghum with Exhibits 24-36 filed in *Broadband iTV, Inc.* v. *AT&T Services, Inc. et al. and Broadband iTV, Inc.* v. *DirecTV, LLC*, Case No. 1-20-cv-00717, Docket No. 66-1 and Exhibits at Docket Nos. 66-2 through 66-14; Exhibits also filed in *Broadband iTV, Inc.* v. *DISH Network LLC*, Case No. 6-19-cv-00716, Docket Nos. 34-1 through 64-13; also filed in, Filed Oct. 8, 2020.
Plaintiff Broadband iTV, Inc.'s Responsive Claim Construction Brief filed in *Broadband iTV, Inc.* v. *DISH Network LLC*, Case No. 6-19-cv-00716, Docket No. 65; also filed in *Broadband iTV, Inc.* v. *AT&T Services, Inc. et al. and Broadband TV, Inc.* v. *DirecTV, LLC*, Case No. 1-20-cv-00717, Docket No. 68, Filed Oct. 8, 2020.
Declaration of Jeremiah A. Armstrong with Exhibits 31-36 filed in *Broadband iTV, Inc.* v. *DISH Network LLC*, Case No. 6-19-CV-00716, Docket No. 65-1 and Exhibits at Docket Nos. 65-2 through 65-7; also filed in *Broadband iTV, Inc.* v. *AT&T Services, Inc. et al. and Broadband iTV, Inc.* v *DirecTV, LLC*, Case No. 1-20-cv-00717, Docket No. 68-1 and Exhibits at Docket Nos. 68-2 through 68-7, Filed Oct. 8, 2020.
Complaint for Patent Infringement filed in *Broadband iTV, Inc.* v. *Amazon.com Services LLC f/k/a Amazon.com Services, Inc. et al.*, Case No. 6-20-cv-00921, Docket No. 1 filed Oct. 6, 2020.
Defendants' Reply on Defendants' Opposed Motion for Reconsideration of the Court's Claim Construction Order on the "Was Uploaded" Terms of the '388, '026, and '269 Patnets Based on Newly Discovered Evidence, filed in *Broadband iTV, Inc.* v. *AT&T Services, Inc. et al. and Broadband iTV, Inc.* v. *DirecTV, LLC*, Case No. 1-20-cv-00717, Docket No. 106, Filed Apr. 16, 2021.
Order Denying DISH Network LLC's Corrected Motion to Transfer Case (Dkt. 37), issued in *Broadband iTV, Inc.* v. *DISH Network LLC*, Case No. 6-19-cv-00716, Docket No. 83, Filed Apr. 20, 2021.
Petitioner's Reply in Support of Motion for Joinder to Inter Partes Review IPR2020-01267, Paper No. 10, filed in *AT&T Services, Inc. et al.* v. *Broadband iTV, Inc.*, Case No. IPR2021-00556 on Apr. 19, 2021.
Patent Owner's Opposition to Petitioner's Motion for Joinder of Inter Partes Review IPR2020-01280, Paper No. 8, filed in *AT&T Services, Inc. et al.* v. *Broadband iTV, Inc.*, Case No. IPR2021-00603 on Apr. 19, 2021.
Exhibit 2001—Board Email (IPR2021-00603), filed in Inter Partes Review IPR2021-00603 on Apr. 19, 2021.
Patent Owner's Opposition to Petitioner's Motion for Joinder of Inter Partes Review IPR2020-01359, Paper No. 7, filed in *AT&T Services, Inc. et al.* v. *Broadband iTV, Inc.*, Case No. IPR2021-00649 on Apr. 19, 2021.
Exhibit 2001—Board Email (IPR2021-00649), filed in Inter Partes Review IPR2021-00649 on Apr. 19, 2021.
Order Granting Petitioner's Motions to Submit Supplemental Information 37 C.F.R. § 42.123, Paper No. 30, issued in *DISH Network LLC* v. *Broadband iTV, Inc.*, Case No. IPR 2020-01280 on Apr. 12, 2021.
Exhibit 1033—TIB Library copy of Scheffler Article, filed in Inter Partes Review IPR2020-01280 on Mar. 18, 2021.
Exhibit 103—Librarian Declaration RE Scheffler, filed in Inter Partes Review IPR2020-01280 on Mar. 18, 2021.
Exhibit 1035—K. Patrick Herman Declaration, filed in Inter Partes Review IPR2020-01280 on Mar. 18, 2021.
Exhibit 1036—Scheffler Copyright Record, filed in Inter Partes Review IPR2020-01280 on Mar. 18, 2021.
Order Granting Petitioner's Motions to Submit Supplemental Information 37 C.F.R. § 42.123, Paper No. 26, issued in *DISH Network LLC* v. *Broadband iTV, Inc.*, Case No. IPR2020-01359 on Apr. 12, 2021.
Exhibit 1033—TIB Library copy of Scheffler Article, filed in Inter Partes Review IPR2020-01359 on Mar. 18, 2021.
Exhibit 1034—Librarian Declaration RE Scheffler, filed in Inter Partes Review IPR2020-01359 on Mar. 18, 2021.
Exhibit 1035—K. Patrick Herman Declaration, filed in Inter Partes Review IPR2020-01359 on Mar. 18, 2021.
Exhibit 1036—Scheffler Copyright Record, filed in Inter Partes Review IPR2020-01359 on Mar. 18, 2021.
Public Version of Patent Owner's Response, Paper No. 36, filed in *DISH Network LLC* v. *Broadband iTV, Inc.*, Case No. IPR 2020-01267 on May 10, 2021.
Exhibit No. 2035—Michael Shamos Declaration (Public Version), filed in *DISH Network LLC* v. *Broadband iTV, Inc.*, Case No. IPR 2020-01267 on May 10, 2021.
Exhibit No. 2036—Milton Diaz Perez Declaration (Public Version), filed in *DISH Network LLC* v. *Broadband iTV, Inc.*, Case No. IPR 2020-01267 on May 10, 2021.
Exhibit No. 2037—Leighton Chong Declaration (Public Version), filed in *DISH Network LLC* v. *Broadband iTV, Inc.*, Case No. IPR 2020-01267 on May 10, 2021.
Exhibit No. 2038—Clif Kagawa Declaration (Public Version), filed in *DISH Network LLC* v. *Broadband iTV, Inc.*, Case No. IPR 2020-01267 on May 10, 2021.
Exhibit No. 2039—Deposition Transcript of Dr. Samuel Russ, Apr. 30, 2021 (Public Version), filed in *DISH Network LLC* v. *Broadband iTV, Inc.*, Case No. IPR 2020-01267 on May 10, 2021.

(56) References Cited

OTHER PUBLICATIONS

Exhibit No. 2040—"Why Comcast Leads the Pack," Bloomberg, May 31, 2001 (Public Version), filed in *DISH Network LLC v. Broadband iTV, Inc.*, Case No. IPR 2020-01267 on May 10, 2021.
Exhibit No. 2041 Comcast Fact Sheet (Public Version), filed in *DISH Network LLC v. Broadband iTV, Inc.*, Case No. PR 2020-01267 on May 10, 2021.
Exhibit No. 2042—"How It Works: Video on Demand Is Ready, but the Market Is Not," New York Times, Oct. 10, 2002 (Public Version), filed in *DISH Network LLC v. Broadband iTV, Inc.*, Case No. IPR 2020-01267 on May 10, 2021.
Exhibit No. 2043—"Behind Comcast's video-on-demand growth" dated Oct. 4, 2004, available at https :/ /money .cnn.com/2004/10/ 04/technology/techinvestor/hellwegjindex.htm (Public Version), filed in *DISH Network LLC v. Broadband TV, Inc.*, Case No. IPR 2020-01267 on May 10, 2021.
Exhibit No. 2044—Comcast press release dated Jan. 8, 2008, available at https ://corporate.comcast.com/news-information/ newsfeed/comcas t-ceo-brian-1-ro berts-announces-proj ect-infinitystrategy-to-de liver-exponentially-more-con tent-cho ice-on-tv (Public Version), filed in *DISH Network LLC v. Broadband iTV, Inc.*, Case No. IPR 2020-01267 on May 10, 2021.
Exhibit No. 2045—"Comcast's Road to 20 Billion VOD Views" dated Aug. 10, 2011, available at https //www.multichannel.com/ news/comcast-s-road-20-billion-vod-views-327466 (Public Version), filed in *DISH Network LLC v. Broadband iTV, Inc.*, Case No. IPR 2020-01267 on May 10, 2021.
Exhibit No. 2046—Comcast press release dated Mar. 31, 2009, available at https://www.prlog.org/10880181-comcast-media-center-tointroduce-express-lane-service-for-video-on-demand-contentproviders-at.html (Public Version), filed in *DISH Network LLC v. Broadband iTV, Inc.*, Case No. IPR 2020-01267 on May 10, 2021.
Exhibit No. 2062—U.S. Appl. No. 10/909,192 (Public Version), filed in *DISH Network LLC v. Broadband TV, Inc.*, Case No. IPR 2020-01267 on May 10, 2021.
Exhibit No. 2069—U.S. Patent Application Publication No. 2002/ 0066106 (Public Version), filed in *DISH Network LLC v. Broadband iTV, Inc.*, Case No. IPR 2020-01267 on May 10, 2021.
Exhibit No. 2071 "Servlet" definition: httos ://www.oracle.com/ iava/technologies/servlet-technology.html (Public Version), filed in *DISH Network LLC v. Broadband iTV, Inc* , Case No. IPR 2020-01267 on May 10, 2021.
Exhibit No. 2072—"February Presentation" (demo-nissan-infinity-Feb. 18, 04.ppt) (Public Version), filed in *DISH Network LLC v. Broadband iTV, Inc.*, Case No. IPR 2020-01267 on May 10, 2021.
Exhibit No. 2103—Declaration of Michael Kunkel (Public Version), filed in *DISH Network LLC v. Broadband iTV, Inc.*, Case No. IPR 2020-01267 on May 10, 2021.
Exhibit No. 2110—Fig la vod content delivery system arch.doc (5/23, 6/27) (Public Version), filed in *DISH Network LLC v. Broadband iTV, Inc.*, Case No. IPR 2020-01267 on May 10, 2021.
Exhibit No. 2111—Fig lb drill down navigation example.ppt (10/1, 6/27) (Public Version), filed in *DISH Network LLC v. Broadband iTV, Inc.*, Case No. IPR 2020-01267 on May 10, 2021.
Exhibit No. 2112—Fig le template layer model.doc (6/20, 6/27) (Public Version), filed in *DISH Network LLC v. Broadband iTV, Inc.*, Case No. IPR 2020-01267 on May 10, 2021.
Exhibit No. 2113—Fig 2a classified ad system arch.doc (6/27, 6/28) (Public Version), filed in *DISH Network LLC v. Broadband iTV, Inc.*, Case No. IPR 2020-01267 on May 10, 2021.
Exhibit No. 2114—Fig 2b web-based ems.doc (6/27, 6/29) (Public Version), filed in *DISH Network LLC v. Broadband TV, Inc.*, Case No. IPR 2020-01267 on May 10, 2021.
Exhibit No. 2115—Fig 2c Content Screening Systemdoc (6/29) (Public Version), filed in *DISH Network LLC v. Broadband iTV, Inc.*, Case No. IPR 2020-01267 on May 10, 2021.
Exhibit No. 2116—Fig 2d content feed and conversion system.doc (6/29) (Public Version), filed in *DISH Network LLC v. Broadband iTV, Inc.*, Case No. IPR 2020-01267 on May 10, 2021.

Exhibit No. 2152—Claim Construction Order, *Broadband iTV v. DISH; Broadband iTV v. AT&T and DirecTV (Public Version)*, filed in *DISH Network LLC v. Broadband iTV, Inc.*, Case No. IPR 2020-01267 on May 10, 2021.
Exhibit No. 2167—Ericsson R320s—cellular phone—GSM Series Specs, CNET (Public Version), filed in *DISH Network LLC v. Broadband iTV, Inc.*, Case No. IPR 2020-01267 on May 10, 2021.
Exhibit No. 2168—Ericsson R320s User Manual, 2nd Ed., 1999 (Public Version), filed in *DISH Network LLC v. Broadband iTV, Inc.*, Case No. IPR 2020-01267 on May 10, 2021.
Exhibit No. 2169—Palm VII Series Specs, CNET (Public Version), filed in *DISH Network LLC v. Broadband iTV, Inc.*, Case No. IPR 2020-01267 on May 10, 2021.
Exhibit No. 2170—Palm VII Series User Guide (Public Version), filed in *DISH Network LLC v. Broadband iTV, Inc.*, Case No. IPR 2020-01267 on May 10, 2021.
Exhibit No. 2171—U.S. Pat. No. 6,253,375 to Gordon et al. (Public Version), filed in *DISH Network LLC v. Broadband iTV, Inc.*, Case No. IPR 2020-01267 on May 10, 2021.
Exhibit No. 2172—U.S. Appl. No. 15/192,598 (Public Version), filed in *DISH Network LLC v. Broadband TV, Inc.*, Case No. IPR 2020-01267 on May 10, 2021.
Exhibit No. 2173—U.S. Appl. No. 60/253,350 (Public Version), filed in *DISH Network LLC v. Broadband iTV, Inc.*, Case No. IPR 2020-01267 on May 10, 2021.
U.S. Appl. No. 15/190,9954, filed Jun. 23, 2016, Issued as U.S. Pat. No. 9,641,896.
U.S. Appl. No. 16/730,028, filed Dec. 30, 2019, Revised Notice of Allowance Nov. 16, 2021.
U.S. Appl. No. 17/248,063, filed Jan. 7, 2021, Allowed Aug. 19, 2021.
U.S. Appl. No. 17/266,503, filed Apr. 9, 2021, Pending.
U.S. Appl. No. 12/632,745, filed Dec. 7, 2009, Issued as U.S. Pat. No. 9,113,228.
U.S. Appl. No. 13/830,961, filed Mar. 14, 2013, Abandoned—After Non-Final Office Action.
U.S. Appl. No. 16/671,968, filed Nov. 1, 2019, Revised Notice of Allowance Nov. 16, 2021.
U.S. Appl. No. 16/730,053, filed Dec. 30, 2019, Revised Notice of Allowance Nov. 16, 2021.
U.S. Appl. No. 16/947,320, filed Jul. 28, 2020, Revised Notice of Allowance Nov. 8, 2021.
U.S. Appl. No. 16/948,600, filed Sep. 24, 2020, Revised Notice of Allowance Nov. 18, 2021.
U.S. Appl. No. 17/206,409, filed Mar. 19, 2021, Non-Final Rejection Oct. 14, 2021.
U.S. Appl. No. 17/248,302, filed Jan. 19, 2021, Allowed Aug. 31, 2021.
U.S. Appl. No. 17/499,930, filed Oct. 4, 2021, Pending.
U.S. Appl. No. 17/503,018, filed Oct. 15, 2021, Pending—Reissue Application.
U.S. Appl. No. 15/002,001, filed Jan. 20, 2016, Issued as U.S. Pat. No. 9,641,902.
U.S. Appl. No. 16/777,468, filed Jan. 30, 2020, Revised Notice of Allowance Nov. 15, 2021.
U.S. Appl. No. 16/785,224, filed Feb. 7, 2020, QPIDS filed Oct. 21, 2021.
U.S. Appl. No. 16/803,496, filed Feb. 27, 2020, QPIDS filed Oct. 22, 2021.
U.S. Appl. No. 16/803,523, filed Feb. 27, 2020, Revised Notice of Allowance Nov. 17, 2021.
*Broadband iTV, Inc. v. Hawaiian Telcom, Inc., et al.*, No. 14-cv-00169 (D. Haw. 2017), filed Apr. 9, 2014, Summary Judgment entered in favor of Hawaiian Telcom, Inc. based on 35 U.S.C. 101 Federal Circuit affirmance, without opinion, of Summary Judgment in favor of Hawaiian Telcom, Inc. Sep. 26, 2016 Petition to U.S. Supreme Court for Writ of Certiorari Apr. 13, 2017 Petition Denied May 22, 2017 (litigation terminated).
*Broadband iTV, Inc. v. DISH Network LLC*, No. 1-21-cv-02687 (D. Col. 2021), filed Dec. 19, 2019, Asserted Patents: U.S. Pat. No. 10,028,026; U.S. Pat. No. 10,506,269; U.S. Pat. No. 9,998,791; and U.S. Pat. No. 9,648,388 Order Denying DISH's Motion to Dismiss Without Prejudice issued Jul. 25, 2020 Answer to Complaint filed

(56) References Cited

OTHER PUBLICATIONS

Aug. 10, 2020 Claim Construction Order adopting each of BBiTV's Claim Constructions issued Nov. 20, 2020 Order Denying DISH Network LLC's Corrected Motion to Transfer Case issued Apr. 20, 2021 Order Granting Joint Motion for Partial Dismissal of Certain Claims (Count II—Alleged Infringement of U.S. Pat. No. 10,506,269) issued Aug. 16, 2021 Briefing on Motion for Summary Judgment that Broadband iTV's Doctrine of Equivalents Infringement Theory Is Barred by Prosecution History Estoppel ongoing Briefing on Daubert Motion to Exclude Expert Testimony of Mr. Roy Weinstein ongoing Briefing on Motion for Summary Judgement that U.S. Pat. No. 10,026,026 Is Not Entitled to a 2004 Priority Date ongoing Briefing on Motion for Summary Judgment of Invalidity Under 35 U.S.C. § 101 ongoing Briefing on Motion for Summary Judgment of No Infringement of U.S. Pat. No. 10,026,026 ongoing Discovery ongoing.

*Broadband iTV, Inc.* v. *AT&T Services, Inc. et al.*, No. 1:20-cv-00717 (W.D. Tex. 2020), filed Dec. 17, 2019, Asserted Patents: U.S. Pat. No. 10,028,026; U.S. Pat. No. 10,349,101; U.S. Pat. No. 10,506,269; U.S. Pat. No. 9,998,791; and U.S. Pat. No. 9,648,388. *Broadband iTV, Inc.* v. *DirecTV, LLC f/k/a DirecTV, Inc.*, No. 1:20-cv-00717 (W.D. Tex. 2020), Case transferred to Austin Division from Waco Division on Jul. 6, 2020, Asserted Patents: U.S. Pat. No. 10,028,026; U.S. Pat. No. 10,349,101; U.S. Pat. No. 10,506,269; U.S. Pat. No. 9,998,791; and U.S. Pat. No. 9,648,388 Claim Construction Order adopting each of BBiTV's Claim Constructions issued Nov. 20, 2020 First Amended Answer and Counterclaims filed by AT&T Services, Inc. filed Feb. 4, 2021 Second Amended Answer filed by AT&T Communications, LLC filed Feb. 4, 2021 First Amended Answer and Counterclaims filed by DirecTV, LLC filed Feb. 4, 2021 Answer to Counterclaims to AT&T Service Inc.'s First Amended Briefing on Motion for Summary Judgment of Non-Infringement of the '026 Patent ongoing Briefing on Motion for Summary Judgment of No Inequitable Conduct ongoing Discovery ongoing Motion to Stay the Case as the Parties Have Reached an Agreement in Principle to Resolve the Lawsuit filed Oct. 14, 2021 Order Granting Motion to Stay Oct. 25, 2021 Motion to Extend the Stay Nov. 12, 2021.

*Broadband iTV, Inc.* v. *Amazon.com Services LLC f/k/a Amazon.com Services, Inc. et al.*, No. 6:20-cv-00921 (W.D. Tex. 2020), file Oct. 16, 2020, Asserted Patents: U.S. Pat. No. 10,028,026; U.S. Pat. No. 10,506,269; U.S. Pat. No. 9,648,388; U.S. Pat. No. 10,536,750; U.S. Pat. No. 10,536,751; U.S. Pat. No. 9,973,825 Amended Complaint filed Aug. 18, 2021 Answer to Amended Complaint filed Sep. 1, 2021 Claim Construction Order adopting predominantly adopting "Plain and Ordinary" Meaning issued Oct. 31, 2021 Discovery ongoing.

IPR2020-01267, *DISH Network, L.L.C.* v. *Broadband iTV, Inc.* (*BBiTV*), filed Jul. 10, 2020, U.S. Pat. No. 10,028,026, Petition for IPR filed against claims 1-16 Institution of IPR Granted by PTAB Jan. 21, 2021 Decision Denying Patent Owner's Request for Rehearing of Decision on Institution Apr. 1, 2021 Patent Owner's Response filed May 10, 2021 Petitioner's Reply filed Aug. 18, 2021 Patent Owner's Sur-Reply filed Sep. 8, 2021 Discovery ongoing.

IPR2020-01280, *DISH Network, L.L.C.* v. *Broadband iTV, Inc.* (*BBiTV*), filed Jul. 20, 2020, U.S. Pat. No. 9,998,791, Petition for IPR filed against claims 1-3, 5-12, 14-18 Institution of IPR Granted by PTAB Feb. 4, 2021 Decision Denying Patent Owner's Request for Rehearing of Decision on Institution Apr. 1, 2021 Patent Owner's Response filed May 21, 2021 Petitioner's Reply filed Aug. 13, 2021 Patent Owner's Sur-Reply filed Sep. 8, 2021 Discovery ongoing.

IPR2020-01359, *DISH Network, L.L.C.* v. *Broadband iTV, Inc.* (*BBiTV*), filed Jul. 31, 2020, U.S. Pat. No. 9,648,388, Petition for IPR filed against claims 1-19 Decision Denying Patent Owner's Request for Rehearing of Decision on Institution Apr. 1, 2021 Patent Owner's Response filed May 21, 2021 Petitioner's Reply filed Aug. 13, 2021 Patent Owner's Sur-Reply filed Sep. 8, 2021 Discovery ongoing.

Redacted Copy of AT&T's Reply in Support of its Motion for Summary Judgment that Broadband iTV's Doctrine of Equivalents Infiingement Theory is Barred by Prosecution History Estoppel filed in in *Broadband iTV, Inc.* v. *AT&T Services, Inc. et al.*, Case No. 1:20-cv-00717, Filed on Sep. 21, 2021.

Redacted Copy of Sealed Motion Motion for Summary Judgment That Broadband iTVs Doctrine of Equivalents Infringement Theory is Barred by Prosecution History Estoppel filed in in *Broadband iTV, Inc.* v. *AT&T Services, Inc. et al.*, Case No. 1:20-cv-00717, Filed on Sep. 2, 2021.

Redacted Copy of Opposition to Defendant's Motion for Summary Judgment That Broadband iTVs Doctrine of Equivalents Infiingement Theory is Barred by Prosecution History Estoppel filed in in *Broadband iTV, Inc.* v. *AT&T Services, Inc. et al.*, Case No. 1:20-cv-00717, Filed on Sep. 8, 2021.

Reply in Support of Motion for Summary Judgment of Invalidity Under 35 U.S.C. Section 101 by AT&T Communications, LLC, AT&T Services, Inc., DirecTV, LLC, filed in in *Broadband iTV, Inc.* v. *AT&T Services, Inc. et al.*, Case No. 1:20-cv-00717, Filed on Sep. 9, 2021.

Reply to Response in Opposition to Motion for Summary Judgment of No Inequitable Conduct, filed in in *Broadband iTV, Inc.* v. *AT&T Services, Inc. et al.*, Case No. 1:20-cv-00717, Filed on Sep. 9, 2021.

Reply to Response in Opposition to DISH Network L.L.C.'s Motion for Summary Judgment of Invalidity Under 35 U.S.C. § 101, filed in *Broadband iTV, Inc.* v. *DISH Network, LLC*, Case No. 6:19-cv-00716, Filed on Sep. 9, 2021.

Petition of Petitioner DISH Network L.L.C. for Writ of Mandamus, filed in In re: DISH Network L.L.C., Case No. 2021-182 (Federal Circuit), Filed Sep. 10, 2021.

Redacted Copy of Sealed Motion for Summary Judgment That Broadband iTV's Doctrine of Equivalents Infringement Theory is Barred by Prosecution History Estoppel, filed in filed in *Broadband iTV, Inc.* v. *DISH Network, LLC*, Case No. 3:19-cv-00716, Filed on Aug. 26, 2021.

Redacted Copy of Opposition to Motion Summary Judgment That Broadband iTV's Doctrine of Equivalents Infringement Theory is Barred by Prosecution History Estoppel, filed in filed in *Broadband iTV, Inc.* v. *DISH Network, LLC*, Case No. 6:19-cv-00716, Filed on Sep. 8, 2021.

Reply to Opposition Response to Motion for Summary Judgment That Broadband iTV's Doctrine of Equivalents Infringement Theory is Barred by Prosecution History Estoppel, filed in filed in *Broadband iTV, Inc.* v. *DISH Network, LLC*, Case No. 6:19-cv-00716, Filed on Sep. 9, 2021.

Claim Construction Order, issued in *Broadband iTV, Inc.* v. *Amazon.com, Inc., Amazon.com Services LLC f/k/a Amazon.com Services, Inc., et al.*, Case No. 6:20-cv-00921 (W.D. Tex), issued on Oct. 31, 2021.

Exhibit 2190 Public Version of Patent Owner's Demonstratives, filed in *DISH Network LLC* v. *Broadband iTV, Inc.*, Case No. IPR2020-01267 (P.T.A.B.), filed on Oct. 27, 2021.

Exhibit 2042 Public Version of Patent Owner's Demonstratives, filed in *DISH Network LLC* v. *Broadband iTV, Inc.*, Case No. IPR2020-01280 (P.T.A.B.), filed on Oct. 27, 2021.

Order Vacating the District Court's Denial of DISH's Motion to Transfer, and Directing the District Court to Grant the Transfer Motion, filed in In re: DISH Network L.L.C., 2021-182 (Federal Circuit), issued on Oct. 21, 2021.

Citation of Supplemental Authority pursuant to Fed. R. App. P. 28(j) for Petitioner DISH Network L.L.C., filed in In re: DISH Network L.L.C., Case No. 2021-148 (Federal Circuit), Filed Aug. 5, 2021.

Response of Respondent Broadband iTV, Inc. to Dockt No. [20], filed in In re: DISH Network L.L.C., Case No. 2021-148 (Federal Circuit), Filed Aug. 6, 2021.

Order Denying Petition for Writ of Mandamus filed by DISH Network L.L.C., issed in In re: DISH Network L.L.C., Case No. 2021-148 (Federal Circuit), Issued Aug. 13, 2021.

Responsive Claim Construction Brief of Amazon.com, Inc., Amazon.com Services LLC, and Amazon Web Services, Inc., filed in *Broadband iTV, Inc.* v. *Amazon.com, Inc., Amazon.com Services LLC f/k/a Amazon.com Services, Inc., et al.*, Case No. 6:20-cv-00921 (W.D. Tex.), Filed on Jul. 28, 2021.

(56) References Cited

OTHER PUBLICATIONS

Exhibit 7 Declaration of Leo Hoarty In Support of Responsive Claim Construction Brief of Amazon.com, Inc., Amazon.com Services LLC, and Amazon Web Services, Inc., filed in *Broadband iTV, Inc.* v. *Amazon.com, Inc., Amazon.com Services LLC f/k/a Amazon.com Services, Inc., et al.*, Case No. 6:20-cv-00921 (W.D. Tex.), Filed on Jul. 28, 2021.
Plaintiff Broadband iTV, Inc.'s Reply Claim Construction Brief, filed in *Broadband iTV, Inc.* v. *Amazon.com, Inc., Amazon.com Services LLC f/k/a Amazon.com Services, Inc., et al.*, Case No. 6:20-cv-00921 (W.D. Tex.), Filed on Aug. 5, 2021.
Exhibit 24 Second Declaration of Michael Shamos In Support of Plaintiff Broadband iTV, Inc.'s Reply Claim Construction Brief, filed in *Broadband iTV, Inc.* v. *Amazon.com, Inc., Amazon.com Services LLC f/k/a Amazon.com Services, Inc., et al.*, Case No. 6:20-cv-00921 (W.D. Tex.), Filed on Aug. 5, 2021.
Amended Complaint for Patent Infringement against Amazon Web Services, Inc., Amazon.com, Inc., Amazon.com Services LLC, filed in *Broadband iTV, Inc.* v. *Amazon.com, Inc., Amazon.com Services LLC f/k/a Amazon.com Services, Inc., et al.*, Case No. 6:20-cv-00921 (W.D. Tex.), Filed on Aug. 18, 2021.
Sur-Reply Claim Construction Brief of Amazon.com, Inc., Amazon.com Services LLC, and Amazon Web Services, Inc., filed in *Broadband iTV, Inc.* v. *Amazon.com, Inc., Amazon.com Services LLC f/k/a Amazon.com Services, Inc., et al.*, Case No. 6:20-cv-00921 (W.D. Tex.), Filed on Aug. 19, 2021.
Termination Decision Due to Settlement After Institution of Trial, Paper No. 37, filed in *DISH Network L.L.C.* v. *Broadband iTV, Inc.*, Case No. IPR 2020-01332 on Aug. 13, 2021.
Order Granting Joint Motion for Partial Dismissal of DISH's Alleged Infringement of U.S. Pat. No. 10,506,269 (D.I. 1, Count II), issued in *Broadband iTV, Inc.* v. *DISH Network LLC*, Case No. 6:19-cv-00716, Issued on Aug. 16, 2021.
Notice of Supplemental Authority on AT&T's Motion for Partial Summary Judgment of No Written Description Support for the Asserted Claims of the '388 and '791 Patents and Invalidity for Anticipation, filed in *Broadband iTV, Inc.* v. *AT&T Services, Inc. et al.*, Case No. 1:20-cv-00717, Filed on Jul. 15, 2021.
Petitioner's Reply, Paper No. 40, filed in *DISH Network L.L.C.* v. *Broadband iTV, Inc.*, Case No. IPR 2020-01359 on Aug. 13, 2021.
Exhibit 1039 Prosecution History of U.S. Patent Publication 2010/0153997 to Baumgartner, filed in *DISH Network L.L.C.* v. *Broadband iTV, Inc.*, Case No. IPR 2020-01280 and Case No. IPR 2020-01359 on Aug. 13, 2021.
Exhibit 1040 Transcript of the Jul. 29, 2021 Cross-Examination by Deposition of Michael I. Shamos, Ph.D., J.D., filed in *DISH Network L.L.C.* v. *Broadband iTV, Inc.*, Case No. IPR 2020-01280 and Case No. IPR 2020-01359 on Aug. 13, 2021.
Exhibit 1041 Second Declaration of Dr. Samuel H. Russ, Ph.D., filed in *DISH Network L.L.C.* v. *Broadband iTV, Inc.*, Case No. IPR 2020-01280 and Case No. IPR 2020-01359 on Aug. 13, 2021.
Exhibit 1042 Excerpts from the Aug. 9, 2021 Deposition of Hugh Smith, Ph.D. in *Broadband iTV, Inc.* v. *DISH Network L.L.C.*, Case No. 6:19-cv716-ADA (WDTX), filed in *DISH Network L.L.C.* v. *Broadband iTV, Inc.*, Case No. IPR 2020-01280 and Case No. IPR 2020-01359 on Aug. 13, 2021.
Exhibit 1043 Transcript of the Jul. 19, 2021 Cross-Examination by Deposition of Michael I. Shamos, Ph.D., J.D. in IPR2020-01267, filed in *DISH Network L.L.C.* v. *Broadband iTV, Inc.*, Case No. IPR 2020-01359 on Aug. 13, 2021.
Petitioner's Reply, Paper No. 44, filed in *DISH Network L.L.C.* v. *Broadband iTV, Inc.*, Case No. IPR 2020-01280 on Aug. 13, 2021.
Decision Granting Institution of Inter Partes Review and Granting Motion for Joinder, Paper No. 14, filed in *AT&T Services, Inc. and DirecTV, LLC* v. *Broadband iTV, Inc.*, Case No. IPR 2021-00556 on Aug. 25, 2021.
Decision Granting Institution of Inter Partes Review and Granting Motion for Joinder, Paper No. 13, filed in *AT&T Services, Inc. and DirecTV, LLC* v. *Broadband iTV, Inc.*, Case No. IPR 2021-00603 on Aug. 25, 2021.

Decision Granting Institution of Inter Partes Review and Granting Motion for Joinder, Paper No. 12, filed in *AT&T Services, Inc. and DirecTV, LLC* v. *Broadband iTV, Inc.*, Case No. IPR 2021-00649 on Aug. 25, 2021.
Answer to Amended Complaint for Patent Infringement, filed in *Broadband iTV, Inc.* v. *Amazon.com, Inc., Amazon.com Services LLC f/k/a Amazon.com Services, Inc., et al.*, Case No. 6:20-cv-00921 (W.D. Tex.), Filed on Sep. 1, 2021.
Patent Owner's Sur-Reply, Paper No. 50, filed in *DISH Network L.L.C.* v. *Broadband iTV, Inc.*, Case No. IPR 2020-01280 on Sep. 8, 2021.
Exhibit 2041 Deposition Transcript of Dr. Samuel H. Russ, Ph.D. on Sep. 2, 2021, filed in *DISH Network L.L.C.* v. *Broadband iTV, Inc.*, Case No. IPR 2020-01280 on Sep. 8, 2021.
Public Version of Patent Owner's Sur-Reply, Paper No. 49, filed in *DISH Network L.L.C.* v. *Broadband iTV, Inc.*, Case No. IPR 2020-01267 on Sep. 8, 2021.
Motion for Summary Judgment of Invalidity Under 35 U.S.C. Section 101 by AT&T Communications, LLC, AT&T Services, Inc., DirecTV, LLC, filed in in *Broadband iTV, Inc.* v. *AT&T Services, Inc. et al.*, Case No. 1:20-cv-00717, Filed on Aug. 19, 2021.
Response in Opposition to Motion for Summary Judgment of Invalidity Under 35 U.S.C. Section 101 by AT&T Communications, LLC, AT&T Services, Inc., DirecTV, LLC, filed in in *Broadband iTV, Inc.* v. *AT&T Services, Inc. et al.*, Case No. 1:20-cv-00717, Filed on Sep. 2, 2021.
Motion for Summary Judgment of No Inequitable Conduct by Broadband iTV, Inc., filed in in *Broadband iTV, Inc.* v. *AT&T Services, Inc. et al.*, Case No. 1:20-cv-00717, Filed on Aug. 19, 2021.
Response in Opposition to Motion for Summary Judgment of No Inequitable Conduct by Broadband iTV, Inc., filed in in *Broadband iTV, Inc.* v. *AT&T Services, Inc. et al.*, Case No. 1:20-cv-00717, Filed on Sep. 2, 2021.
Redacted Copy of Sealed Motion DISH Network L.L.C.'s Motion for Summary Judgement that U.S. Pat. No. 10,026,026 Is Not Entitled to a 2004 Priority Date, filed in in *Broadband iTV, Inc.* v. *DISH Network, LLC*, Case No. 6:19-cv-00716, Filed on Aug. 26, 2021.
Redacted Copy of Sealed Motion DISH Network L.L.C.'s Motion for Summary Judgment of Invalidity Under 35 U.S.C. § 101, filed in in *Broadband iTV, Inc.* v. *DISH Network, LLC*, Case No. 6:19-cv-00716, Filed on Aug. 26, 2021.
Response in Opposition to DISH Network L.L.C.'s Motion for Summary Judgment of Invalidity Under 35 U.S.C. § 101, filed in in *Broadband iTV, Inc.* v. *DISH Network, LLC*, Case No. 6:19-cv-00716, Filed on Sep. 2, 2021.
Response in Opposition DISH Network L.L.C.'s Motion for Summary Judgement that U.S. Pat. No. 10,026,026 Is Not Entitled to a 2004 Priority Date, filed in in *Broadband iTV, Inc.* v. *DISH Network, LLC*, Case No. 6:19-cv-00716, Filed on Sep. 1, 2021.
Reply to Response in Opposition to DISH Network L.L.C.'s Motion for Summary Judgement that U.S. Pat. No. 10,026,026 Is Not Entitled to a 2004 Priority Date, filed in in *Broadband iTV, Inc.* v. *DISH Network, LLC*, Case No. 6:19-cv-00716, Filed on Sep. 8, 2021.
Patent Owner's Sur-Reply, Paper No. 49, filed in *DISH Network L.L.C.* v. *Broadband iTV, Inc.*, Case No. IPR 2020-01359 on Sep. 8, 2021.
Broadband iTV, Inc.'s Response to Second Petition for Writ of Mandamus, filed in In re: DISH Network L.L.C., Case No. 2021-182 (Federal Circuit), Filed Sep. 22, 2021.
DISH Network L.L.C.'s Reply In Support of Petition for Writ of Mandamus, filed in In re: DISH Network L.L.C., Case No. 2021-182 (Federal Circuit), Filed Sep. 27, 2021.
Redacted Copy AT&T's Reply in Support of its Motion for Summary Judgment that Broadband iTV's Doctrine of Equivalents Infringement Theory is Barred by Prosecution History Estoppel, by AT&T Communications, LLC, AT&T Services, Inc., DirecTV, LLC, filed in in *Broadband iTV, Inc.* v. *AT&T Services, Inc. et al.*, Case No. 1:20-cv-00717, Filed on Sep. 21, 2021.
Motion for Additional Claim Construction of the "Uploaded . . . By a Respective Content Provider Device" Limitation of the Asserted

(56) References Cited

OTHER PUBLICATIONS

Patents by AT&T Communications, LLC, AT&T Services, Inc., DirecTV, LLC, filed in in *Broadband iTV, Inc. v. AT&T Services, Inc. et al.*, Case No. 1:20-cv-00717, Filed on Sep. 24, 2021.
Exhibit D (Excerpts from the Deposition Transcript of Dr. Hugh Smith, dated Aug. 16, 2021) to Motion for Additional Claim Construction of the "Uploaded . . . By a Respective Content Provider Device" Limitation of the Asserted Patents by AT&T Communications, LLC, AT&T Services, Inc., DirecTV, LLC, filed in in *Broadband iTV, Inc. v. AT&T Services, Inc. et al.*, Case No. 1:20-cv-00717, Filed on Sep. 24, 2021.
Response in Opposition to Motion or Additional Claim Construction of the "Uploaded . . . By a Respective Content Provider Device" Limitation of the Asserted Patents by Broadband iTV, Inc., filed in in *Broadband iTV, Inc. v. AT&T Services, Inc. et al.*, Case No. 1:20-cv-00717, Filed on Oct. 7, 2021.
Joint Motion to Stay Case by AT&T Communications, LLC, AT&T Services, Inc., DirecTV, LLC, filed in in *Broadband iTV, Inc. v. AT&T Services, Inc. et al.*, Case No. 1:20-cv-00717, Filed on Oct. 14, 2021.
Response in Opposition to DISH Network L.L.C.'s Motion for Further Construction of the Wherein Limitation, filed in in *Broadband iTV, Inc. v. DISH Network, LLC*, Case No. 6:19-cv-00716, Filed on Oct. 6, 2021.
Reply to Response to DISH Network L.L.C.'s Motion for Further Construction of the Wherein Limitation, filed in in *Broadband iTV, Inc. v. DISH Network, LLC*, Case No. 6:19-cv-00716, Filed on Oct. 13, 2021.
Public Version of Petitioner's Reply to Patent Owner's Response, Paper No. 54, filed in *DISH Network L.L.C. v. Broadband iTV, Inc.*, Case No. IPR 2020-01267 on Sep. 23, 2021.
Public Version of Exhibit 1053 Reply Declaration of Dr. Samuel H. Russ, PH.D., filed in *DISH Network L.L.C. v. Broadband iTV, Inc.*, Case No. IPR 2020-01267 on Sep. 23, 2021.
Public Version of Exhibit 1054 Aug. 9, 2021 Deposition of Milton Diaz Perez, filed in *DISH Network L.L.C. v. Broadband iTV, Inc.*, Case No. IPR 2020-01267 on Sep. 23, 2021.
Public Version of Exhibit 1055 Deposition of Leighton Chong, filed in *DISH Network L.L.C. v. Broadband iTV, Inc.*, Case No. IPR 2020-01267 on Sep. 23, 2021.
Revised Public Version of Patent Owner's Response, Paper No. 59, filed in *DISH Network L.L.C. v. Broadband iTV, Inc.*, Case No. IPR 2020-01267 on Oct. 14, 2021.
Revised Public Version of Patent Owner's Sur-Reply, Paper No. 60, filed in *DISH Network L.L.C. v. Broadband iTV, Inc.*, Case No. IPR 2020-01267 on Oct. 14, 2021.
Non-Confidential Exhibit D-1 (Invalidity Chart of U.S. Pat. No. 10,536,751 ("the '751 patent") by U.S. Patent Application Publication No. 2005/0160458A1 ("Baumgartner I")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-2 (Invalidity Chart of U.S. Pat. No. 10,536,751 ("the '751 patent") by U.S. Patent Application Publication No. 2001/0030667 A1 ("Kelts")) to Defendant's Invalidity Contentions, served in *Broadband iTV, Inc. v Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-3 (Invalidity Chart of U.S. Pat. No. 10,536,751 ("the '751 patent") by U.S. Patent Application Publication No. WO 2000/75845 A2 ("Hendricks I")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-4 (Invalidity Chart of U.S. Pat. No. 10,536,751 ("the '751 patent") by U.S. Patent Application Publication No. 2004/0117831 A1 ("Ellis III ")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-5 (Invalidity Chart of U.S. Pat. No. 10,536,751 ("the '751 patent") by U.S. Pat. No. 7,603,684 B1 ("Ellis II")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-6 (Invalidity Chart of U.S. Pat. No. 10,536,751 ("the '751 patent") by U.S. Pat. No. 8,434,118 B2 ("Gonder")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-7 (Invalidity Chart of U.S. Pat. No. 10,536,751 ("the '751 patent") by U.S. Pat. No. 5,623,613 ("Rowe")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-8 (Invalidity Chart of U.S. Pat. No. 10,536,751 ("the '751 patent") by U.S. Pat. No. 6,317,885 B1 ("Fries")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-9 (Invalidity Chart of U.S. Pat. No. 10,536,751 ("the '751 patent") by U.S. Pat. No. 9,456,241 ("Bayrakeri")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-10 (Invalidity Chart of U.S. Pat. No. 0,536,751 ("the '751 patent") by U.S. Pat. No. 7,159,233 ("Son")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-11 (Invalidity Chart of U.S. Pat. No. 10,536,751 ("the '751 patent") by U.S. Pat. No. 5,850,218 ("LaJoie")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-12 (Invalidity Chart of U.S. Pat. No. 10,536,751 ("the 751 patent") by U.S. Pat. No. 9,674,586 ("Gordon II")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-13 (Invalidity Chart of U.S. Pat. No. 10,536,751 ("the 751 patent") by U.S. Pat. No. 5,752,160 ("Dunn")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-14 (Invalidity Chart of U.S. Pat. No. 10,536,751 ("the 751 patent") by U.S. Patent Application Publication No. 2004/0136698 ("Mock")) to Defendant's Invalidity Contentions, served in *Broadband iTV, Inc. v Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-15 (Invalidity Chart of U.S. Pat. No. 10,536,751 ("the 751 patent") by U.S. Pat. No. 8,352,983 ("Chane")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-16 (Invalidity Chart of U.S. Pat. No. 10,536,751 ("the 751 patent") by U.S. Pat. No. 6,314,572 ("Larocca")) to Defendant's Invalidity Contentions, served in *Broadband iTV,*

(56) References Cited

OTHER PUBLICATIONS

*Inc.* v. *Amazon.com, Inc., Amazon.com Services LLC f/k/a Amazon. com Services, Inc., et al.*, Case No. 6:20-cv-00921 (W.D. Tex.), served on Dec. 14, 2021.
Non-Confidential Exhibit D-17 (Invalidity Chart of U.S. Pat. No. 10,536,751 ("the 751 patent") by U.S. Pat. No. 8,015,584 ("Breen")) to Defendant's Invalidity Contentions, served in *Broadband iTV, Inc.* v. *Amazon.com, Inc., Amazon.com Services LLC f/k/a Amazon. com Services, Inc., et al.*, Case No. 6:20-cv-00921 (W.D. Tex.), served on Dec. 14, 2021.
Non-Confidential Exhibit D-18 (Invalidity Chart of U.S. Pat. No. 10,536,751 ("the 751 patent") by U.S. Pat. No. 9,191,709 ("Schiller")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-19 (Invalidity Chart of U.S. Pat. No. 10,536,751 ("the 751 patent") by U.S. Pat. No. 7,174,512 ("Martin")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-20 (Invalidity Chart of U.S. Pat. No. 10,536,751 ("the 751 patent") by U.S. Patent Application Publication No. 2002/0083124A1 ("Knox")) to Defendant's Invalidity Contentions, served in *Broadband iTV, Inc.* v *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-23a (Invalidity Chart of U.S. Pat. No. 10,536,751 ("the 751 patent") by Microsoft Patents) to Defendant's Invalidity Contentions, served in *Broadband iTV, Inc.* v. *Amazon. com, Inc., Amazon.com Services LLC F/k/a Amazon.com Services, Inc., et al.*, Case No. 6:20-cv-00921 (W.D. Tex.), served on Dec. 14, 2021.
Non-Confidential Exhibit D-24 (Invalidity Chart of U.S. Pat. No. 10,536,751 ("the 751 patent") by Seachange System) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-25 (Invalidity Chart of U.S. Pat. No. 10,536,751 ("the '751 patent") by U.S. Pat. No. 8,042,132 B2 ("Carney")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-26 (Invalidity Chart of U.S. Pat. No. 10,536,751 ("the '751 patent") by U.S. Patent Application Publication No. 2004/0103120A1 ("Fickle")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-27 (Invalidity Chart of U.S. Pat. No. 10,536,751 ("the '751 patent") by U.S. Patent Application Publication No. 2002/0104099 ("Novak")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-28 (Invalidity Chart of U.S. Pat. No. 10,536,751 ("the '751 patent") by U.S. Pat. No. 7,650,621 ("Thomas")) to Defendant's Invalidity Contentions, served in *Broadband iTV, Inc.* v. *Amazon.com, Inc., Amazon.com Services LLC f/k/a Amazon. com Services, Inc., et al.*, Case No. 6:20-cv-00921 (W.D. Tex.), served on Dec. 14, 2021.
Non-Confidential Exhibit D-29 (Invalidity Chart of U.S. Pat. No. 10,536,751 ("the '751 patent") by U.S. Pat. No. 7,690,020 ("Lebar")) to Defendant's Invalidity Contentions, served in *Broadband iTV, Inc.* v. *Amazon.com, Inc., Amazon.com Services LLC f/k/a Amazon. com Services, Inc., et al.*, Case No. 6:20-cv-00921 (W.D. Tex.), served on Dec. 14, 2021.

Non-Confidential Exhibit D-30 (Invalidity Chart of U.S. Pat. No. 10,536,751 ("the '751 patent") by U.S. Pat. No. 7,155,674 ("Breen I")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-31 (Invalidity Chart of U.S. Pat. No. 10,536,751 ("the '751 patent") by U.S. Patent Application Publication No. 2010/0153997 ("Baumgartner II")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-32 (Invalidity Chart of U.S. Pat. No. 10,536,751 ("the '751 patent") by Cablelabs Video-On-Demand Content Specification Version 1.1 ("CableLabs")) to Defendant's Invalidity Contentions, served in *Broadband iTV, Inc.* v. *Amazon. com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit D-33 (Invalidity Chart of U.S. Pat. No. 10,536,751 ("the '751 patent") by "Ingest & Metadata Partitioning: Requirements for Television On Demand" ("Scheffler")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit E-1 (Invalidity Chart of U.S. Pat. No. 10,028,026 ("the '026 patent") by U.S. Patent Application Publication No. 2005/0160458A1 ("Baumgartner I")) to Defendant's Invalidity Contentions, served in *Broadband iTV, Inc.* v. *Amazon. com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit E-2 (Invalidity Chart of U.S. Pat. No. 10,028,026 ("the '026 patent") by U.S. Patent Application Publication No. 2001/0030667 A1 ("Kelts")) to Defendant's Invalidity Contentions, served in *Broadband iTV Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit E-3 (Invalidity Chart of U.S. Pat. No. 10,028,026 ("the '026 patent") by U.S. Patent Application Publication No. WO 2000/75845 A2 ("Hendricks I")) to Defendant's Invalidity Contentions, served in *Broadband iTV, Inc.* v. *Amazon. com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit E-4 (Invalidity Chart of U.S. Pat. No. 10,028,026 ("the '026 patent") by U.S. Patent Application Publication No. 2004/0117831 A1 ("Ellis III ")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit E-5 (Invalidity Chart of U.S. Pat. No. 10,028,026 ("the '026 patent") by U.S. Pat. No. 7,603,684 B1 ("Ellis II")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit E-6 (Invalidity Chart of U.S. Pat. No. 10,028,026 ("the '026 patent") by U.S. Pat. No. 8,434,118 B2 ("Gonder")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit E-7 (Invalidity Chart of U.S. Pat. No. 10,028,026 ("the '026 patent") by U.S. Pat. No. 5,623,613 ("Rowe")) to Defendant's Invalidity Contentions, served in *Broadband iTV, Inc.* v. *Amazon.com, Inc., Amazon.com Services LLC f/k/a Amazon. com Services, Inc., et al.*, Case No. 6:20-cv-00921 (W.D. Tex.), served on Dec. 14, 2021.
Non-Confidential Exhibit E-8 (Invalidity Chart of U.S. Pat. No. 10,028,026 ("the '026 patent") by U.S. Pat. No. 6,317,885 B1 ("Fries")) to Defendant's Invalidity Contentions, served in *Broad-*

(56) References Cited

OTHER PUBLICATIONS band iTV, Inc. v. Amazon.com, Inc., Amazon.com Services LLC f/k/a Amazon.com Services, Inc., et al., Case No. 6:20-cv-00921 (W.D. Tex.), served on Dec. 14, 2021.
Non-Confidential Exhibit E-9 (Invalidity Chart of U.S. Pat. No. 10,028,026 ("the '026 patent") by U.S. Pat. No. 9,456,241 ("Bayrakeri")) to Defendant's Invalidity Contentions, served in Broadband iTV, Inc. v. Amazon.com, Inc., Amazon.com Services LLC f/k/a Amazon.com Services, Inc., et al., Case No. 6:20-cv-00921 (W.D. Tex.), served on Dec. 14, 2021.
Non-Confidential Exhibit E-10 (Invalidity Chart of U.S. Pat. No. 10,028,026 ("the '026 patent") by U.S. Pat. No. 7,159,233 ("Son")) to Defendant's Invalidity Contentions, served in Broadband iTV, Inc. v. Amazon.com, Inc., Amazon.com Services LLC f/k/a Amazon.com Services, Inc., et al., Case No. 6:20-cv-00921 (W.D. Tex.), served on Dec. 14, 2021.
Non-Confidential Exhibit E-11 (Invalidity Chart of U.S. Pat. No. 10,028,026 ("the '026 patent") by U.S. Pat. No. 5,850,218 ("LaJoie")) to Defendant's Invalidity Contentions, served in Broadband iTV, Inc. v. Amazon.com, Inc., Amazon.com Services LLC f/k/a Amazon.com Services, Inc., et al., Case No. 6:20-cv-00921 (W.D. Tex.), served on Dec. 14, 2021.
Non-Confidential Exhibit E-12 (Invalidity Chart of U.S. Pat. No. 10,028,026 ("the '026 patent") by U.S. Pat. No. 9,674,586 ("Gordon II")) to Defendant's Invalidity Contentions, served in Broadband iTV, Inc. v. Amazon.com, Inc., Amazon.com Services LLC f/k/a Amazon.com Services, Inc., et al., Case No. 6:20-cv-00921 (W.D. Tex.), served on Dec. 14, 2021.
Non-Confidential Exhibit E-13 (Invalidity Chart of U.S. Pat. No. 10,028,026 ("the '026 patent") by U.S. Pat. No. 5,752,160 ("Dunn")) to Defendant's Invalidity Contentions, served in Broadband iTV, Inc. v. Amazon.com, Inc., Amazon.com Services LLC f/k/a Amazon.com Services, Inc., et al., Case No. 6:20-cv-00921 (W.D. Tex.), served on Dec. 14, 2021.
Non-Confidential Exhibit E-14 (Invalidity Chart of U.S. Pat. No. 10,028,026 ("the '026 patent") by U.S. Patent Application Publication No. 2004/0136698 ("Mock")) to Defendant's Invalidity Contentions, served in Broadband iTV, Inc. v. Amazon.com, Inc., Amazon.com Services LLC f/k/a Amazon.com Services, Inc., et al., Case No. 6:20-cv-00921 (W.D. Tex.), served on Dec. 14, 2021.
Non-Confidential Exhibit E-15 (Invalidity Chart of U.S. Pat. No. 10,028,026 ("the '026 patent") by U.S. Pat. No. 8,352,983 ("Chane")) to Defendant's Invalidity Contentions, served in Broadband iTV, Inc. v. Amazon.com, Inc., Amazon.com Services LLC f/k/a Amazon.com Services, Inc., et al., Case No. 6:20-cv-00921 (W.D. Tex.), served on Dec. 14, 2021.
Non-Confidential Exhibit E-16 (Invalidity Chart of U.S. Pat. No. 10,028,026 ("the '026 patent") by U.S. Pat. No. 6,314,572 ("Larocca")) to Defendant's Invalidity Contentions, served in Broadband iTV, Inc. v. Amazon.com, Inc., Amazon.com Services LLC f/k/a Amazon.com Services, Inc., et al., Case No. 6:20-cv-00921 (W.D. Tex.), served on Dec. 14, 2021.
Non-Confidential Exhibit E-17 (Invalidity Chart of U.S. Pat. No. 10,028,026 ("the '026 patent") by U.S. Pat. No. 8,015,584 ("Breen")) to Defendant's Invalidity Contentions, served in Broadband iTV, Inc. v. Amazon.com, Inc., Amazon.com Services LLC f/k/a Amazon.com Services, Inc., et al., Case No. 6:20-cv-00921 (W.D. Tex.), served on Dec. 14, 2021.
Non-Confidential Exhibit E-18 (Invalidity Chart of U.S. Pat. No. 10,028,026 ("the '026 patent") by U.S. Pat. No. 9,191,709 ("Schiller")) to Defendant's Invalidity Contentions, served in Broadband iTV, Inc. v. Amazon.com, Inc., Amazon.com Services LLC f/k/a Amazon.com Services, Inc., et al., Case No. 6:20-cv-00921 (W.D. Tex.), served on Dec. 14, 2021.
Non-Confidential Exhibit E-19 (Invalidity Chart of U.S. Pat. No. 10,028,026 ("the '026 patent") by U.S. Pat. No. 7,174,512 ("Martin")) to Defendant's Invalidity Contentions, served in Broadband iTV, Inc. v. Amazon.com, Inc., Amazon.com Services LLC f/k/a Amazon.com Services, Inc., et al., Case No. 6:20-cv-00921 (W.D. Tex.), served on Dec. 14, 2021.

Termination Due to Settlement After Institution of Trial, filed in AT&T Services, Inc. and DirecTV, LLC v. Broadband iTV, Inc., Case No. IPR2020-1280 (PTAB), Paper No. 65, filed on Dec. 15, 2021.
Termination Due to Settlement After Institution of Trial, filed in AT&T Services, Inc. and DirecTV, LLC v. Broadband iTV, Inc., Case No. IPR2020-1267 (PTAB), Paper No. 75, filed on Dec. 15, 2021.
Termination Due to Settlement After Institution of Trial, filed in AT&T Services, Inc. and DirecTV, LLC v. Broadband iTV, Inc., Case No. IPR2020-1359 (PTAB), Paper No. 62, filed on Dec. 15, 2021.
Joint Motion for Dismissal, filed in Broadband iTV, Inc. v. AT&T Services, Inc. et al., Case No. 1:20-cv-00717 (W.D. Tex.), filed on Dec. 15, 2021.
Non-Confidential Exhibit B-1 (Invalidity Chart of U.S. Pat. No. 9,648,388 ("the '388 Patent") by U.S. Patent Application Publication No. 2005/0160458A1 ("Baumgartner I")) to Defendant's Invalidity Contentions, served in Broadband iTV, Inc. v. Amazon.com, Inc., Amazon.com Services LLC f/k/a Amazon.com Services, Inc., et al., Case No. 6:20-cv-00921 (W.D. Tex.), served on Dec. 14, 2021.
Non-Confidential Exhibit B-2 (Invalidity Chart of U.S. Pat. No. 9,648,388 ("the '388 Patent") by U.S. Patent Application Publication No. 2001/0030667 A1 ("Kelts")) to Defendant's Invalidity Contentions, served in Broadband iTV, Inc. v. Amazon.com, Inc., Amazon.com Services LLC f/k/a Amazon.com Services, Inc., et al., Case No. 6:20-cv-00921 (W.D. Tex.), served on Dec. 14, 2021.
Non-Confidential Exhibit B-3 (Invalidity Chart of U.S. Pat. No. 9,648,388 ("the '388 Patent") by U.S. Patent Application Publication No. WO 2000/75845 A2 ("Hendricks I")) to Defendant's Invalidity Contentions, served in Broadband iTV, Inc. v. Amazon.com, Inc., Amazon.com Services LLC f/k/a Amazon.com Services, Inc., et al., Case No. 6:20-cv-00921 (W.D. Tex.), served on Dec. 14, 2021.
Non-Confidential Exhibit B-4 (Invalidity Chart of U.S. Pat. No. 9,648,388 ("the '388 Patent") by U.S. Patent Application Publication No. 2004/0117831 A1 ("Ellis III")) to Defendant's Invalidity Contentions, served in Broadband iTV, Inc. v. Amazon.com, Inc., Amazon.com Services LLC f/k/a Amazon.com Services, Inc., et al., Case No. 6:20-cv-00921 (W.D. Tex.), served on Dec. 14, 2021.
Non-Confidential Exhibit B-5 (Invalidity Chart of U.S. Pat. No. 9,648,388 ("the '388 Patent") by U.S. Pat. No. 7,603,684 B1 ("Ellis II")) to Defendant's Invalidity Contentions, served in Broadband iTV, Inc. v. Amazon.com, Inc., Amazon.com Services LLC f/k/a Amazon.com Services, Inc., et al., Case No. 6:20-cv-00921 (W.D. Tex.), served on Dec. 14, 2021.
Non-Confidential Exhibit B-6 (Invalidity Chart of U.S. Pat. No. 9,648,388 ("the '388 Patent") by U.S. Pat. No. 8,434,118 B2 ("Gonder")) to Defendant's Invalidity Contentions, served in Broadband iTV, Inc. v. Amazon.com, Inc., Amazon.com Services LLC f/k/a Amazon.com Services, Inc., et al., Case No. 6:20-cv-00921 (W.D. Tex.), served on Dec. 14, 2021.
Non-Confidential Exhibit B-7 (Invalidity Chart of U.S. Pat. No. 9,648,388 ("the '388 Patent") by U.S. Pat. No. 5,623,613 ("Rowe")) to Defendant's Invalidity Contentions, served in Broadband iTV, Inc. v. Amazon.com, Inc., Amazon.com Services LLC f/k/a Amazon.com Services, Inc., et al., Case No. 6:20-cv-00921 (W.D. Tex.), served on Dec. 14, 2021.
Non-Confidential Exhibit B-8 (Invalidity Chart of U.S. Pat. No. 9,648,388 ("the '388 Patent") by U.S. Pat. No. 6,317,885 B1 ("Fries")) to Defendant's Invalidity Contentions, served in Broadband iTV, Inc. v. Amazon.com, Inc., Amazon.com Services LLC f/k/a Amazon.com Services, Inc., et al., Case No. 6:20-cv-00921 (W.D. Tex.), served on Dec. 14, 2021.
Non-Confidential Exhibit B-9 (Invalidity Chart of U.S. Pat. No. 9,648,388 ("the '388 Patent") by U.S. Pat. No. 9,456,241 ("Bayrakeri")) to Defendant's Invalidity Contentions, served in Broadband iTV, Inc. v. Amazon.com, Inc., Amazon.com Services LLC f/k/a Amazon.com Services, Inc., et al., Case No. 6:20-cv-00921 (W.D. Tex.), served on Dec. 14, 2021.
Non-Confidential Exhibit B-10 (Invalidity Chart of U.S. Pat. No. 9,648,388 ("the '388 Patent") by U.S. Pat. No. 7,159,233 ("Son")) to Defendant's Invalidity Contentions, served in Broadband iTV, Inc. v. Amazon.com, Inc., Amazon.com Services LLC f/k/a Amazon.com Services, Inc., et al., Case No. 6:20-cv-00921 (W.D. Tex.), served on Dec. 14, 2021.

(56) References Cited

OTHER PUBLICATIONS

Non-Confidential Exhibit B-11 (Invalidity Chart of U.S. Pat. No. 9,648,388 ("the '388 Patent") by U.S. Pat. No. 5,850,218 ("LaJoie")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit B-12 (Invalidity Chart of U.S. Pat. No. 9,648,388 ("the '388 Patent") by U.S. Pat. No. 9,674,586 ("Gordon II")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit B-13 (Invalidity Chart of U.S. Pat. No. 9,648,388 ("the '388 Patent") by U.S. Pat. No. 5,752,160 ("Dunn")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit B-14 (Invalidity Chart of U.S. Pat. No. 9,648,388 ("the '388 Patent") by U.S. Patent Application Publication No. 2004/0136698 ("Mock")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit B-15 (Invalidity Chart of U.S. Pat. No. 9,648,388 ("the '388 Patent") by U.S. Pat. No. 8,352,983 ("Chane")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit B-16 (Invalidity Chart of U.S. Pat. No. 9,648,388 ("the '388 Patent") by U.S. Pat. No. 6,314,572 ("Larocca")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit B-17 (Invalidity Chart of U.S. Pat. No. 9,648,388 ("the '388 Patent") by U.S. Pat. No. 8,015,584 ("Breen")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit B-18 (Invalidity Chart of U.S. Pat. No. 9,648,388 ("the '388 Patent") by U.S. Pat. No. 9,191,709 ("Schiller")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit B-19 (Invalidity Chart of U.S. Pat. No. 9,648,388 ("the '388 Patent") by U.S. Pat. No. 7,174,512 ("Martin")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit B-20 (Invalidity Chart of U.S. Pat. No. 9,648,388 ("the '388 Patent") by U.S. Patent Application Publication No. 2002/0083124A1 ("Knox")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit B-23a (Invalidity Chart of U.S. Pat. No. 9,648,388 ("the '388 Patent") by Microsoft Patents) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit B-24 (Invalidity Chart of U.S. Pat. No. 9,648,388 ("the '388 Patent") by Seachange System) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit B-25 (Invalidity Chart of U.S. Pat. No. 9,648,388 ("the '388 Patent") by U.S. Pat. No. 8,042,132 B2 ("Carney")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit B-26 (Invalidity Chart of U.S. Pat. No. 9,648,388 ("the '388 Patent") by U.S. Patent Application Publication No. 2004/0103120A1 ("Fickle")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit B-27 (Invalidity Chart of U.S. Pat. No. 9,648,388 ("the '388 Patent") by U.S. Patent Application Publication No. 2002/0104099 ("Novak")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit B-28 (Invalidity Chart of U.S. Pat. No. 9,648,388 ("the '388 Patent") by U.S. Pat. No. 7,650,621 ("Thomas")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit B-29 (Invalidity Chart of U.S. Pat. No. 9,648,388 ("the '388 Patent") by U.S. Pat. No. 7,690,020 ("Lebar")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit B-30 (Invalidity Chart of U.S. Pat. No. 9,648,388 ("the '388 Patent") by U.S. Pat. No. 7,155,674 ("Breen 1")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit B-31 (Invalidity Chart of U.S. Pat. No. 9,648,388 ("the '388 Patent") by U.S. Patent Application Publication No. 2010/0153997 ("Baumgartner II")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit B-33 (Invalidity Chart of U.S. Pat. No. 9,648,388 ("the '388 Patent") by "INGEST & Metadata Partitioning: Requirements for Television On Demand" ("Scheffler")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit C-1 (Invalidity Chart of U.S. Pat. No. 10,536,750 ("the '750 patent") by U.S. Patent Application Publication No. 2005/0160458A1 ("Baumgartner 1")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit C-2 (Invalidity Chart of U.S. Pat. No. 10,536,750 ("the '750 patent") by U.S. Patent Application Publication No. 2001/0030667 A1 ("Kelts")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit C-3 (Invalidity Chart of U.S. Pat. No. 9,648,388 10,536,750 ("the '750 patent") by U.S. Patent Application Publication No. WO 2000/75845 A2 ("Hendricks 1")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.

(56) References Cited

OTHER PUBLICATIONS

Non-Confidential Exhibit C-4 (Invalidity Chart of U.S. Pat. No. 10,536,750 ("the '750 patent") by U.S. Patent Application Publication No. 2004/0117831 A1 ("Ellis III")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.

Non-Confidential Exhibit C-5 (Invalidity Chart of U.S. Pat. No. 10,536,750 ("the '750 patent") by U.S. Pat. No. 7,603,684 B1 ("Ellis II")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.

Non-Confidential Exhibit C-6 (Invalidity Chart of U.S. Pat. No. 10,536,750 ("the '750 patent") by U.S. Pat. No. 8,434,118 B2 ("Gonder")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.

Non-Confidential Exhibit C-7 (Invalidity Chart of U.S. Pat. No. 10,536,750 ("the '750 patent") by U.S. Pat. No. 5,623,613 ("Rowe")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.

Non-Confidential Exhibit C-9 (Invalidity Chart of U.S. Pat. No. 10,536,750 ("the '750 patent") by U.S. Pat. No. 9,456,241 ("Bayrakeri")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.

Non-Confidential Exhibit C-10 (Invalidity Chart of U.S. Pat. No. 10,536,750 ("the '750 patent") by U.S. Pat. No. 7,159,233 ("Son")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.

Non-Confidential Exhibit C-11 (Invalidity Chart of U.S. Pat. No. 10,536,750 ("the '750 patent") by U.S. Pat. No. 5,850,218 ("LaJoie")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.

Non-Confidential Exhibit C-12 (Invalidity Chart of U.S. Pat. No. 10,536,750 ("the '750 patent") by U.S. Pat. No. 9,674,586 ("Gordon II")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.

Non-Confidential Exhibit C-13 (Invalidity Chart of U.S. Pat. No. 10,536,750 ("the '750 patent") by U.S. Pat. No. 5,752,160 ("Dunn")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.

Non-Confidential Exhibit C-14 (Invalidity Chart of U.S. Pat. No. 10,536,750 ("the '750 patent") by U.S. Patent Application Publication No. 2004/0136698 ("Mock")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.

Non-Confidential Exhibit C-15 (Invalidity Chart of U.S. Pat. No. 10,536,750 ("the '750 patent") by U.S. Pat. No. 8,352,983 ("Chane")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.

Non-Confidential Exhibit C-16 (Invalidity Chart of U.S. Pat. No. 10,536,750 ("the '750 patent") by U.S. Pat. No. 6,314,572 ("Larocca")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.

Non-Confidential Exhibit C-17 (Invalidity Chart of U.S. Pat. No. 10,536,750 ("the '750 patent") by U.S. Pat. No. 8,015,584 ("Breen")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.

Non-Confidential Exhibit C-18 (Invalidity Chart of U.S. Pat. No. 10,536,750 ("the '750 patent") by U.S. Pat. No. 9,191,709 ("Schiller")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.

Non-Confidential Exhibit C-19 (Invalidity Chart of U.S. Pat. No. 10,536,750 ("the '750 patent") by U.S. Pat. No. 7,174,512 ("Martin")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.

Non-Confidential Exhibit C-20 (Invalidity Chart of U.S. Pat. No. 10,536,750 ("the '750 patent") by U.S. Patent Application Publication No. 2002/0083124A1 ("Knox")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.

Non-Confidential Exhibit C-23a (Invalidity Chart of U.S. Pat. No. 10,536,750 ("the '750 patent") by Microsoft Patents) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.

Non-Confidential Exhibit C-24 (Invalidity Chart of U.S. Pat. No. 10,536,750 ("the '750 patent") by Seachange System) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.

Non-Confidential Exhibit C-25 (Invalidity Chart of U.S. Pat. No. 10,536,750 ("the '750 patent") by U.S. Pat. No. 8,042,132 B2 ("Carney")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.

Non-Confidential Exhibit C-26 (Invalidity Chart of U.S. Pat. No. 10,536,750 ("the '750 patent") by U.S. Patent Application Publication No. 2004/0103120A1 ("Fickle")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.

Non-Confidential Exhibit C-27 (Invalidity Chart of U.S. Pat. No. 10,536,750 ("the '750 patent") by U.S. Patent Application Publication No. 2002/0104099 ("Novak")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.

Non-Confidential Exhibit C-28 (Invalidity Chart of U.S. Pat. No. 10,536,750 ("the '750 patent") by U.S. Pat. No. 7,650,621 ("Thomas")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.

Non-Confidential Exhibit C-29 (Invalidity Chart of U.S. Pat. No. 10,536,750 ("the '750 patent") by U.S. Pat. No. 7,690,020 ("Lebar")) to Defendant's Invalidity Contentions, served in *Broadband iTV, Inc. v. Amazon.com, Inc., Amazon.com Services LLC f/k/a Amazon.com Services, Inc., et al.*, Case No. 6:20-cv-00921 (W.D. Tex.), served on Dec. 14, 2021.

Non-Confidential Exhibit C-30 (Invalidity Chart of U.S. Pat. No. 10,536,750 ("the '750 patent") by U.S. Pat. No. 7,155,674 ("Breen I")) to Defendant's Invalidity Contentions, served in *Broadband*

(56) References Cited

OTHER PUBLICATIONS

*iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit C-31 (Invalidity Chart of U.S. Pat. No. 10,536,750 ("the '750 patent") by U.S. Patent Application Publication No. 2010/0153997 ("Baumgartner II")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit C-32 (Invalidity Chart of U.S. Pat. No. 10,536,750 ("the '750 patent") by Cablelabs Video-On-Demand Content Specification Version 1.1 ("CableLabs")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit C-33 (Invalidity Chart of U.S. Pat. No. 10,536,750 ("the '750 patent") by "Ingest & Metadata Partitioning: Requirements for Television On Demand" ("Scheffler")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Joint Stipulation of Dismissal of All Claims, in *Broadband iTV, Inc.* v. *DISH Network LLC*, Case No. 1:21-cv-02867, D. Col.
Notice of Alternative Dispute Resolution/Mediation Outcome: Settled during ADR/Mediation, in *Broadband iTV, Inc.* v. *AT&T Services, Inc., et al.* or *Broadband iTV, Inc.* v. *DirecTV, LLC*, Case No. 1:20-cv-717-ADA, W.D. Tex.
Order of Dismissal with Prejudice, in *Broadband iTV, Inc.* v. *AT&T Services, Inc., et al.* or *Broadband iTV, Inc.* v. *DirecTV, LLC*, Case No. 1:20-cv-717-ADA, W.D. Tex.
Joint Motion to Terminate Inter Partes Review With Respect to Petitioner DISH Network L.L.C., (Paper 68), in *DISH Network LLC* v. *Broadband iTV, Inc.*, Case No. IPR2020-01267 (P.T.A.B.).
Order Settlement as to DISH Network L.L.C. (Paper 72), in *DISH Network LLC* v. *Broadband iTV, Inc.*, Case No. IPR2020-01267 (P.T.A.B.).
Joint Motion to Terminate Inter Partes Review (With Respect to Petitioners AT&T Services, Inc. and DirecTV, LLC) (Paper 73), in *DISH Network LLC* v. *Broadband iTV, Inc.*, Case No. IPR2020-01267 (P.T.A.B.).
Termination Due to Settlement After Institution of Trial (Paper 75), in *DISH Network LLC* v. *Broadband iTV, Inc.*, Case No. IPR2020-01267 (P.T.A.B.).
Joint Motion to Terminate Inter Partes Review With Respect to Petitioner DISH Network L.L.C., (Paper No. 59), in *DISH Network LLC* v. *Broadband iTV Inc.*, Case No. IPR2020-01280 (P.T.A.B.).
Order Settlement as to DISH Network L.L.C. (Paper 62), Joint Motion to Terminate Inter Partes Review (With Respect to Petitioners AT&T Services, Inc. and DirecTV, LLC) (Paper 63), in *DISH Network LLC* v. *Broadband iTV Inc.*, Case No. IPR2020-01280 (P.T.A.B.).
Termination Due to Settlement After Institution of Trial (Paper 65), in *DISH Network LLC* v. *Broadband iTV, Inc.*, Case No. IPR2020-01280 (P.T.A.B.).
Joint Motion to Terminate Inter Partes Review With Respect to Petitioner DISH Network L.L.C. (Paper 55), in *DISH Network LLC* v. *Broadband iTV Inc.*, Case. No. IPR2020-01359 (P.T.A.B.).
Order Settlement as to DISH Network L.L.C. (Paper 58), Joint Motion to Terminate Inter Partes Review (With Respect to Petitioners AT&T Services, Inc. and DirecTV, LLC) (Paper 59) in *DISH Network LLC* v. *Broadband iTV Inc.*, Case No. IPR2020-01359 (P.T.A.B.).
Termination Due to Settlement After Institution of Trial (Paper 62), in *DISH Network LLC* v. *Broadband iTV, Inc.*, Case No. IPR2020-01359 (P.T.A.B.).
U.S. Appl. No. 10/909,192, filed Jul. 30, 2004, Issued as U.S. Pat. No. 7,590,997.
U.S. Appl. No. 11/952,552, filed Dec. 7, 2007, Issued as U.S. Pat. No. 7,774,819.
U.S. Appl. No. 12/852,663, filed Aug. 9, 2010, Issued as U.S. Pat. No. 9,078,016.
U.S. Appl. No. 13/830,872, filed Mar. 14, 2013, Issued as U.S. Pat. No. 9,066,118.
U.S. Appl. No. 14/598,633, filed Jan. 16, 2015, Issued as U.S. Pat. No. 9,106,959.
U.S. Appl. No. 14/703,597, filed Jan. 5, 2015, Issued as U.S. Pat. No. 9,232,275.
U.S. Appl. No. 14/706,721, filed May 7, 2015, Issued as U.S. Pat. No. 9,338,511.
U.S. Appl. No. 14/978,881, filed Dec. 22, 2015, Issued as U.S. Pat. No. 9,386,340.
U.S. Appl. No. 14/978,953, filed Dec. 22, 2015, Issued as U.S. Pat. No. 9,491,511.
U.S. Appl. No. 14/987,237, filed Jan. 4, 2016, Issued as U.S. Pat. No. 9,491,512.
U.S. Appl. No. 14/987,283, filed Jan. 4, 2016, Issued as U.S. Pat. No. 9,338,512.
U.S. Appl. No. 15/148,807, filed May 6, 2016, Issued as U.S. Pat. No. 9,578,376.
U.S. Appl. No. 15/190,954, filed Jun. 23, 2016, Issued as U.S. Pat. No. 9,641,896.
U.S. Appl. No. 15/253,321, filed Aug. 31, 2016, Issued as U.S. Pat. No. 9,648,388.
U.S. Appl. No. 15/253,288, filed Aug. 31, 2016, Issued as U.S. Pat. No. 9,635,423.
U.S. Appl. No. 15/399,116, filed Jan. 5, 2017, Issued as U.S. Pat. No. 9,998,791.
U.S. Appl. No. 15/492,870, filed Apr. 20, 2017, Issued as U.S. Pat. No. 9,888,287.
U.S. Appl. No. 15/582,155, filed Apr. 28, 2017, Issued as U.S. Pat. No. 9,866,909.
U.S. Appl. No. 15/589,196, filed May 8, 2017, Issued as U.S. Pat. No. 9,866,910.
U.S. Appl. No. 15/664,655, filed Jul. 31, 2017, Issued as U.S. Pat. No. 10,129,597.
U.S. Appl. No. 15/888,778, filed Feb. 5, 2018, Issued as U.S. Pat. No. 10,129,598.
U.S. Appl. No. 15/864,502, filed Jan. 8, 2018, Issued as U.S. Pat. No. 10,057,649.
U.S. Appl. No. 15/864,561, filed Jan. 8, 2018, Issued as U.S. Pat. No. 10,045,084.
U.S. Appl. No. 15/999,559, filed Aug. 20, 2018, Issued as U.S. Pat. No. 10,306,321.
U.S. Appl. No. 16/055,988, filed Aug. 6, 2018, Issued as U.S. Pat. No. 10,341,730.
U.S. Appl. No. 15/185,367, filed Nov. 9, 2018, Issued as U.S. Pat. No. 10,491,954.
U.S. Appl. No. 16/185,411, filed Nov. 9, 2018, Issued as U.S. Pat. No. 10,491,955.
U.S. Appl. No. 16/381,645, filed Apr. 11, 2019, Issued as U.S. Pat. No. 10,536,750.
U.S. Appl. No. 16/412,580, filed May 15, 2019, Issued as U.S. Pat. No. 10,536,751.
U.S. Appl. No. 16/692,298, filed Nov. 22, 2019, Issued as U.S. Pat. No. 10,893,334.
U.S. Appl. No. 16/730,028, filed Dec. 30, 2019, Issued as U.S. Pat. No. 11,212,585 dated Dec. 28, 2021.
U.S. Appl. No. 17/248,063, filed Jan. 7, 2021, Revised Notice of Allowance (after RCE) dated Dec. 9, 2021.
U.S. Appl. No. 17/226,503, filed Apr. 9, 2021, Pending.
U.S. Appl. No. 11/685,188, filed Mar. 12, 2007, Issued as U.S. Pat. No. 7,631,336.
U.S. Appl. No. 12/632,7453, filed Dec. 7, 2009, Issued as U.S. Pat. No. 9,113,228.
U.S. Appl. No. 12/869,466, filed Aug. 26, 2010, Expressly Abandoned—After Examiner's Answer to Appeal Brief.
U.S. Appl. No. 13/830,961, filed Mar. 145, 2013, Abandoned—After Non-Final Office Action.
U.S. Appl. No. 14/724,125, filed May 28, 2015, Issued as U.S. Pat. No. 9,338,487.

(56) References Cited

OTHER PUBLICATIONS

U.S. Appl. No. 14/827,090, filed Aug. 14, 2015, Issued as U.S. Pat. No. 9,420,318.
U.S. Appl. No. 14/827,113, filed Aug. 14, 2015, Issued as U.S. Pat. No. 9,491,497.
U.S. Appl. No. 14/827,129, filed Aug. 14, 2015, Issued as U.S. Pat. No. 10,349,100.
U.S. Appl. No. 15/148,796, filed May 6, 2016, Issued as U.S. Pat. No. 9,635,395.
U.S. Appl. No. 15/192,598, filed Jun. 24, 2016, Issued as U.S. Pat. No. 10,028,026.
U.S. Appl. No. 15/251,865, filed Aug. 30, 2016, Issued as U.S. Pat. No. 10,028,027.
U.S. Appl. No. 15/493,409, filed Apr. 21, 2017, Issued as U.S. Pat. No. 10,375,428.
U.S. Appl. No. 16/023,875, filed Jun. 29, 2018, Issued as U.S. Pat. No. 10,341,699.
U.S. Appl. No. 16/263,570, filed Jan. 31, 2019, Issued as U.S. Pat. No. 10,506,269.
U.S. Appl. No. 16/269,721, filed Feb. 7, 2019, Issued as U.S. Pat. No. 10,555,014.
U.S. Appl. No. 16/447,568, filed Jun. 20, 2019, Issued as U.S. Pat. No. 10,785,517.
U.S. Appl. No. 17/503,018, filed Oct. 15, 2021, Pending.
U.S. Appl. No. 16/515,536, filed Jul. 18, 2019, Issued as U.S. Pat. No. 10,791,351.
U.S. Appl. No. 16/671,968, filed Nov. 1, 2019, Issuing as U.S. Pat. No. 11,218,749 dated Jan. 4, 2022.
U.S. Appl. No. 16/730,053, filed Dec. 30, 2019, Issuing as U.S. Pat. No. 11,218,750 dated Jan. 4, 2022.
U.S. Appl. No. 16/947,320, filed Jul. 28, 2020, Issuing as U.S. Pat. No. 11,218,751 dated Jan. 4, 2022.
U.S. Appl. No. 16/948,600, filed Sep. 24, 2020, Issuing as U.S. Pat. No. 11,218,752 dated Jan. 4, 2022.
U.S. Appl. No. 17/206,409, filed Mar. 19, 2021, Non-Final Rejection dated Oct. 14, 2021.
U.S. Appl. No. 17/248,302, filed Jan. 19, 2021, Revised Notice of Allowance (after RCE) dated Dec. 10, 2021.
U.S. Appl. No. 17/449,930, filed Oct. 4, 2021, Pending.
U.S. Appl. No. 11/768,895, filed Jun. 26, 2007, Issued as U.S. Pat. No. 9,584,868.
U.S. Appl. No. 12/869,493, filed Aug. 26, 2010, Abandoned—After Final Office Action.
U.S. Appl. No. 12/869,534, filed Aug. 26, 2010, Issued as U.S. Pat. No. 9,344,765.
U.S. Appl. No. 13/831,042, filed Mar. 14, 2013, Issued as U.S. Pat. No. 9,247,308.
U.S. Appl. No. 15/001,992, filed Jan. 20, 2016, Issued as U.S. Pat. No. 9,635,429.
U.S. Appl. No. 15/002,011, filed Jan. 20, 2016, Issued as U.S. Pat. No. 9,641,902.
U.S. Appl. No. 15/002,029, filed Jan. 20, 2016, Issued as U.S. Pat. No. 9,654,833.
U.S. Appl. No. 15/002,040, filed Jan. 20, 2016, Issued as U.S. Pat. No. 9,648,390.
U.S. Appl. No. 15/595,200, filed May 15, 2017, Issued as U.S. Pat. No. 9,888,288.
U.S. Appl. No. 15/582,099, filed Apr. 28, 2017, Issued as U.S. Pat. No. 9,936,240.
U.S. Appl. No. 15/595,210, filed May 15, 2017, Issued as U.S. Pat. No. 9,894,417.
U.S. Appl. No. 15/589,225, filed May 8, 2017, Issued as U.S. Pat. No. 9,894,419.
U.S. Appl. No. 15/441,956, filed Feb. 24, 2017, Issued as U.S. Pat. No. 9,973,825.
U.S. Appl. No. 15/604,272, filed May 24, 2017, Abandoned—After Non-Final Office Action.
U.S. Appl. No. 15/888,739, filed Feb. 5, 2018, Issued as U.S. Pat. No. 10,264,303.
U.S. Appl. No. 15/938,747, filed Mar. 28, 2018, Issued as U.S. Pat. No. 10,154,296.
U.S. Appl. No. 15/894,196, filed Feb. 12, 2018, Issued as U.S. Pat. No. 10,277,937.
U.S. Appl. No. 15/894,262, filed Feb. 12, 2018, Issued as U.S. Pat. No. 10,149,015.
U.S. Appl. No. 16/210,798, filed Dec. 5, 2018, Issued as U.S. Pat. No. 10,560,733.
U.S. Appl. No. 16/199,894, filed Nov. 26, 2018, Issued as U.S. Pat. No. 10,567,846.
U.S. Appl. No. 16/285,432, filed Feb. 26, 2019, Issued as U.S. Pat. No. 10,582,243.
U.S. Appl. No. 16/353,458, filed Mar. 14, 2019, Issued as U.S. Pat. No. 10,623,793.
U.S. Appl. No. 16/777,468, filed Jan. 30, 2020, Issuing as U.S. Pat. No. 11,218,757 dated Jan. 4, 2022.
U.S. Appl. No. 16/785,224, filed Feb. 7, 2020, Revised Notice of Allowance Dec. 7, 2021.
U.S. Appl. No. 16/803,496, filed Feb. 27, 2020, Revised Notice of Allowance Dec. 7, 2021.
U.S. Appl. No. 16/803,523, filed Feb. 27, 2020, Revised Notice of Allowance Dec. 7, 2021.
U.S. Appl. No. 17/233,066, filed Apr. 16, 2021, Pending.
U.S. Appl. No. 17/245,315, filed Apr. 30, 2021, Pending.
U.S. Appl. No. 17/245,149, filed Apr. 30, 2021, Pending.
Broadband iTV, Inc. v. *Hawaiian Telcom, Inc., et al.*, No. 14-cv-00169 (D. Haw. 2014), filed Apr. 9, 2014, Summary Judgment entered in favor of Hawaiian Telcom, Inc. based on 35 U.S.C. 101 Federal Circuit affirmance, without opinion, of Summary Judgment in favor of Hawaiian Telcom, Inc. Sep. 26, 2016 Petition to U.S. Supreme Court for Writ of Certiorari Apr. 13, 2017 Petition Denied May 22, 2017 (litigation terminated).
Broadband iTV, Inc. v. *Time Warner Cable, Inc., et al.*, No. 15-cv-00131 (D. Haw. 2014), filed Apr. 9, 2014, Summary Judgment denied to TWC based on prior art cited by Time Warner Cable, Inc. (TWC); Summary Judgment Entered in favor of TWC based on 35 U.S.C. 101 Federal Circuit affirmance, without opinion, of Summary Judgment denial to TWC based on prior art cited by TWC and of Summary Judgment Entered in favor of TWC Sep. 26, 2016 Petition to U.S. Supreme Court for Writ of Certiorari Apr. 13, 2017 Petition Denied May 22, 2017 (litigation terminated).
In re: DISH Network LLC, No. 21-148, filed May 28, 2021, Asserted Patents: U.S. Pat. No. 10,028,026; U.S. Pat. No. 10,506,269; U.S. Pat. No. 9,998,791; and U.S. Pat. No. 9,648,388 Order Denying Petition for Writ of Mandamus of DISH Network LLC issued Aug. 13, 2021.
In re: DISH Network LLC, No. 21-182, filed Sep. 10, 2021, Asserted Patents: U.S. Pat. No. 10,028,026; U.S. Pat. No. 10,506,269; U.S. Pat. No. 9,998,791; and U.S. Pat. No. 9,648,388 Order Vacating the District Court's Denial of DISH's motion to transfer, and Directing the District Court to Grant the Transfer Motion.
Broadband iTV, Inc. v. *AT&T Services, Inc. et al.*, No. 6-19-cv-00712 (W.D. Tex. 2019), filed Dec. 17, 2019, Asserted Patents: U.S. Pat. No. 10,028,026; U.S. Pat. No. 10,349,101; U.S. Pat. No. 9,998,791; and U.S. Pat. No. 9,648,388 Answer to Complaint filed Feb. 24, 2020 Answer to Counterclaims filed Mar. 13, 2020 Order transferring case to Austin Division Jul. 4, 2020, No. 1:20-cv-00717.
Broadband iTV, Inc. v. *DirecTV, LLC f/k/a DirecTV, Inc.*, No. 6-19-cv-00714 (W.D. Tex. 2019), filed Dec. 19, 2019, Asserted Patents: U.S. Pat. No. 10,028,026; U.S. Pat. No. 10,506,269; U.S. Pat. No. 9,998,791; and U.S. Pat. No. 9,648,388 Answer to Complaint filed Feb. 24, 2020 Answer to Counterclaims filed Mar. 13, 2020 Case Consolidated with 6-19-cv-00712 on Apr. 15, 2020.
Broadband iTV, Inc. v. *DISH Network LLC*, No. 6-19-cv-00716 (W.D. Tex. 2019), filed Dec. 19, 2019, Asserted Patents: U.S. Pat. No. 10,028,026; U.S. Pat. No. 10,506,269; U.S. Pat. No. 9,998,791; and U.S. Pat. No. 9,648,388 Order transferring case to District of Colorado Oct. 22, 2021, No. 1-21-cv-02687.
Broadband iTV, Inc. v. *DISH Network LLC*, No. 1-21-cv-02867 (D. Col. 2021), filed Dec. 19, 2019, Asserted Patents: U.S. Pat. No. 10,028,026; U.S. Pat. No. 10,506,269; U.S. Pat. No. 9,998,791; and U.S. Pat. No. 9,648,388 Order Denying DISH's Motion to Dismiss

(56) References Cited

OTHER PUBLICATIONS

Without Prejudice issued Jul. 25, 2020 Answer to Complaint filed Aug. 10, 2020 Claim Construction Order adopting each of BBiTV's Claim Constructions issued Nov. 20, 2020 Order Denying DISH Network LLC's Corrected Motion to Transfer Case issued Apr. 20, 2021 Civil Case Terminated pursuant to the Stipulation of Dismissal of Case Dec. 12, 2021.
*Broadband iTV, Inc.* v. *AT&T Services, Inc. et al.*, No. 1-20-cv-00717 (W.D. Tex. 2020), filed Dec. 17, 2019 Case transferred to Austin, Asserted Patents: U.S. Pat. No. 10,028,026; U.S. Pat. No. 10,349,101; U.S. Pat. No. 10,506,269; U.S. Pat. No. 9,998,791; and U.S. Pat. No. 9,648,388.
*Broadband iTV, Inc.* v. *DirecTV, LLC f/k/a DirecTV, Inc.*, No. 1:20-cv-00717 (W.D. Tex. 2020), Division from Waco Division on Jul. 6, 2020, Claim Construction Order adopting each of BBiTV's Claim Constructions issued Nov. 20, 2020 Order re: Joint Motion to Dismiss. Order that all claims of Broadband iTV, Inc. are Dismissed With Prejudice; all counterclaims of AT&T Services Inc., AT&T Communications, LLC, and DirecTV, LLC are Dismissed Without Prejudice; and each party is to bear its own costs and attorneys fees Dec. 17, 2021.
*Broadband iTV, Inc.* v. *Amazon.com Services LLC f/k/a Amazon.com Services, Inc. et al.*, No. 6:20-cv-00921 (W.D. Tex. 2020), filed Oct. 16, 2020, Asserted Patents: U.S. Pat. No. 10,028,026; U.S. Pat. No. 10,506,269; U.S. Pat. No. 9,648,388; U.S. Pat. No. 10,536,750; U.S. Pat. No. 10,536,751; U.S. Pat. No. 9,973,825 Amended Complaint filed Aug. 18, 2021 Answer to Amended Complaint filed Sep. 1, 2021 Claim Construction Order adopting predominantly adopting "Plain and Ordinary" Meaning issued Oct. 31, 2021 Defendants' Invalidity Contentions served Dec. 14, 2021 Discovery ongoing.
IPR2014-01222, *Unified Patents, Inc.* v. *Broadband iTV, Inc. (BBiTV)*, filed Jul. 30, 2014, U.S. Pat. No. 7,631,336, BBiTV—Institution of IPR Denied by PTAB Jan. 5, 2015 (terminated).
CBM2014-00189, *Hawaiian Telcom Inc.* v. *Broadband iTV, Inc. (BBiTV)*, filed Sep. 19, 2014, U.S. Pat. No. 7,631,336, BBiTV—Institution of CBM Denied by PTAB Apr. 1, 2015 (terminated).
IPR2020-01267, *DISH Network, L.L.C.* v. *Broadband iTV, Inc. (BBiTV)*, filed Jul. 10, 2020, U.S. Pat. No. 10,028,026, Petition for IPR filed against claims 1-16 Termination Due to Settlement After Institution of Trial Dec. 15, 2021.
IPR2020-01268, *DISH Network, L.L.C.* v. *Broadband iTV, Inc. (BBiTV)*, filed Jul. 10, 2020, U.S. Pat. No. 10,028,026, Petition for IPR filed against claims 1-16 Institution of IPR Denied by PTAB Jan. 21, 2021.
IPR2020-01280, *DISH Network, L.L.C.* v. *Broadband iTV, Inc. (BBiTV)*, filed Jul. 20, 2020, U.S. Pat. No. 9,998,791, Petition for IPR filed against claims 1-3, 5-12, 14-18 Termination Due to Settlement After Institution of Trial Dec. 15, 2021.
IPR2020-01281, *DISH Network, L.L.C.* v. *Broadband iTV, Inc. (BBiTV)*, filed Jul. 20, 2020, U.S. Pat. No. 9,998,791, Petition for IPR filed against claims 1-3, 6-12, 14-18 Institution of IPR Denied by PTAB Feb. 4, 2021.
IPR2020-01332, *DISH Network, L.L.C.* v. *Broadband iTV, Inc. (BBiTV)*, filed Jul. 24, 2020, U.S. Pat. No. 10,506,269, Petition for IPR filed against claims 1-17 Termination Decision Due to Settlement After Institution of Trial issued on Aug. 13, 2021.
IPR2020-01333, *DISH Network, L.L.C.* v. *Broadband iTV, Inc. (BBiTV)*, filed Jul. 24, 2020, U.S. Pat. No. 10,506,269, Petition for IPR filed against claims 1-17 Institution of IPR Denied by PTAB Jan. 27, 2021.
IPR2020-01359, *DISH Network, L.L.C.* v. *Broadband iTV, Inc. (BBiTV)*, filed Jul. 31, 2020, U.S. Pat. No. 9,648,388 Petition for IPR filed against claims 1-19 Termination Due to Settlement After Institution of Trial Dec. 15, 2021.
IPR2020-01360, *DISH Network, L.L.C.* v. *Broadband iTV, Inc. (BBiTV)*, filed Jul. 31, 2020, U.S. Pat. No. 9,648,388, Petition for IPR filed against claims 1, 2, 5, 7-19 Institution of IPR Denied by PTAB Feb. 12, 2021.
IPR2021-00556, *AT&T Services, Inc. and DirecTV, LLC* v. *Broadband iTV, Inc. (BBiTV)*, filed Feb. 19, 2021, U.S. Pat. No. 10,028,026, Petition for IPR filed against claims 1-16 Institution of IPR Granted by PTAB Aug. 25, 2021 Motion for Joinder of Inter Partes Review IPR2020-01267 Granted by PTAB Aug. 25, 2021.
IPR2021-00603, *AT&T Services, Inc. and DirecTV, LLC* v. *Broadband iTV, Inc. (BBiTV)*, filed Mar. 4, 2021, U.S. Pat. No. 9,998,791, Petition for IPR filed against claims 1-3, 5-12, 14-18 Institution of IPR Granted by PTAB Aug. 25, 2021 Motion for Joinder of Inter Partes Review IPR2020-01280 Granted by PTAB Aug. 25, 2021.
IPR2021-00649, *AT&T Services, Inc. and DirecTV, LLC* v. *Broadband iTV, Inc. (BBiTV)*, filed Mar. 12, 2021, U.S. Pat. No. 9,648,388, Petition for IPR filed against claims 1-19 Institution of IPR Granted by PTAB Aug. 25, 2021 Motion for Joinder of Inter Partes Review IPR2020-01359 Granted by PTAB Aug. 25, 2021.
Joint Stipulation of Dismissal of All Claims, in *Broadband iTV, Inc.* v. *DISH Network L.L.C.*, Case No. 1:21-cv-02867 (D. Col.), filed on Dec. 1, 2021.
Notice of Alternative Dispute Resolution/Mediation Outcome: Settled during ADR/Mediation, filed in *Broadband iTV, Inc.* v. *AT&T Services, Inc. et al.*, Case No. 1:20-cv-00717 (W.D. Tex.), filed on Oct. 25, 2021.
Joint Motion to Terminate Inter Partes Review With Respect to Petitioner DISH Network L.L.C., filed in *DISH Network L.L.C., AT&T Services, Inc., and DirecTV, LLC* v. *Broadband iTV, Inc.*, Case No. IPR2020-1267 (PTAB), Paper No. 68, filed on Dec. 2, 2021.
Order Settlement as to DISH Network L.L.C., issued in *DISH Network L.L.C., AT&T Services, Inc., and DirecTV, LLC* v. *Broadband iTV, Inc.*, Case No. IPR2020-1267 (PTAB), Paper No. 72, issued on Dec. 7, 2021.
Joint Motion to Terminate Inter Partes Review (With Respect to Petitioners AT&T Services, Inc. and DirecTV, LLC), filed in *AT&T Services, Inc. and DirecTV, LLC* v. *Broadband iTV, Inc.*, Case No. IPR2020-1267 (PTAB), Paper No. 73, filed on Dec. 14, 2021.
Joint Motion to Terminate Inter Partes Review With Respect to Petitioner DISH Network L.L.C., filed in *DISH Network L.L.C., AT&T Services, Inc., and DirecTV, LLC* v. *Broadband iTV, Inc.*, Case No. IPR2020-1280 (PTAB), Paper No. 59, filed on Dec. 2, 2021.
Order Settlement as to DISH Network L.L.C., issued in *DISH Network L.L.C., AT&T Services, Inc., and DirecTV, LLC* v. *Broadband iTV, Inc.*, Case No. IPR2020-1280 (PTAB), Paper No. 62, issued on Dec. 7, 2021.
Joint Motion to Terminate Inter Partes Review (With Respect to Petitioners AT&T Services, Inc. and DirecTV, LLC), filed in *AT&T Services, Inc. and DirecTV, LLC* v. *Broadband iTV, Inc.*, Case No. IPR2020-1280 (PTAB), Paper No. 63, filed on Dec. 14, 2021.
Joint Motion to Terminate Inter Partes Review With Respect to Petitioner DISH Network L.L.C., filed in *DISH Network L.L.C., AT&T Services, Inc., and DirecTV, LLC* v. *Broadband iTV, Inc.*, Case No. IPR2020-1359 (PTAB), Paper No. 55, filed on Dec. 2, 2021.
Order Settlement as to DISH Network L.L.C., issued in *DISH Network L.L.C., AT&T Services, Inc., and DirecTV, LLC* v. *Broadband iTV, Inc.*, Case No. IPR2020-1359 (PTAB), Paper No. 58, issued on Dec. 7, 2021.
Joint Motion to Terminate Inter Partes Review (With Respect to Petitioners AT&T Services, Inc. and DirecTV, LLC), filed in *AT&T Services, Inc. and DirecTV, LLC* v. *Broadband iTV, Inc.*, Case No. IPR2020-1359 (PTAB), Paper No. 59, filed on Dec. 14, 2021.
Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit E-20 (Invalidity Chart of U.S. Pat. No. 10,028,026 ("the '026 patent") by U.S. Patent Application Publication No. 2002/0083124A1 ("Knox")) to Defendant's Invalidity Contentions, served in *Broadband iTV, Inc.* v *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit E-23a (Invalidity Chart of U.S. Pat. No. 10,028,026 ("the '026 patent") by Microsoft Patents) to Defendant's Invalidity Contentions, served in *Broadband iTV, Inc.* v. *Amazon.*

(56) References Cited

OTHER PUBLICATIONS com, Inc., Amazon.com Services LLC f/k/a Amazon.com Services, Inc., et al., Case No. 6:20-cv-00921 (W.D. Tex.), served on Dec. 14, 2021.
Non-Confidential Exhibit E-24 (Invalidity Chart of U.S. Pat. No. 10,028,026 ("the '026 patent") by Seachange System) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit E-25 (Invalidity Chart of U.S. Pat. No. 10,028,026 ("the '026 patent") by U.S. Pat. No. 8,042,132 B2 ("Carney")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit E-26 (Invalidity Chart of U.S. Pat. No. 10,028,026 ("the '026 patent") by U.S. Patent Application Publication No. 2004/0103120A1 ("Fickle")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit E-27 (Invalidity Chart of U.S. Pat. No. 10,028,026 ("the '026 patent") by U.S. Patent Application Publication No. 2002/0104099 ("Novak")) to Defendant's Invalidity Contentions, served in *Broadband iTV, Inc.* v *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit E-28 (Invalidity Chart of U.S. Pat. No. 10,028,026 ("the '026 patent") by U.S. Pat. No. 7,650,621 ("Thomas")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit E-29 (Invalidity Chart of U.S. Pat. No. 10,028,026 ("the '026 patent") by U.S. Pat. No. 7,690,020 ("Lebar")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit E-30 (Invalidity Chart of U.S. Pat. No. 10,028,026 ("the '026 patent") by U.S. Pat. No. 7,155,674 ("Breen I")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit E-31 (Invalidity Chart of U.S. Pat. No. 10,028,026 ("the '026 patent") by U.S. Patent Application Publication No. 2010/0153997 ("Baumgartner II")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit E-32 (Invalidity Chart of U.S. Pat. No. 10,028,026 ("the '026 patent") by Cablelabs Video-On-Demand Content Specification Version 1.1 ("CableLabs")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit E-33 (Invalidity Chart of U.S. Pat. No. 10,028,026 ("the '026 patent") by "Ingest & Metadata Partitioning: Requirements for Television On Demand" ("Scheffler")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit G-1 (Invalidity Chart of U.S. Pat. No. 9,973,825 ("the '825 Patent") by U.S. Patent Application Publication No. 2008/0301746 ("Wiser")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit G-2 (Invalidity Chart of U.S. Pat. No. 9,973,825 ("the '825 Patent") by U.S. Pat. No. 8,181,201 ("Goldenberg")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit G-3 (Invalidity Chart of U.S. Pat. No. 9,973,825 ("the '825 Patent") by U.S. Pat. No. 7,627,824 ("Segel")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit G-4 (Invalidity Chart of U.S. Pat. No. 9,973,825 ("the '825 Patent") by U.S. Patent Application Publication No. 2005/0160458A1 ("Baumgartner I")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit G-5 (Invalidity Chart of U.S. Pat. No. 9,973,825 ("the '825 Patent") by U.S. Pat. No. 7,003,792 ("Yuen")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit G-6 (Invalidity Chart of U.S. Pat. No. 9,973,825 ("the '825 Patent") by U.S. Patent Application Publication No. 2003/0151621 ("McEvilly")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit G-7 (Invalidity Chart of U.S. Pat. No. 9,973,825 ("the '825 Patent") by U.S. Patent Application Publication No. 2006/0242665 ("Knee")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit G-8 (Invalidity Chart of U.S. Pat. No. 9,973,825 ("the '825 Patent") by U.S. Pat. No. 6,732,369 ("Schein")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit G-9 (Invalidity Chart of U.S. Pat. No. 9,973,825 ("the '825 Patent") by U.S. Pat. No. 8,042,132 B2 ("Carney")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit G-10 (Invalidity Chart of U.S. Pat. No. 9,973,825 ("the '825 Patent") by U.S. Patent Application Publication No. 2004/0103120A1 ("Fickle")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit G-11 (Invalidity Chart of U.S. Pat. No. 9,973,825 ("the '825 Patent") by U.S. Pat. No. 7,650,621 ("Thomas")) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Non-Confidential Exhibit H (State of the Art) to Defendant's Invalidity Contentions, served in *Broadband iTV, Inc.* v. *Amazon.com, Inc., Amazon.com Services LLC f/k/a Amazon.com Services, Inc., et al.*, Case No. 6:20-cv-00921 (W.D. Tex.), served on Dec. 14, 2021.
Order of Dismissal with Prejudice, issued in *Broadband iTV, Inc.* v. *AT&T Services, Inc. et al.*, Case No. 1:20-cv-00717 (W.D. Tex.), issued on Dec. 17, 2021.

\* cited by examiner

VOD Content Delivery System, Overall Architecture

Drill Down Navigation Example

Classified Ad System, Overall Architecture

Web-Based Content Management System

Content Screening System

Content Feed and Conversion System

VIDEO-ON-DEMAND CONTENT DELIVERY METHOD FOR PROVIDING VIDEO-ON-DEMAND SERVICES TO TV SERVICE SUBSCRIBERS

CROSS-REFERENCE TO RELATED APPLICATIONS

This U.S. patent application is a continuation application of co-pending U.S. patent application Ser. No. 16/692,298, filed on Nov. 22, 2019, of the same inventor and entitled "VIDEO-ON-DEMAND CONTENT DELIVERY METHOD FOR PROVIDING VIDEO-ON-DEMAND SERVICES TO TV SERVICE SUBSCRIBERS", which is a continuation application of U.S. patent application Ser. No. 16/185,367, filed on Nov. 9, 2018, of the same inventor and entitled "VIDEO-ON-DEMAND CONTENT DELIVERY METHOD FOR PROVIDING VIDEO-ON-DEMAND SERVICES TO TV SERVICE SUBSCRIBERS", now issued as U.S. Pat. No. 10,491,954 on Nov. 26, 2019, which is a continuation application of U.S. patent application Ser. No. 15/664,655, filed on Jul. 31, 2017, of the same inventor and entitled "VIDEO-ON-DEMAND CONTENT DELIVERY METHOD FOR PROVIDING VIDEO-ON-DEMAND SERVICES TO TV SERVICE SUBSCRIBERS", now issued as U.S. Pat. No. 10,129,597 on Nov. 13, 2018, which is a continuation application of U.S. patent application Ser. No. 15/399,116, filed on Jan. 5, 2017, of the same inventor and entitled "VIDEO-ON-DEMAND CONTENT DELIVERY METHOD FOR PROVIDING VIDEO-ON-DEMAND SERVICES TO TV SERVICE SUBSCRIBERS", issued as U.S. Pat. No. 9,998,791 on Jun. 12, 2018, which is a continuation application of U.S. patent application Ser. No. 15/148,807, filed on May 6, 2016, of the same inventor and entitled "VIDEO-ON-DEMAND CONTENT DELIVERY METHOD FOR PROVIDING VIDEO-ON-DEMAND SERVICES TO TV SERVICE SUBSCRIBERS", issued as U.S. Pat. No. 9,578,376 on Feb. 21, 2017, which is a continuation application of U.S. patent application Ser. No. 14/987,283, filed on Jan. 4, 2016, of the same inventor and entitled "VIDEO-ON-DEMAND CONTENT DELIVERY METHOD FOR PROVIDING VIDEO-ON-DEMAND SERVICES TO TV SERVICE SUBSCRIBERS", issued as U.S. Pat. No. 9,338,512 on May 10, 2016, which is a continuation application of U.S. patent application Ser. No. 14/703,597, filed on May 4, 2015, of the same inventor and entitled "VIDEO-ON-DEMAND CONTENT DELIVERY SYSTEM FOR PROVIDING VIDEO-ON-DEMAND SERVICES TO TV SERVICE SUBSCRIBERS", issued as U.S. Pat. No. 9,232,275 on Jan. 5, 2016, which is a continuation application of U.S. patent application Ser. No. 12/852,663, filed on Aug. 9, 2010, of the same inventor and entitled "SYSTEM FOR ADDING OR UPDATING VIDEO CONTENT FROM INTERNET SOURCES TO EXISTING VIDEO-ON-DEMAND APPLICATION OF A DIGITAL TV SERVICES PROVIDER SYSTEM", issued as U.S. Pat. No. 9,078,016 on Jul. 7, 2015, which is a divisional application of U.S. patent application Ser. No. 11/952,552, filed on Dec. 7, 2007, of the same inventor and entitled "SYSTEM FOR MANAGING, CONVERTING, AND TRANSMITTING VIDEO CONTENT FOR UPLOADING ONLINE TO A DIGITAL TV SERVICES PROVIDER SYSTEM", issued as U.S. Pat. No. 7,774,819 on Aug. 10, 2010, which is a divisional application of U.S. patent application Ser. No. 10/909,192, filed on Jul. 30, 2004, of the same inventor and entitled "SYSTEM AND METHOD FOR MANAGING, CONVERTING AND DISPLAYING VIDEO CONTENT ON A VIDEO-ON-DEMAND PLATFORM, INCLUDING ADS USED FOR DRILL-DOWN NAVIGATION AND CONSUMER-GENERATED CLASSIFIED ADS", issued as U.S. Pat. No. 7,590,997 on Sep. 15, 2009, each of which is hereby incorporated by reference as if fully set forth herein.

TECHNICAL FIELD

This invention generally relates to the provision of interactive television services through cable TV infrastructure, and more particularly, to a system and method for managing, converting and displaying video content on a video-on-demand platform, and particularly, advertising displays used for drill-down navigation and displays of consumer-generated classified ads on TV.

BACKGROUND OF INVENTION

Cable television (CATV) systems are used to deliver television services to a vast majority of TV-viewing homes in the U.S. and other technologically advanced countries. The typical CATV system has a cable service provider head end equipped with video servers to transmit CATV program signals through distribution lines to local nodes and from there to TV subscriber homes. Within the subscriber homes, the CATV program signals are transmitted to one or more customer-premises TV s which are coupled to external set-top boxes for channel tuning or are equipped with internal cable channel tuners.

Current CATV set-top boxes provide various functions for channel switching and program access between subscribers and the CATV head end. The more advanced digital set-top boxes are individually addressable from the CATV head end, and also allow subscribers to input via remote control units their selection inputs for transmission on a back channel of the connecting cable to the CATV head end, thereby enabling subscribers to access interactive television services and other types of advanced digital TV services. A primary type of interactive television system is referred to generally as a "video-on-demand" (VOD) system, wherein a viewer can enter a selection choice for a video program via the remote control unit to the set-top box and have the desired video program delivered instantaneously for display on the TV. Such VOD applications can include on-demand movies, documentaries, historic sports events, TV programs, infomercials, advertisements, music videos, short-subjects, and even individual screen displays of information. VOD-based interactive television services generally allow a viewer to use the remote control to cursor through an on-screen menu and select from a variety of titles for stored video programs for individual viewing on demand. Advanced remote control units include button controls with VCR-like functions that enable the viewer to start, stop, pause, rewind, or replay a selected video program or segment. In the future, VOD-based interactive television services may be integrated with or delivered with other advanced interactive television services, such as webpage browsing, e-mail, television purchase ("t-commerce") transactions, and multimedia delivery.

With the increasing interactive functionality and customer reach of interactive television services, advertisers and content providers are find it increasingly attractive to employ on-demand advertising, program content, and TV transactions for home viewers. VOD content delivery platforms are being designed to seamlessly and conveniently deliver a wide range of types of advertising, content, and transaction services on demand to home viewers. An example of an advanced VOD delivery platform is the N-Band™ system offered by Navic Systems, Inc., d/b/a Navic Networks, of Needham, Mass. This is an integrated system which provides an application development platform for third party application developers to develop new VOD service applications, viewer interfaces, and ancillary interactive services for deployment on VOD channels of CATV operators in cable service areas throughout the U.S. A detailed description of the Navic N-Band system is contained in U.S. Patent Application 2002/066,106, filed on May 30, 2002, which is incorporated herein by reference.

Advanced digital set-top boxes also have the ability to collect data such as a log of channels tuned to and programs watched by the viewer. The set top box can be designed to collect and report this data automatically to the cable head end. At the head end location, the viewer data can be aggregated over many users with personally identifying data removed, and provided to advertisers and program sponsors for information in designing and targeting new ads and programs for viewer preferences, thereby resulting in increased viewership, higher viewer impressions per ad or program, and ultimately increased revenues.

Current VOD ads and program offerings are generally produced for mass audiences. It would be particularly desirable to adapt a VOD delivery platform to deliver ads, promotions, programs, and informational content by allowing viewers to navigate readily and visually to specific items of interest. Such visual navigation for content delivery would be more likely to create a satisfying viewer experience, and also to engage individual viewers in on-demand TV services and transactions. It would also be a particularly desirable to adapt a VOD delivery platform to receive uploads of user ads from individuals such as through an online network for search, navigation, and display to TV subscribers.

SUMMARY OF THE INVENTION

In accordance with a first objective of the present invention, a video-on-demand (VOD) content delivery system for delivery templatized VOD content comprises:

(a) a VOD Application Server located at a Cable Head End which manages a Database of templates for generating templatized VOD content in response to requests for specific video content elements by viewer request signals transmitted from the TV equipment of a viewer to the Cable Head End;

(b) a Video Server for storing video content encoded as video content elements and for supplying a requested video content element in response to the VOD Application Server for delivery to the TV equipment of the viewer; and (c) an Application Data Center for creating and storing a plurality of different templates ordered in a hierarchy for presentation of video content elements of different selected types categorized in hierarchical order, wherein a template for display of a video content element in a higher level of the hierarchy includes a link to one or more templates and video content elements in a lower level of the hierarchy, said plurality of hierarchically-ordered templates and links being stored in the Database managed by the VOD Application Server, and (d) wherein said VOD Application Server, in response to viewer request for a selected video content element of a higher order in the hierarchy, retrieves the corresponding template from said Database and corresponding video content element from said Video Server to provide a templatized VOD content display on the viewer's TV equipment which includes one or more links to video content elements in a lower order of hierarchy, and upon viewer request selecting a link displayed in the templatized VOD content to a video content element in the lower order of hierarchy, retrieves the corresponding template and video content element of lower order hierarchy for display on the viewer's TV equipment, thereby enabling the viewer to use drill-down navigation through TV displays of templatized VOD content.

In a preferred embodiment of the templatized VOD content delivery system, the system employs the templatized content delivery to create a User Interface for the viewer to navigate through progressively more specific template (display ad) types linked in series to reach an end subject of interest to the viewer. Referred to herein as "Drill-Down Ads," the series of progressively more specific display ad types allow the subscriber to navigate to an end subject of interest while at the same time having a unique visual experience of moving visually through a series of ads mirroring the viewer's path to the end subject of interest.

As an example involving automobile advertising, the User Interface can provide a hierarchical ordering of video display ads that starts with an Auto Maker's ad displayed with links to Model ads. The viewer can select using the remote control unit a specific Model ad which is displayed with links to more specific levels of ads, such as "Custom Packages", "Feature/Options", or "Color/Styling", etc., until it reaches an end subject of interest to the subscriber. The viewer would thus be able to navigate to specific content of interest while traversing through video ad displays of the Auto Maker, Models, Model A, Features, etc. Similarly, the viewer can navigate to specific content of interest while traversing through video ad displays of Local Dealers, Dealer A, Current Sales Promotions, etc. The templatized VOD ads are generated dynamically by searching the VOD Application database with each current request by a viewer. This enables the system to dynamically generate and display updated advertising content that remains current. For example, if the Auto Maker changes the Model types available, or if Local Dealer A changes its current sales promotions, that advertiser's ads can be updated with new content and selection options on the system database, and the new templatized ads can be generated dynamically, instead of new ads having to be filmed, produced, contracted, and installed with the cable TV company. Many other types of ads, subjects, and other interactive TV applications can be enabled with the use of the Drill-Down Navigation method. The selections or preferences exhibited by viewer navigation paths through the Drill-Down Navigation can also be tracked, profiled, and/or targeted as feedback data to advertisers for fine-tuning Drill-Down ad designs.

In accordance with a second objective of the invention, a video-on-demand (VOD) content delivery system for managing, converting and displaying consumer-generated classified ads on TV comprises:

(a) a Content Management Website for enabling individual users to upload classified ad content on an online network connection from their remote computers, said uploaded classified ad content including associated meta data for identifying the ad content by title and topical area;

(b) a Content Screening Component for receiving the classified ad content uploaded to the Content Management Website and screening the content for objectionable text, audio, video and/or images in the content, and for rejecting said content if objectionable text, audio, video and/or images are found;

(c) a Content Feed Component for automatically transferring the classified ad content screened by the Content Screening Component with the associated meta data and supplying them to a Content Conversion Component;

(d) a Content Conversion Component for automatically converting the transferred classified ad content supplied from the Content Feed Component into a video data format compatible with the VOD content delivery system, and for automatically indexing the converted classified ad content in a Video Server database according to title and topical area as specified in the content meta data; and (e) a VOD Application Server, operatively connected between said Content Conversion Component and a Cable Head End connected via cable connection to the TV equipment of viewers, for delivering from the Cable Head End classified ad title and topical area listings data generated from the meta data for the classified ad content to be displayed on the TV equipment of viewers to enable their searching for classified ads of interest and, in response to a viewer request signal requesting a specific classified ad of interest transmitted via the TV equipment to the Cable Head End, for retrieving the requested classified ad from the Video Server database and transmitting it to be displayed to the viewer on their TV equipment.

In a preferred embodiment of the TV classified ads system, individual users can upload classified ad content via their web browser, including text, audio, video and/or image files in industry-standard file formats, to the Content Management Website. The Content Screening Component is configured to parse the input for objectionable text words in text files, detect objectionable audio words in audio files, and optically recognize objectionable images in graphics or video files. The Content Feed Component automatically transmits classified ad content that has been appropriately contracted for display (paid for, and within the contracted time period) to the Content Conversion Component and the Video Server database. The VOD Application Server responds to requests input by viewers via remote control and retrieves the requested classified ads indexed by their titles and topical areas from the Video Server database to be displayed on the viewer's TV. The Content Management Website can also include functions for: (a) Account Management of user transaction accounts; (b) Content Classification to facilitate user designation of titles and topical areas to uniquely and attractively identify their classified ads; (c) Bulletin Board for creation and management of consumer-generated content related to announcements and other items of general interest to be displayed to viewers in subsidiary displays; and (d) Transaction Processing for the processing the payment of user fees, changes, and refunds in the use of the system.

The foregoing and other objects, features and advantages of the invention are described in further detail below in conjunction with the accompanying drawings.

DETAILED DESCRIPTION OF INVENTION

Figure 1A:
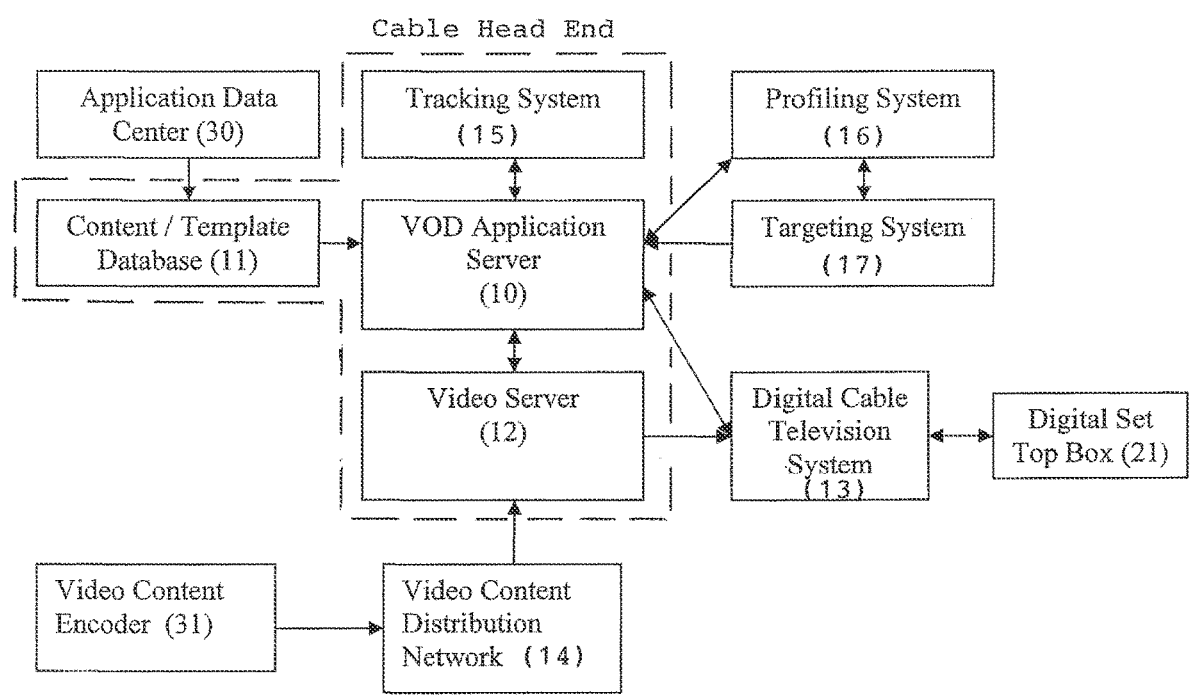
FIG. 1A is a diagram of an overall architecture for a VOD Content Delivery System in accordance with the present invention.

Referring to FIG. 1A, an overall system architecture for a VOD content delivery system includes a VOD Application Server 10 located at a Cable Head End. The VOD Application Server 10 manages a Database 11 of templates and video content segments from Video Server 12 for generating templatized VOD content. The VOD content is generated in response to a viewer request signal transmitted from the Digital Set Top Box 21 of a viewer's TV equipment through the Digital Cable Television System 13 to the VOD Application Server 10 at the Cable Head End. The VOD Application Server 10 may be of the type which enables any compatibly-developed VOD applications to be loaded on and operated on the server. An example of such a VOD Application Server is the Navic N-Band™ server as previously described. Templates for displaying VOD content are created at an Application Data Center 30 and stored in the Database 11 for use by the operative VOD application. The templates may be designed, for example, to present video ad content displays in a logo frame, or to provide navigation buttons and viewer selection options in a frame around currently displayed video content. In the preferred embodiment described in greater detail below, the templates are used to provide navigation aids in a series of progressively more focused ad display types. A Video Content Encoder 31 is used to encode raw video feeds into formatted video content segments compatible with the VOD platform and supply them through a Video Content Distribution Network 14 to the Video Server 12.

In operation, the VOD Application Server 10 operates a VOD application for the CATV system, for example, "automobile infomercials on demand". The viewer sends a request for selected VOD content, such as to see an infomercial on a specific model type made by a specific auto manufacturer, by actuating a viewer request signal by a key press on the viewer's remote control unit transmitting an IR signal to the Set Top Box 21 that is sent on a back channel of the Digital Cable Television System 13 to the VOD Application Server 10 at the Cable Head End. In response to the signal, the VOD Application Server 10 determines the VOD content being requested and retrieves the infomercial ad display template from the Template Database 11 and video content segment from the Video Server 12, in order to generate the corresponding templatized VOD content. In the invention, the templates are of different types ordered in a hierarchy, and display of content in a template of a higher order includes links the viewer can select to content of a lower order in the hierarchy. Upon selecting a link using the remote control, the VOD Application Server 10 retrieves the template and video content of lower order and displays it to the viewer. Each successive templatized display may have further links to successively lower levels of content in the hierarchy, such that the viewer can use the series of linked templatized VOD displays as a "drill-down navigation" method to find specific end content of interest.

Figure 1B:
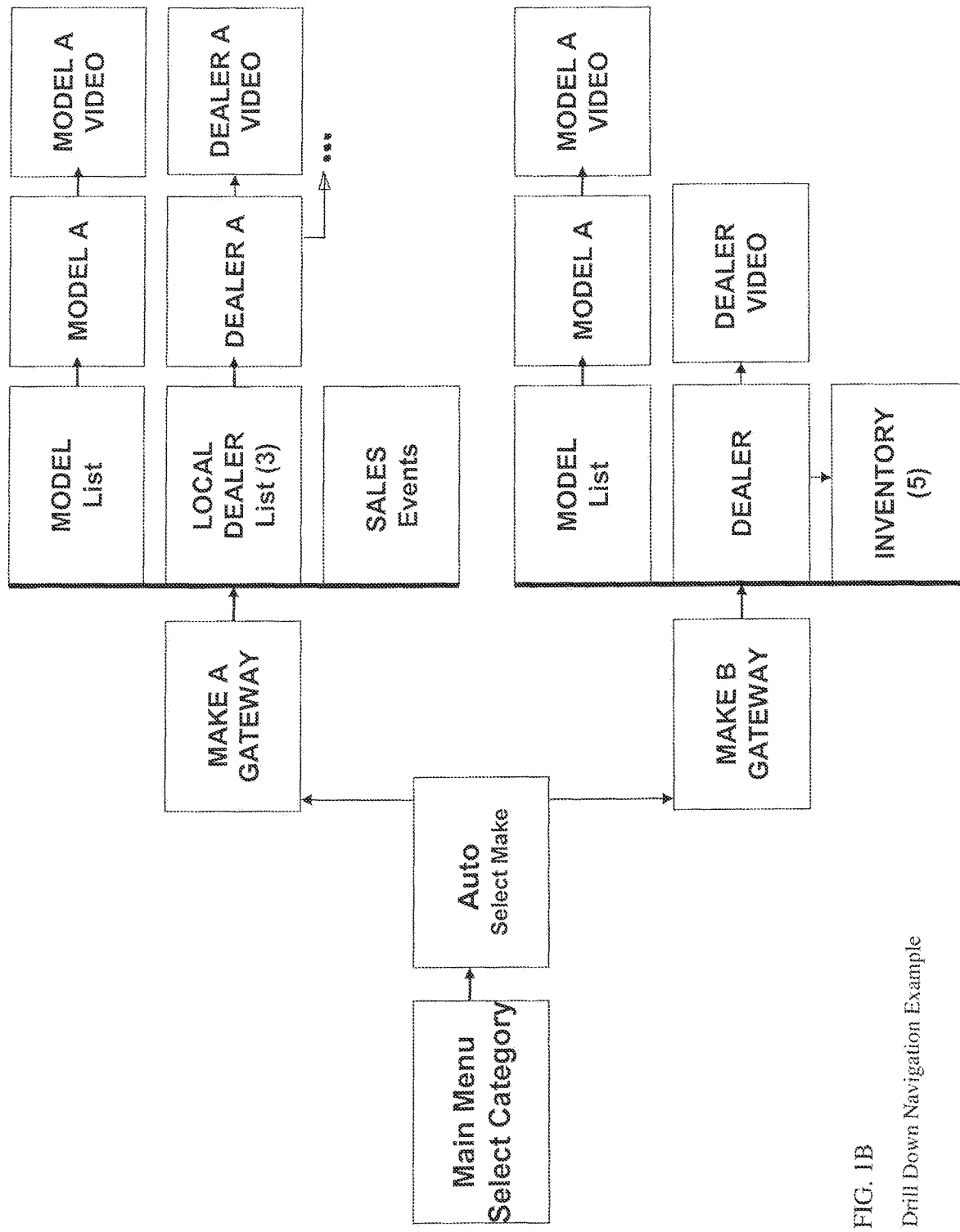
FIG. 1B shows an example of Drill-Down Ad navigation.

Referring to FIG. 1B, a preferred embodiment of the templatized VOD content delivery system is shown providing a User Interface using Drill-Down Navigation through display ads, such as for automobile infomercials. When the viewer selects a VOD application (channel), such as "Wheels-On-Demand", the viewer's TV displays a Main Menu with buttons inviting the viewer to "Select Category". The viewer can select an "Auto" category, and the TV then displays an "Auto" menu with buttons inviting the viewer to "Select Make", such as Make A, Make B, etc. When the viewer makes a selection, such as Make A, the viewer's TV displays a further menu that is a Gateway into templatized VOD content delivery which enables Drill-Down Navigation by templatized display ads. Through the Gateway, the VOD Application leaves the Menu mode and enters the Drill Down Navigation mode for successively displays of hierarchically-ordered video content which allow the viewer to navigate to progressively more focused content. In this example, the highest level of the hierarchy includes categories for Model, Local Dealer, Sales Events, and/or Inventory. When the viewer selects a category such as "Model" from the Gateway, for example, the VOD Application creates a templatized ad display showing video content generic to all models by that automaker framed in a frame which has links (buttons or choices) for a list of the specific models made by that automaker. When the viewer selects the link to a specific model, "Model A" for example, the VOD Application creates a templatized ad display showing video content for Model A, and the viewer can then choose to run a long-form infomercial of the Model A video. Alternatively, the Drill-Down Navigation can continue with further levels of specificity, such as "Custom Packages", "Options", "Colors/Stylings", etc. Similarly, the selection of the "Local Dealer" category from the Gateway can bring up a templatized ad for local dealers with links to specific local dealers in the viewer's cable service area, and a click on a specific "Dealer A" can bring up a templatized ad for Dealer A with further links to more specific content pertaining to Dealer A, such as "Current Sales Promotions", etc.

In this manner, the templatized VOD content delivery system allows the viewer to navigate to specific content of high interest to the viewer using the Drill-Down ads as a navigation tool, while at the same time having a unique visual experience of moving through a series of ads mirroring the viewer's path to the subject of interest. The templatized VOD ads are generated dynamically by searching the Content/Template database with each request by a viewer, enabling the system to display updated navigation choices and content simply by updating the database with updated links and video content. For example, if the Auto Maker changes the Model types of autos currently available, or if Local Dealer A changes its current sales promotions for autos currently available, that advertiser's ads can be updated with new, template frame navigation links and content, instead of entirely new ads or screen displays having to be shot, produced, contracted, delivered, and programmed with the cable TV company. Many other types of layered or in depth ads, subjects, and interactive TV applications can be enabled with the use of the Drill-Down Navigation method. The selections or preferences exhibited by viewer navigation paths through the Drill-Down Navigation can also be tracked, profiled, and/or targeted as feedback data to advertisers for fine-tuning Drill-Down Navigation designs.

Figure 1C:
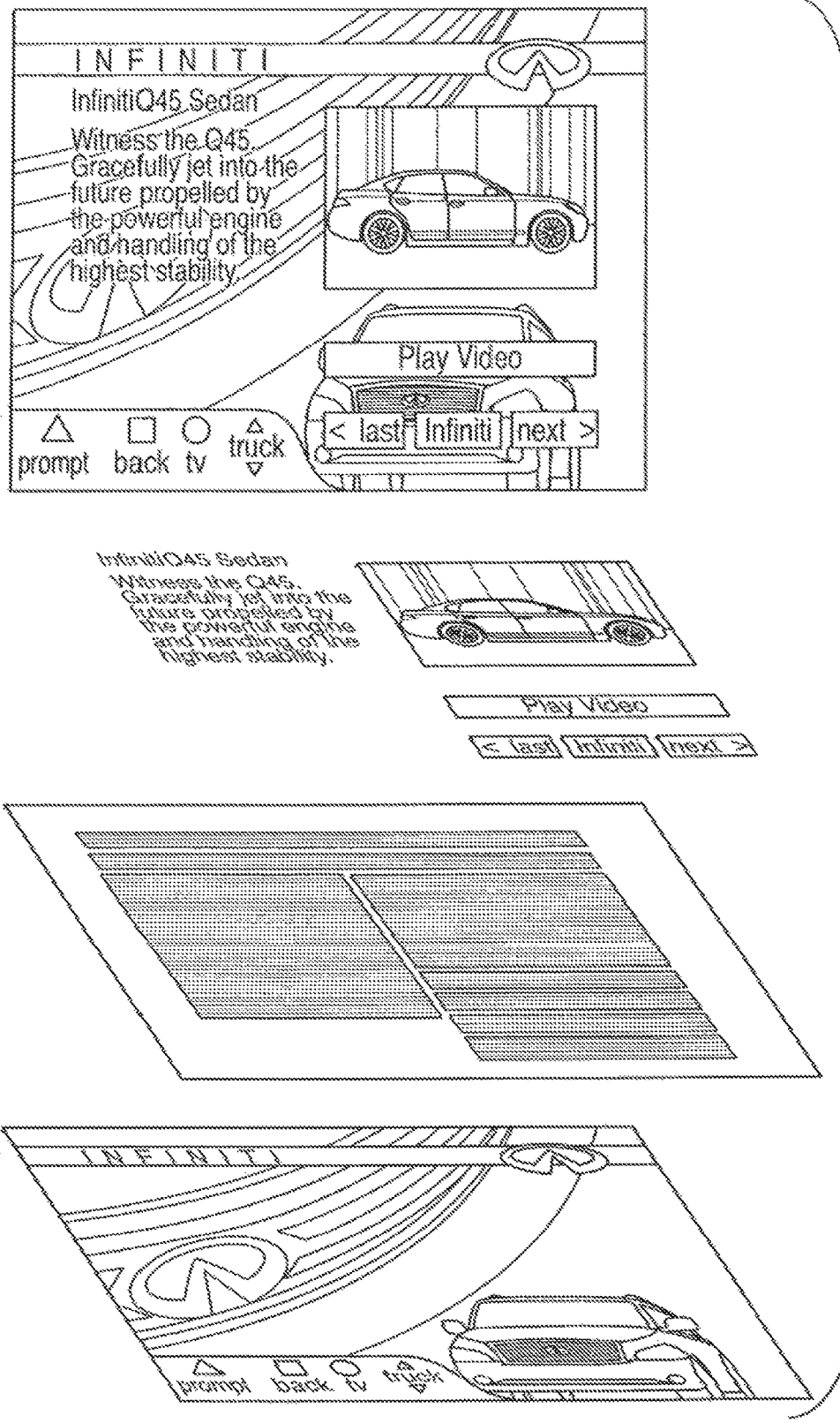
FIG. 1C shows an example of the templatized ad display model.

In FIG. 1C, an example illustrates how a templatized VOD display is generated in layers. A Background screen provides a basic color, logo, or graphical theme to the display. A selected Template (display frame) appropriate to the navigation level the intended display resides on is layered on the Background. The Template typically has a frame in which defined areas are reserved for text, display image(s), and navigation links (buttons). Finally, the desired content constituted by associated Text, Image & Buttons is retrieved from the database and layered on the Template. The resulting screen display shows the combined background logo or theme, navigation frame, and text, video images, and buttons.

Referring again to FIG. 1A, a Tracking System 15 of conventional type can be installed at the Cable Head End to aggregate non-personal data on what channels and programs viewers watch. For the Drill Down Navigation method, the Tracking System 15 can include tracking of the navigation paths viewers use to find subjects of interest in a VOD Application. The aggregation of viewer navigation data can indicate what subjects are most popular, whether some subjects are of greater interest to viewers at certain times of day, of certain demographics, or in relation to certain products or services. The VOD Application Server 10 can export the aggregated viewer navigation data to an external Profiling System 16, such as a non-biased or unrelated firm applying profile analysis methods. The results of the Profiling System 16 can be communicated to a Targeting System 17, such as a template design firm or content production company, to fine-tune the presentation of the templatized VOD content consistent with viewer preferences or interests. The feedback from the Targeting System can be supplied as feedback to the VOD Application Server to modify the Content/Template Database 11.

Another application for the templatized VOD content delivery system can be developed to support video advertisements which link national to local market ad campaigns in "drill-down" fashion. Advertisers, both national and local, can pay for placement of their video advertisements on the system. When the VOD Application is run, the national ads are displayed as a Gateway to linking to the local market ads. In this manner, national ads can be used to transition viewers from general interest in a product to finding specific information about the product available locally.

The templatized VOD content delivery system can also support "traffic building" videos, including music videos, that may not generate direct revenue. Once a video is encoded and registered into the system, the management and distribution of the video is conducted through software systems and automated controls. The User Interface provides the user with the ability to navigate and find desired video content. Selection of a category presents the user with a list of video titles available for playback. Categories and title lists can be generated using real-time database queries, allowing for database-driven management of content within the User Interface. The User Interface can also support a search interface which allows the user to search the video content database to generate a list of video titles with specific characteristics.

The core services and functions of the VOD content delivery system can include:
Encoding—converts videos to proper digital format for playback on cable video-on-demand systems, currently MPEG2 format
Metadata Input—allows for the input of descriptive data regarding each video
Packaging—Prepares a data package for transport consisting of the encoded video file and the metadata
Scheduling—Establishes the schedule when packages are to be delivered to cable video-on-demand systems via the transport system
Transport—Digital broadcast medium through which the packages are migrated from the central processing facility to the cable video-on-demand systems.

The core services and functions of the User Interface system can include:

Development of UI "pages"—An Internet-based system is used for the composition, coding and quality assurance of the User Interface images ("pages") that are presented to the user on an interactive basis.

Category and List Presentation—The category lists and title lists presented to the user for navigation and selection can be generated and rendered real-time using database queries against the video metadata database. These lists can also be incorporated in the fully rendered graphics if real-time queries are not required or desired.

Distribution—The UI system supports a scheduling and transport subsystem separate from the video distribution system for the distribution of the UI assets and related set-top box software components to local UI servers installed at the cable head end.

User Input Device—The UI system receives user input and commands from the IR remote control used with the digital set-top box.

User Database—The UI system maintains a database of set-top box addresses that is used to identify the users of the system. This database is the seed for the Profiling Database system described below.

Targeting—The UI system is capable of changing the UI presentation to a specific user based on the information contained in the User Database and the Profiling Database.

The core services and functions of the Tracking System can include:

Consolidation of Video-On-Demand Data—The Tracking System can be made capable of ingesting and consolidating usage data provided by the cable video-on-demand systems. This may be performed through automated interfaces or "feeds", or it may be performed through the batch processing of data files delivered by the cable operators.

Consolidation of UI Data—The Tracking System can gather and consolidate data from the UI system on an automated basis. The UI system can provide data describing the user commands, behaviors, responses and requests generated by each user while using the User Interface system.

Reporting—The Tracking System can generate reports and analyses of the Video-On-Demand data and the UI data.

Web Interface—The Tracking System can include a Web interface for providing authorized users such as advertisers with access to specific reports.

The core services and functions of the Profiling System can include:

Consolidation of Profiling Data—The Profiling System can be made capable of consolidating on a continuing, automated basis all user-related data requested by advertisers or by the system operator.

Interface to Targeting System—The Profiling System can provide pertinent data as required by the Targeting System within the UI system. This data is used to reformat UI presentations based on the data values.

Interface to Targeting System—The Profiling System data can be accessed and incorporated into the Targeting System.

Support of Private and Public Data—The Profiling System can segregate and maintain as private any data gathered specifically for an advertiser for the use of that advertiser.

Figure 2A:
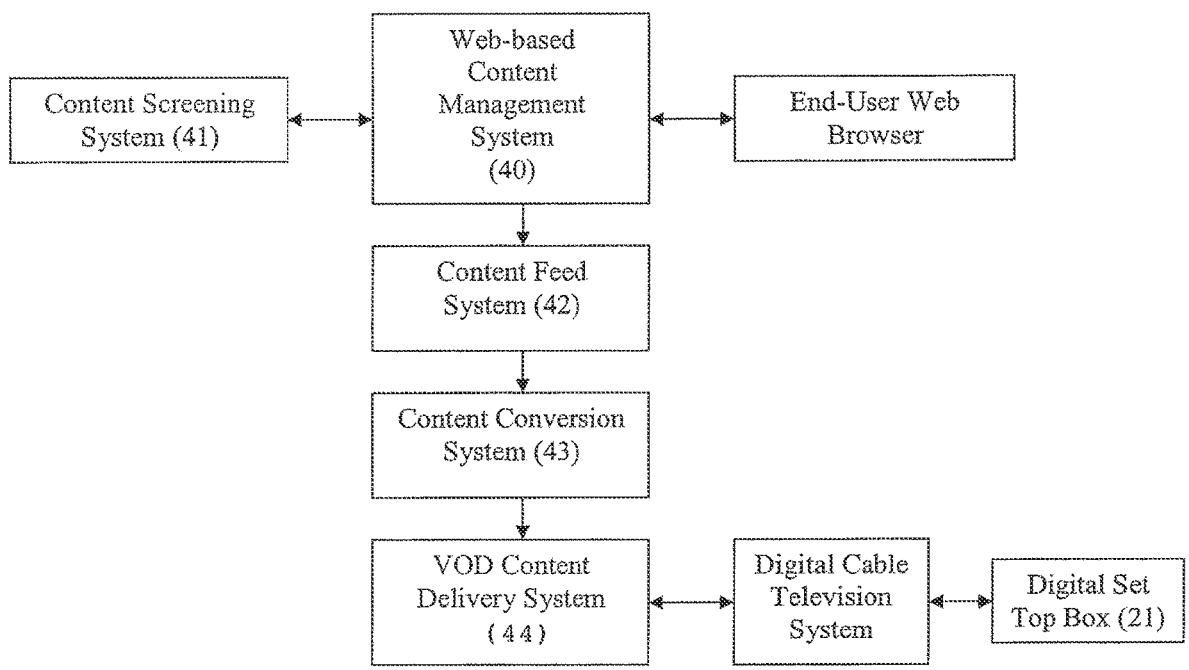
FIG. 2A is a process flow diagram of the overall architecture of a consumer generated Classified Ad application for the VOD Content Delivery System.

As another aspect of the present invention, a VOD content delivery system may be adapted to offer consumer-generated classified ads on TV. The VOD content delivery system is provided with a Content Management frontend to receive consumer input and convert it to video display ads maintained in the system database. Referring to FIG. 2A, a system for managing, converting and displaying individual consumer-generated ads on a VOD content delivery system has a Web-based Content Management System 40 for enabling an individual user to upload content from their computer via a web browser to display a consumer-generated video ad on TV. The uploaded content includes meta data for classifying the video ad by title and topical area(s). Content Screening System 41 is used for screening the content input by the individual user, such as by performing automatic searching for objectionable text, audio, video and/or images and rejecting the content if found objectionable. A Content Feed System 42 is used to automatically transfer consumer-generated content screened through the Content Screening System 41 to a Content Conversion System 43. This system automatically converts the consumer-generated content supplied by the Content Feed System 42 into video display format compatible with the VOD content delivery system. The converted video ad is indexed by title and classified topical areas according to the meta data supplied by the user, in accordance with the indexing system maintained by the Content Management System. The VOD Content Delivery System 44 operates a Classified Ads VOD Application in which menus for finding classified ads are navigated by viewers, and specific classified ads are delivered through the Digital Cable Television System for display as video ads on the viewer's TV equipment in response to viewer request input by remote control to the Digital Set Top Box 21, as described previously with respect to the operation of the general VOD platform.

Figure 2B:
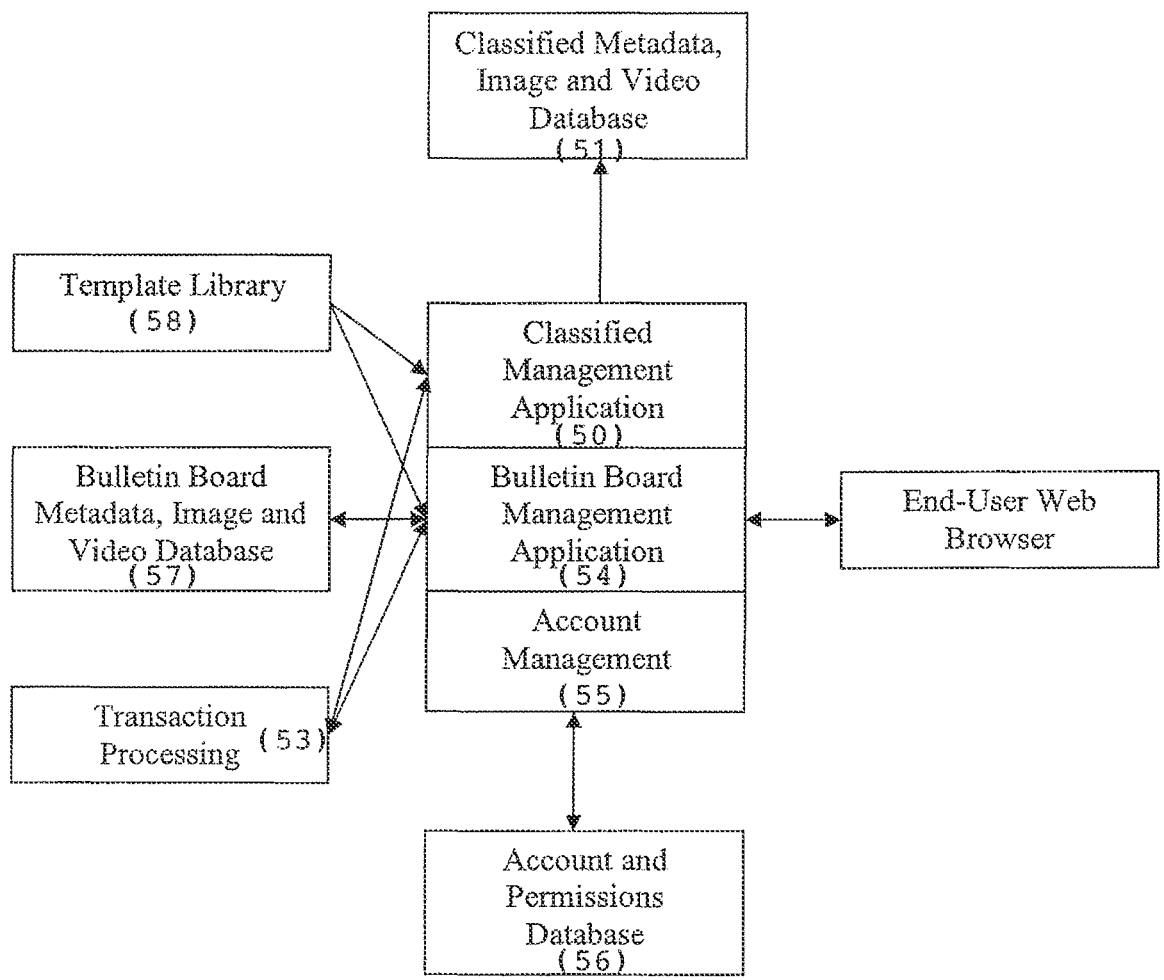
FIG. 2B illustrates a Content Management Website for the Classified Ad application.

Referring to FIG. 2B, the Web-based Content Management System 40 includes a plurality of functional components to allow consumers to create and manage their own classified ads as interactive television content, as well as pay for the distribution of their content within the digital cable television system. A Classified Management Application 50 is used to receive consumer-input content, have it screened (by the Content Screening System 41, not shown), and store it in the Classified Metadata, Image and Video Database 51. Consumer payment for running video ads is handled by the Transaction Processing Component 53. Also included in the Content Management System is an Account Management Component 55 and Account & Permissions Database 56 for management of user accounts for use of the web-based TV Classified Ads system. A Bulletin Board Ads application may be operated in parallel with the TV Classified Ads application. A Bulletin Board Management Application 54 and Database 57 enable the creation and management of consumer-generated content relating to public announcements and other items of general interest for groups, organizations or topics. The preferred VOD Content Delivery System uses templatized VOD content, and a Template Library 58 is used to store templates for both the Classified Ads and Bulletin Board Ads applications.

The Account Management Component controls the access by persons to the web-based Content Management System. The Account Management Component identifies persons accessing the system for the first time and allows these persons to register and create an account by providing an account name, password, credit card information and other information required for the payment of fees. The Account Management Component controls the access by registered users to their accounts and manages the privileges and security associated to all accounts. Persons may create accounts for the creation and management of Classified Ads. Accounts capable of accessing the Bulletin Board Management Application may also be assigned by a system administrator in the Account Management Component. Any account capable of accessing the Bulletin Board application can then create and manage bulletin board ads for the assigned bulletin boards.

The Classified Content Management System enables users to upload text, audio, video, and/or image files for classified ads in industry-standard file formats and have it converted into video display ads compatible with the VOD Content Delivery System. Classified ads are searched on the viewer's TV equipment by menus and lists indexed by title and topical areas corresponding to the metadata associated with the classified ads content. Selection of a listed item results in the display of a TV display ad containing uploaded text, images, video and/or audio. Users pay listing fees to the operator of the system for maintaining and displaying the classified ads on the digital cable television system.

Significant features of the Classified Ads Content Management System include: (a) the ability to enter descriptive data and text regarding the item; (b) uploading digital images of the item to the Content Management System; (c) uploading digital video of the item to the Content Management System; (d) uploading digital audio regarding the item to the Content Management System; (e) automated size and resolution processing of digital images uploaded to the system; (f) automated digital format conversion of digital video uploaded to the system; (g) automated digital format conversion of digital audio uploaded to the system; (h) ability for users to select an interactive television screen design (template) from a catalog of available templates; (i) ability to view on a web browser the interactive television template containing the consumer-provided content; (j) ability to save classified content in persistent memory or storage for subsequent modification; (k) ability to mark classified content as completed and ready for submission to the interactive television system; (l) ability to specify the date and time when a classified content item is to become accessible by users of the interactive television system and the data and time when a classified content item is to be removed from display on the interactive television system; (m) ability to notify the user through email or other communication system that a specific content item is scheduled to be displayed or removed from the interactive television system; (n) ability to modify and resubmit previously created classified content for display on the interactive television system; (o) ability to access viewing data generated by the Tracking System regarding access and use of specific consumer-generated content by users of the interactive television system; and (p) ability to calculate fees for classified content and submit payment of the fees using the Transaction Processing system.

As noted in (i) above, the Classified Content Management System allows the user to view the content they have composed using the templates. The templates are designed specifically for use on interactive television systems and the user is able to view on the web-interface their content as composed for presentation on television. As noted in (j) above, the Classified Content Management System allows the persistent storage of classified content; although the user is composing interactive television pages using a template system, the content is persistently stored as individual elements to simplify changes by the user and to allow the conversion of the content to different formats as required by different interactive television systems.

The Bulletin Board Content Management System provides the users of the web-based Content Management System with content creation and content management tools for the creation and maintenance of consumer-generated content related to announcements and other informational items of general interest. Bulletin Board content is displayed on the interactive television system as dedicated interactive television screens (bulletin boards), where approved groups, organizations or topics are each assigned a bulletin board for the display of their information. Bulletin Board content is displayed as list items organized within a bulletin board; selection of a list item results in the display of an interactive television screen containing or providing access to the descriptive data, text, images, video and audio regarding the item.

An alternative implementation of a Bulletin Board can display the content as scrolling text, where the user scrolls through the text, or the text scrolls automatically. Bulletin Board accounts will pay fees determined by the operator of the system for the distribution of the bulletin board content on the interactive television system for display on the digital cable television system. Significant features of the Bulletin Board Content Management System include: (a) the ability to enter descriptive data and text regarding the item; (b) upload digital images to the content management; (c) upload digital video to the content management system; (d) upload digital audio to the content management system; (e) automated size and resolution processing of digital images uploaded to the system; (f) automated digital format conversion of digital video uploaded to the system; (g) automated digital format conversion of digital audio uploaded to the system; (h) ability for users to select an interactive television screen design (template) from a catalog of available templates; (i) ability to view on a web browser the interactive television template containing the consumer-provided bulletin board content; (j) ability to save bulletin board content in persistent memory or storage for subsequent modification; (k) ability to mark bulletin board content as completed and ready for submission to the interactive television system; (l) ability to specify the date and time when specific bulletin board content is to become accessible by users of the interactive television system and the data and time when specific bulletin board content is to be removed from display on the interactive television system; (m) ability to notify the user through email or other communication system that specific bulletin board content is scheduled to be displayed or removed from the interactive television system; (n) ability to modify and resubmit previously created bulletin board content for display on the interactive television system; (o) ability to access viewing data generated by the Tracking System regarding access and use of specific bulletin board content by users of the interactive television system; and (p) ability to calculate fees for bulletin board content and submit payment of the fees in conjunction with the Transaction Processing component.

The Transaction Processing component allows users of the Classified Content Management System and Bulletin Board Content Management System to determine and pay for any fees resulting from their use of these systems. The Transaction Processing component will allow users to pay for fees using credit cards or other supported payment methods. Significant features of the Transaction Processing component include: (a) ability to maintain business rules for use by the Transaction Processing system to determine fees based on user type and content type; (b) ability to maintain business rules for one or more payment methods for use by the Transaction Processing system in handling the settlement of fees; (c) ability to maintain business rules for user account and payment settlement conditions such as delinquency and lack-of-credit for use by the Transaction Processing system in determining user account privileges and content status; and, (d) ability to process payment of fees in real-time for payment methods that support real-time settlement.

Figure 2C:
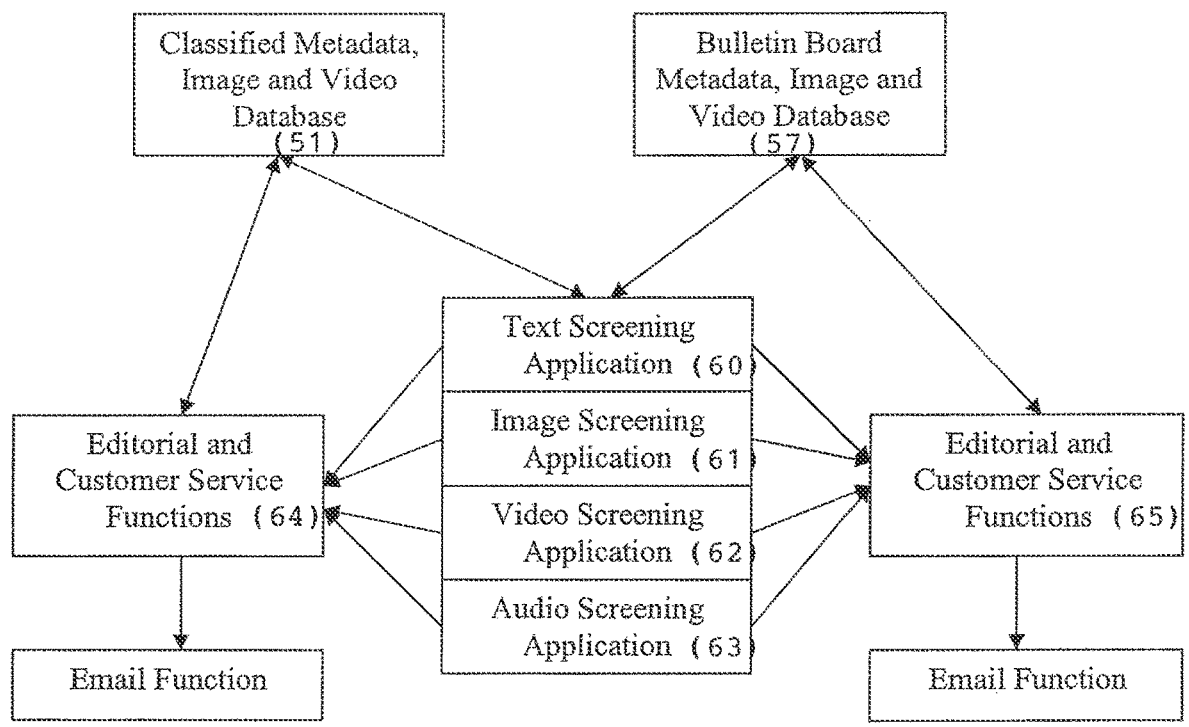
FIG. 2C illustrates a Content Screening Component of the system.

Referring to FIG. 2C, the Content Screening System (41) is comprised of a Text Screening Application 60 which searches for objectionable words or phrases, an Image Screening Application 61 which searches for objectionable graphic images, a Video Screening Application 62 which searches for objectionable images or audio words or phrases in video segments, and an Audio Screening Application 63 which searches for objectionable words or phrases in audio segments. The Content Screening System can be used for both Classified Ads content and Bulletin Board content. Content that has been screened by the Content Screening System is then transferred to the aforementioned Classified Ads Database 51 or the Bulletin Board Content Database 57. The system also has component 64 for Editorial and Customer Service Functions for Classified Ads, and component 65 similarly for Bulletin Board content. These can each include an Email Function to send confirmations of input, reasons for rejection of posting, suggested corrections, further processing, and posting of content to consumers using the system.

Significant features of the Content Screening System include: (a) ability to maintain a library of objectionable or illegal words and phrases for use in the screening of text; (b) ability to perform automated analysis of user content text using the text library as an input and alert system administration personnel to the use of objectionable or illegal content and the use of unknown and suspect words or phrases; (c) ability to maintain a library of objectionable or illegal image elements for use in the screening of images; (d) ability to perform automated image recognition analysis against user content images using the library of image elements as an input and alert system administration personnel to the use of objectionable or illegal content; (e) ability to maintain a library of objectionable or illegal image elements for use in the screening of video; (f) ability to perform automated image recognition analysis against user content video using the library of image elements as an input and alert system administration personnel to the use of objectionable or illegal content; (g) ability to maintain a library of objectionable or illegal audio elements for use in the screening of audio; (h) ability to perform automated audio analysis against user content audio using the library of audio elements as an input and alert system administration personnel to the use of objectionable or illegal content; and (i) ability to save screened content in persistent memory or storage for subsequent processing. Content Screening is automatically performed with the Content Management System 40 during the user process of submitting and/or creating consumer-generated content or may be performed as a process subsequent to the creation of content by the user.

Figure 2D:
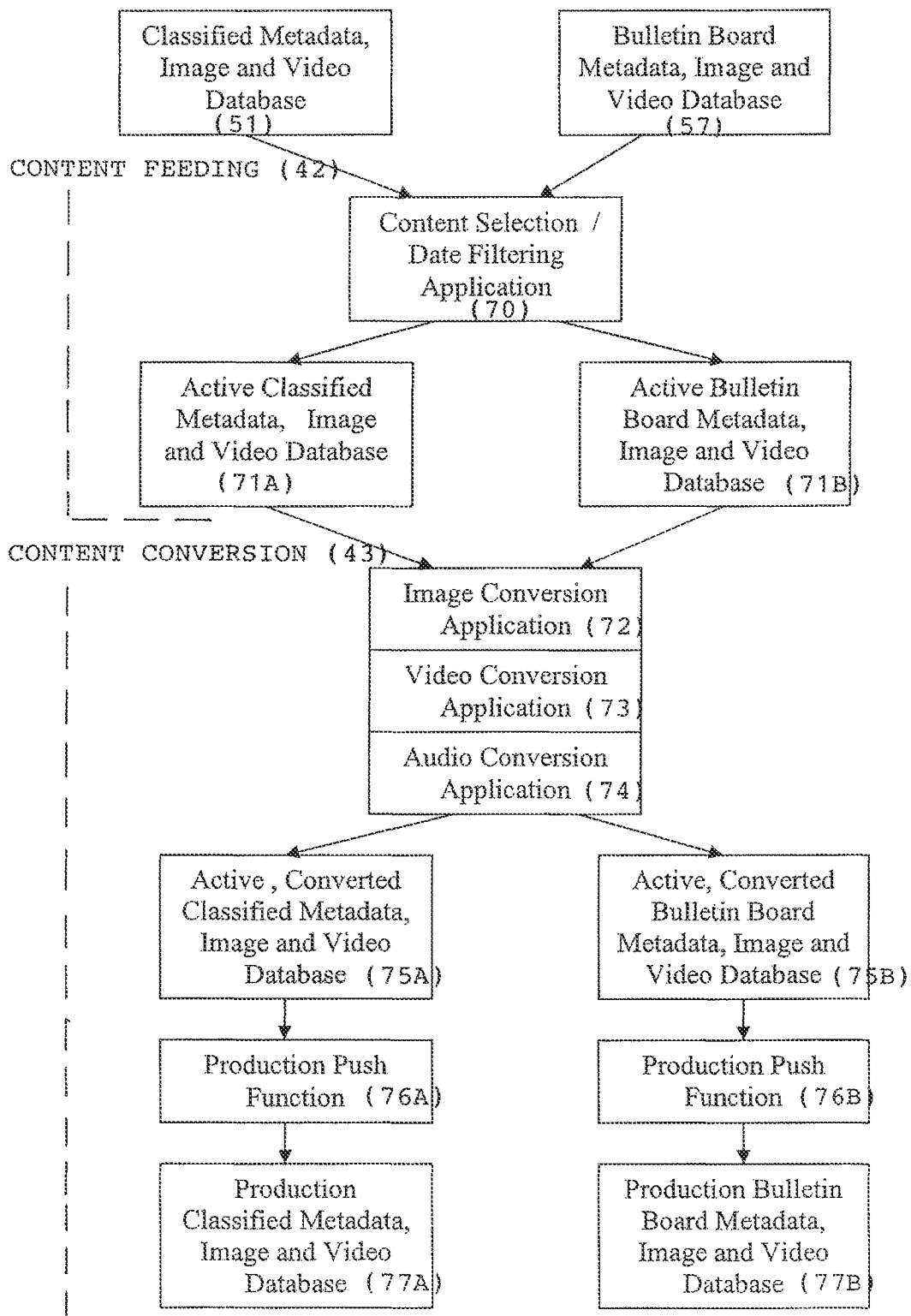
FIG. 2D illustrates a Content Feed and Conversion Components of the system.

Referring to FIG. 2D, the Content Feed System 42 and the Content Conversion System 43 provide for the transfer of user content from the Content Screening System and conversion to video content format compatible with the VOD Content Delivery System 44. The Content Feed System 42 has a Content Selection/Date Filtering Application which selects consumer-generated content uploaded to the system that is within the dates contracted for posting and display of the content as Classified Ads or on Bulletin Boards. Content within the active date range is transferred to the Active Classified Ads Database 71A or the Active Bulletin Board Database 71B.

The Content Conversion System receives consumer-generated content in industry standard formats or created in viewable format (HTML) on the web-based input system and converts the content into formats compatible with the VOD Content Delivery System and for display on viewers' televisions. The Content Conversion System 43 has an Image Conversion Application 72 which converts consumer-uploaded image files (in industry-standard formats such as JPEG, GIF, TIFF, BMP, PDF, PPT, etc.) into VOD content format, a Video Conversion Application 73 which converts consumer-uploaded video files into VOD content format, and an Audio Conversion Application 74 which converts consumer-uploaded audio files into VOD content format. Content converted to VOD content format is stored in the Active Converted Classified Ads Database 75A or the Active Converted Bulletin Board Database 75B. The content is subject to a further Production Push Function 76A, 76B and stored in the Production Classified Ads Database 77A or the Production Bulletin Board Database 77B, if any presentation formatting, date stamping, template framing, or other system editing is required by the system.

Significant features of the Content Feed System include: (a) ability to select user content for submission to the Content Conversion System through the testing of appropriate parameters including the date and time information contained in the user content; (b) ability to appropriately package the elements of the user content to permit the efficient transfer of these content elements to the Content Conversion System through an Application Program Interface or other interface; (c) ability to create, maintain and execute a schedule for when the Content Feed System will execute on an automatic basis for the automatic transfer of consumer-generated content to the Content Conversion System; and, (d) ability to execute the functions of the Content Feed System on a manual basis in the presence or absence of a schedule. The Content Feed System may be able to package and distribute content to single or multiple Content Conversion Systems.

Significant features of the Content Conversion system include: (a) ability to receive content packages delivered by the Content Feed System through an Application Program Interface or other interface; (b) ability to process the elements of consumer-generated content into data, text, graphic, video and audio elements that are compatible with the interactive television system and maintain the content presentation created by the user on the web-based Content Management System; (c) ability to save reformatted content in persistent memory or storage for subsequent distribution and use by the interactive television system; and, (d) ability to inform the interactive television system that consumer-generated content is available for distribution and use. The Content Conversion System may be added as a component system of the VOD Content Delivery System, or it may be implemented as a wholly separate system that connects to the VOD Content Delivery System through an Application Program Interface or other interface. When implemented as a system that is separate from the VOD Content Delivery System, it is possible to support multiple, different interactive television systems by either (a) incorporating multiple formatting requirements into a single instance of the Content Conversion System or (b) creating multiple Content Conversion Systems, each supporting the formatting requirements for a specific interactive television system. Either implementation allows for a single instance of consumer-generated content that is created and maintained using the web-based Content Management System to be distributed and displayed on multiple, different interactive television systems with different formatting requirements.

The VOD Content Delivery System 44, as described previously, provides for the distribution of screened, converted, properly formatted consumer-generated content to viewers' televisions, typically through the use of digital set-top boxes connected to a digital cable television system capable of supporting real-time two-way data transfer between the set-top box and the Cable Head End. Significant features of the VOD Content Delivery System include: (a) ability to receive properly formatted content from the Content Conversion System; (b) ability to distribute said content over a digital cable television system and display this content on television as an interactive television presentation; (c) ability to receive user commands generated by an infrared remote control device, keyboard or other device; (d) ability to respond to the user commands by displaying appropriate content or executing desired functionality; and, (e) ability to generate and collect data regarding the user sessions and the viewing data regarding consumer-generated content on the interactive television system and make this data accessible to the Tracking System. The VOD Content Delivery System can employ templatized VOD content delivery, as described previously with respect to FIG. 1A, enabling use of the Drill Down Navigation method in which viewers can navigate visually through classified ad hierarchical categories to specific titles or content.

The VOD Content Delivery System for the Classified Ads application can also employ the Tracking System 15 for the collection and consolidation of viewing data generated by the interactive television system and the generation of reports against this viewing data. For example, the Tracking System can track the number of viewer requests for viewing that a classified ad received in a given period and calculate billing charges accordingly. The Tracking System can make this information available to users of the Content Management System as well as to system administrative personnel performing general analysis of interactive television services and associated content. Significant features of the Tracking System include: (a) ability to access and process the data generated by the Classified Ads application; (b) ability to form summaries of the viewing data against desired parameters; (c) ability to save data, summaries and reports in persistent memory or storage for subsequent modification or access; (d) ability to make data, summaries and reports accessible by users of the web-based Content Management System, restricting the data accessible by any specific user to data regarding the content created by that user account on the Content Management System; and, (e) ability to make data, summaries and reports accessible by to system administration personnel.

It is understood that many modifications and variations may be devised given the above description of the principles of the invention. It is intended that all such modifications and variations be considered as within the spirit and scope of this invention, as defined in the following claims.

What is claimed is:

1. A method for providing video-on-demand content to a subscriber device, the method comprising:
   (a) receiving, by a Web-based content management system comprising a first set of one or more computers and a first set of computer-readable memory, from at least one of a plurality of content provider devices associated with a respective content provider, via the Internet, at least the following digital content:
      (i) first video-on-demand content for a video-on-demand program in a first digital video format, along with but separate from
      (ii) respective first content-characterizing metadata associated with the first video-on-demand content that includes first title information associated with a first title of a plurality of titles, first category information associated with the first title and first subcategory information associated with the first title to specify a respective hierarchical location of the first title of the first video-on-demand content within a hierarchically-arranged interactive electronic program guide using the respective hierarchically-arranged first category information, first subcategory information, and first title information;
   (b) encoding, using the first set of one or more computers of the Web-based content management system, the first video-on-demand program content to an encoded video-on-demand content file in a format capable of playback on demand on a display associated with the subscriber device;
   (c) storing, on one or more video servers operatively connected to the first set of one or more computers of the Web-based content management system, the encoded video-on-demand content file;
   (d) generating, using the first set of one or more computers of the Web-based content management system, video-on-demand application-readable metadata for the encoded video-on-demand content file by converting at least a portion of the first content-characterizing metadata into a format readable by a video-on-demand application so that the application-readable metadata is configured to be usable with the encoded video-on-demand content file in order to specify the respective hierarchical location of the first title in the hierarchically-arranged interactive electronic program guide;
   (e) accessing, using a video-on-demand application server operatively connected to the one or more video servers, the video-on-demand application-readable metadata to generate the hierarchically-arranged interactive electronic program guide for navigating from a first template associated with a first category populated by the first category information and first subcategory information, to a second template associated with a first subcategory populated by the first subcategory information and the first title information, to a third template associated with the first title populated by the first title information,
   wherein the first category information, the first subcategory information, and the first title information are the same as designated by a content provider,
   wherein the interactive electronic program guide is generated in real time in a plurality of layers comprising:
      (i) a first layer comprising a background screen to provide at least one of a basic color, logo, or graphical theme to display,
      (ii) a second layer comprising one or more reserved areas that are reserved for displaying content provided by a different layer of the plurality of layers,
      (iii) a third layer comprising reserved area content generated using electronic program guide data received in real time by an interactive application at the subscriber device from the video-on-demand application server comprising at least one of text, video content, a navigation link, and a button to be displayed in the one or more reserved areas in the particular display;
   (f) in response to at least one of the plurality of TV service subscribers selecting, via the video-on-demand application, the first title associated with the first video-on-demand content from the hierarchically-arranged interactive electronic program guide, transmitting, from the one or more video servers, to the subscriber device, the encoded video-on-demand content file of the first video-on-demand content for display on the display associated with the subscriber device.

2. The method of claim 1, further comprising, prior to transmitting the encoded video-on-demand content file for playback on the display associated with the subscriber device, transmitting to the respective subscriber device a digital advertisement for playback on the subscriber device.

3. The method of claim 1, wherein the first category information and first subcategory information associated with the first video-on-demand program content correspond to one or more topics that pertain to video-on-demand program content from more than one content provider.

4. The method of claim 1, wherein the first category information and first subcategory information associated with the first video-on-demand program content correspond to one or more content providers and wherein the hierarchically-arranged interactive electronic program guide is organized according to the content provider.

5. The method of claim 1, wherein the digital content further comprises respective time information for availability of the respective first video-on-demand content for scheduling of viewing of the respective first video-on-demand content.

6. The method of claim 1, wherein the reserved area content generated using electronic program guide data received in real time by the interactive application at the subscriber device from the video-on-demand application server further comprises an image to be displayed in the one or more reserved areas in the particular display.

7. The method of claim 1, further comprising receiving, at the Web-based content management system, from the at least one of a plurality of content provider devices associated with a respective content provider, via the Internet using IP protocol, additional digital content comprising images and text for packaging the encoded video content file and the associated video-on-demand application-readable metadata.

8. The method of claim 1, further comprising automatically screening, at a screening system of the first set of one or more computers of the Web-based content management system, the first video-on-demand content for objectionable content.

9. The method of claim 8, wherein the screening system is configured to automatically screen the first video-on-demand content for objectionable video content.

10. The method of claim 8, wherein the screening system is configured to automatically screen the first video-on-demand content for objectionable audio content.

11. The method of claim 8, wherein the screening system is configured to automatically screen the first video-on-demand content for illegal video content.

12. The method of claim 8, wherein the screening system is configured to automatically screen the first video-on-demand content for illegal audio content.

13. The method of claim 1, further comprising tracking, at the subscriber device, navigation data related to a navigation path taken by the subscriber in navigating through the interactive electronic program guide to select the first video-on-demand program content for viewing, including the first category information, first subcategory information, and first title information.

14. The method of claim 13, further comprising providing, by the subscriber device to a profiling system, the tracked navigation data for the subscriber for preparing subscriber profile data, wherein the subscriber profile data is to be provided to a targeting system to generate feedback data as to subscriber preferences based at least on the subscriber profile data.

* * * * *